（12） United States Patent
Taguchi et al.

(10) Patent No.: US 7,771,916 B2
(45) Date of Patent: Aug. 10, 2010

(54) POLYMERIZABLE COMPOSITION AND PLANOGRAPHIC PRINTING PLATE PRECURSOR

(75) Inventors: Yoshinori Taguchi, Shizuoka-ken (JP); Kazuhiro Fujimaki, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 86 days.

(21) Appl. No.: 11/192,425

(22) Filed: Jul. 29, 2005

(65) Prior Publication Data

US 2006/0051701 A1    Mar. 9, 2006

(30) Foreign Application Priority Data

Jul. 30, 2004    (JP)    ............. 2004-224215

(51) Int. Cl.
*G03F 7/029*    (2006.01)
(52) U.S. Cl. .......... 430/273.1; 430/302; 430/944; 430/287.1; 430/285.1; 430/284.1; 430/914; 430/920; 430/926
(58) Field of Classification Search ............ None
See application file for complete search history.

(56) References Cited

U.S. PATENT DOCUMENTS

| | | | | |
|---|---|---|---|---|
| 2,760,863 | A * | 8/1956 | Plambeck, Jr. | 430/306 |
| 3,574,622 | A * | 4/1971 | Jenkins | 430/281.1 |
| 4,743,530 | A | 5/1988 | Farid et al. | |
| 5,340,699 | A | 8/1994 | Haley et al. | |
| 5,496,903 | A | 3/1996 | Watanabe et al. | |
| 6,096,794 | A * | 8/2000 | Cunningham et al. | 522/12 |
| 2001/0041305 | A1* | 11/2001 | Sawada et al. | 430/278.1 |

FOREIGN PATENT DOCUMENTS

| | | |
|---|---|---|
| EP | 1 403 710 A | 3/2004 |
| JP | 63-142346 A | 6/1988 |
| JP | 9-100306 A | 4/1997 |
| JP | 10-251317 A | 9/1998 |
| JP | 2002-537419 A | 11/2002 |

OTHER PUBLICATIONS

Dean, J.A (1999), Lange's Handbook of Chemistry (15th Edition). McGraw-Hill, pages pp. 7.41 to pp. 7.70, available at http/www.knovel.com/knovel2/Toe.jsp?BookID=47&VerticalID=0.*
Derwent-Acc-No. 1988-147205, Printed Out Sep. 16, 2007 4 pages, from Derwnt Information LTd.*
English translation of JP, 10-251317, A (1998) from machine translation from AIPN Japan Patent Office Natinal center for Industrial Property Information and Training, generated Sep. 22, 2008, 25 plus 4 pages.*
AN 1998:614311, English abstract of JP 10251317 A , Entered STN: Sep. 26, 1998, ACS on STN, 4 pages.*

* cited by examiner

*Primary Examiner*—Cynthia Hamilton
(74) *Attorney, Agent, or Firm*—Sughrue Mion, PLLC

(57) ABSTRACT

The present invention provides a polymerizable composition comprising (A) a compound represented by the following formula (I), (B) an infrared absorbent, and (C) a compound having at least one addition-polymerizable ethylenically unsaturated bond, and a negative planographic printing plate precursor having a recording layer containing the polymerizable composition. In the formula (I), $R^1$, $R^2$, $R^3$, $R^4$, $R^5$, and $R^6$ each independently represent a hydrogen atom or a monovalent organic group; and $X^-$ represents an anion.

Formula (I)

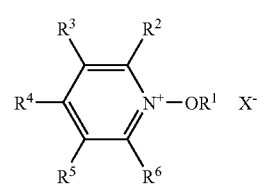

14 Claims, No Drawings

POLYMERIZABLE COMPOSITION AND PLANOGRAPHIC PRINTING PLATE PRECURSOR

CROSS-REFERENCE TO RELATED APPLICATION

This application claims priority under 35 USC 119 from Japanese Patent Applications No. 2004-224215, the disclosure of which is incorporated by reference herein.

BACKGROUND OF THE INVENTION

1. Field of the Invention

The present invention relates to a negative polymerizable composition and a negative planographic printing plate precursor, and in particular to a negative polymerizable composition and a negative planographic printing plate precursor that allow highly sensitive writing by infrared laser.

2. Description of the Related Art

PS plates having an lipophilic photosensitive resin layer formed on a hydrophilic support, which have hitherto been widely used as planographic printing plate precursors, have been produced commonly by mask exposure (surface exposure) through a lith film and by dissolving and thus removing the nonimage regions. In recent years, digital technology, in which image information is processed, stored, and outputted electronically by computer, is becoming more and more popular. Accordingly, many newer image-output methods compatible with the digital technology have been commercialized in a greater number. As a result, there is an urgent need for the "computer to plate (CTP) technology" that allows direct production of printing plates by scanning a high-directivity light such as laser beam according to digitalized image information without using the lith film, and thus for the planographic printing plate precursors that are compatible with the CTP technology.

As the planographic printing plate precursor compatible with such scanning exposure, a planographic printing plate precursor wherein an lipophilic photosensitive resin layer (hereinafter, referred to as a recording layer) containing a photosensitive compound that can generate an active species such as free radical, Bronsted acid, or the like by laser exposure is formed on a hydrophilic support was proposed and already commercialized. It is possible to obtain negative planographic printing plates by scanning the planographic printing plate precursor with laser according to digital information, generating such active species and thus causing physical and chemical changes on the photosensitive layer, insolubilizing the exposed regions, and developing the images thereon. In particular, a planographic printing plate precursor wherein a photopolymerizable recording layer containing a photopolymerization initiator superior in sensitization speed, an addition-polymerizable ethylenically unsaturated compound, and a binder polymer soluble in alkaline developing solution, and additionally an oxygen-blocking protective layer as needed are formed on a hydrophilic support is a possible candidate for the desirable printing plate precursor superior in printing properties, as it is superior in productivity and easier in developing processing and provides a printing plate precursor superior in resolution and inking property.

Normally, negative-type image-recording materials such as the planographic printing plate precursors described above employ a recording method of forming image regions by causing a polymerization reaction by the radicals generated by light or heat as initiators and hardening the recording layer in exposed regions. Such negative-type image-forming materials, which are weaker in image-forming property than positive-type image forming materials in which the recording layers are solubilized by the energy by infrared laser irradiation and form firm image regions by accelerating hardening by polymerization, are generally heat-treated prior to processing in the developing process. The negative-type image recording materials demanding such a post-heating treatment are, for example, the recording materials consisting of resol and novolak resins described in U.S. Pat. No. 5,340,699 and the like. In particular, when an aluminum support is used, there was the problem that it was difficult to obtain sufficient sensitivity because the energy by infrared laser irradiation could not be used for initiation and propagation of the polymerization reaction for image formation due to the diffusion thereof to the support higher in heat conductivity.

The combinations of an initiator and a dye having high photosensitivity in the infrared region that could solve the problems above are, for example, the borate/cyanine colorants described in U.S. Pat. No. 5,496,903, halogenated s-triazine/cyanine colorants, and the like, but they still carried the problem of extremely lower storage stability. For example, the initiator system containing a polycarboxylic acid described in Japanese Patent Application National Publication (Laid-Open) No. 2002-537419 was known as an initiator system that was improved in storage stability, but it still does not have sufficient storage stability.

In addition, particular initiators absorbing light in the infrared region are described in Japanese Patent Application Laid-Open (JP-A) Nos. 63-142346 and 9-100306, but there was a problem that the particular initiator described therein, which are highly hydrophilic, did not provide sufficient sensitivity when an oxygen-blocking layer is present as the upper layer.

SUMMARY OF THE INVENTION

The present invention, which was made in consideration of the problems above, provides a polymerizable composition that hardens highly sensitively by exposure and is superior in storage stability. The invention also provides a negative planographic printing plate precursor that exhibits high sensitivity recording, is favorably resistant to alkaline developing solution in the image region and superior in storage stability, printing durability, and smut resistance, and allows recording by infrared laser.

After intensive studies, the inventors have found that it was possible to obtain a polymerizable composition that hardens highly sensitively and is superior in storage stability by using a polymerization initiator having a particular structure, and to obtain a negative planographic printing plate precursor that allows highly-sensitive recording and is improved in storage stability, printing durability, and smut resistance by applying the polymerizable composition to a recording layer, and completed the invention.

In one aspect, the invention provides a polymerizable composition comprising (A) a compound represented by the following formula (I), (B) an infrared absorbent, and (C) a compound having at least one addition-polymerizable ethylenically unsaturated bond.

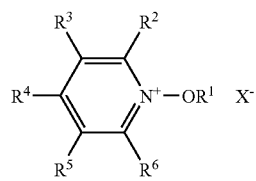

Formula (I)

In the formula (I), $R^1$, $R^2$, $R^3$, $R^4$, $R^5$, and $R^6$ each independently represent a hydrogen atom or a monovalent organic group. $X^-$ represents an anion.

In another aspect, the invention provides a negative planographic printing plate precursor comprising a substrate and a recording layer containing the polymerizable composition according to the invention formed thereon.

The exact mechanism resulting in the effects of the invention is not completely clear but is presumed to be as follows. The compound represented by formula (I) is a compound which generates an alkoxy radical by cleavage of the N—O bond in its cationic structure, and the generated alkoxy radical is more effective in triggering the reaction of the ethylenically unsaturated bond than an oxygen molecule. Thus it seems that the alkoxy radical is more effective in accelerating the reaction than other initiation radical species.

The compound represented by formula (I) of the invention is preferably more hydrophobic. That is, the log P value of the compound represented by formula (I) is 2.00 or more, preferably 2.50 or more, and more preferably 3.50 or more. The log P value means a logarithm of distribution coefficient P (Partition Coefficient), which is a physical parameter representing a quantitative value indicating how an organic compound is distributed between two phases: oil (generally, 1-octanol) and water, at the equilibrium state.

log $P$=log(Coil/Cwater)

Coil: molar concentration in organic phase

Cwater: molar concentration in aqueous phase

In negative planographic printing plate precursors, a protective layer (oxygen-blocking layer) is favorably formed on the recording layer. In the invention, when the polymerizable composition according to the invention is used as the recording layer of planographic printing plate precursor, it is possible to restrict migration of an initiator to the oxygen-blocking layer by using a compound having a log P value of 3.50 or more, i.e., a compound having a hydrophobilized skeleton as an initiator, and it is also possible to use generated alkoxy radicals more efficiently in the reaction by hydrophobilizing the alkoxy radical group (extending the length of the alkyl chain) and thus restricting release of the generated radicals due to ablation, and to carry out the reaction more sensitively.

The polymerizable composition according to the invention preferably contains additionally (D) a binder polymer having at least one radically polymerizable group on the side chain thereof. Aluminum supports are used for planographic printing plate precursors in many cases, but in such a case, the polymerization chain reaction does not proceed sufficiently at around the interface of the recording layer and the support because heat is not transmitted to around the interface of the recording layer and the support sufficiently due to the heat diffusion by aluminum support; and when a latent image formed under such a condition is developed with an alkaline developing solution, the developing solution penetrates easily through the upper hardened recording layer to the region close to the interface, dissolving the unhardened area there and consequently causing the problem of giving planographic printing plates inferior in image strength and printing durability.

However, use of the binder polymer having at least one radically polymerizable group on the side chain as the binder for the recording layer seemingly increases the crosslinking density of the hardened area, restricting penetration of the developing solution relieving the damage in the image region, and improving the printing durability of the resulting printing plate.

The binder polymer having at least one radically polymerizable group on the side chain thereof preferably has a repeating unit represented by the following formula (II).

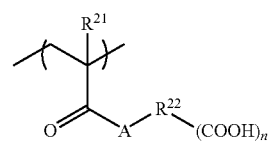

Formula (II)

In the formula (II), $R^{21}$ represents a hydrogen atom or a methyl group; and $R^{22}$ represents a connecting group containing two or more atoms selected from the group consisting of carbon, hydrogen, oxygen, nitrogen, and sulfur atoms and having a total number of atoms from 2 to 82. A represents an oxygen atom or —$NR^{23}$—; and $R^{23}$ represents a hydrogen atom or a monovalent hydrocarbon group having 1 to 10 carbon atoms. n is an integer of 1 to 5.

When the binder polymer having at least one radically polymerizable group on the side chain thereof has the repeating unit in its polymer structure, the binder polymer becomes more diffusible in to the developing solution and more responsive to alkaline solution (more soluble in aqueous alkaline solution), and more soluble in the developing solution even when the acid content is limited (i.e., when the acid value is insufficient). Seemingly in this manner, the photosensitive layer of planographic printing plate precursor containing such a binder polymer restricts the damage by penetration of the developing solution due to its acid content and retains its high printing efficiency; allows formation of a high-strength image region having a sufficiently hardened surface that restricts penetration of the alkaline developing solution in the exposed region; and has a faster speed of solubilization into the alkaline developing solution in the unexposed region.

The binder polymer having at least one radically polymerizable group on the side chain thereof is more effective, when a compound represented by the formula (I) is used as the radical-generating compound. It seems to be due to the superior compatibility between the binder polymer and the compound.

DETAILED DESCRIPTION OF THE INVENTION

Hereinafter the present invention will be described in details.

Polymerizable Composition

The polymerizable composition according to the invention comprises (A) a compound represented by the following formula (I), (B) an infrared absorbent, and (C) a compound having at least one addition-polymerizable ethylenically unsaturated bond.

(A) Compound Represented by Formula (1)

The compound represented by formula (1) will be described.

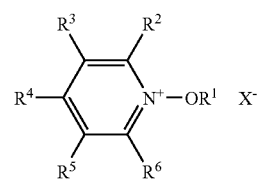

Formula (I)

In the formula (I), $R^1$ to $R^6$ each independently represent a hydrogen atom or a monovalent organic group containing a non-metal atom. $X^-$ represents an anion.

The monovalent substituent groups represented by $R^1$ to $R^6$ will be described. When $R^1$ to $R^6$ each represent a monovalent substituent group, examples of the monovalent substituent groups include halogen atoms, and amino, substituted amino, substituted carbonyl, hydroxyl, substituted oxy, thiol, thioether, silyl, nitro, cyano, alkyl, alkenyl, aryl, heterocyclic, sulfo, substituted sulfonyl, sulfonato, substituted sulfinyl, phosphono, substituted phosphono, phosphonato, and substituted phosphonato groups, all of which may have one or more substituents if possible.

A hydrogen atom, or a methyl, methoxymethyl, chloromethyl, acetyloxymethyl, or methoxycarbonylmethyl group is preferable as $R^1$ to $R^6$.

Examples of the alkyl groups represented by $R^1$ to $R^6$ include straight-chain, branched-chain, or cyclic alkyl group having 1 to 20 carbon atoms. Among them, straight-chain alkyl group having 1 to 12 carbon atoms, branched alkyl group having 3 to 12 carbon atoms, and cyclic alkyl group having 5 to 10 carbon atoms are more preferable. Specific examples thereof include methyl, ethyl, propyl, butyl, pentyl, hexyl, heptyl, octyl, nonyl, decyl, undecyl, dodecyl, tridecyl, hexadecyl, octadecyl, eicosyl, isopropyl, isobutyl, s-butyl, t-butyl, isopentyl, neopentyl, 1-methylbutyl, isohexyl, 2-ethylhexyl, 2-methylhexyl, cyclohexyl, cyclopentyl, and 2-norbornyl groups.

When the alkyl group represented by $R^1$ to $R^6$ is substituted (i.e., a substituted alkyl group), the alkyl unit in the substituted alkyl group is a bivalent organic group where a hydrogen atom of the alkyl group having 1 to 20 carbon atom is removed from the organic group, and the range of preferable carbon atom number is the same as that of the alkyl group.

Preferable specific examples of $R^1$ to $R^6$ when they are substituted alkyl groups include chloromethyl, bromomethyl, 2-chloroethyl, trifluoromethyl, methoxymethyl, methoxycarbonylmethyl, isopropoxymethyl, butoxymethyl, s-butoxybutyl, methoxyethoxyethyl, allyloxymethyl, phenoxymethyl, acetyloxymethyl, methylthiomethyl, tolylthiomethyl, pyridylmethyl, tetramethylpiperidinylmethyl, N-acetyl-tetramethylpiperidinylmethyl, trimethylsilylmethyl, methoxyethyl, ethylaminoethyl, diethylaminopropyl, morpholinopropyl, acetyloxymethyl, benzoyloxymethyl, N-cyclohexylcarbamoyloxyethyl, N-phenylcarbamoyloxyethyl, acetylaminoethyl, N-methyl-benzoylaminopropyl, 2-oxoethyl, 2-oxopropyl, carboxypropyl, methoxycarbonylethyl, allyloxycarbonylbutyl, chlorophenoxycarbonylmethyl, carbamoylmethyl, N-methylcarbamoylethyl, N,N-dipropylcarbamoylmethyl, N-methoxyphenyl)carbamoylethyl, N-methyl-N-sulfophenyl)carbamoylmethyl, sulfobutyl, sulfonatobutyl, sulfamoylbutyl, N-ethylsulfamoylmethyl, N,N-dipropylsulfamoylpropyl, N-tolylsulfamoylpropyl, N-methyl-N-(phosphonophenyl)sulfamoyloctyl, phosphonobutyl, phosphonatohexyl, diethylphosphonobutyl, diphenylphosphonopropyl, methylphosphonobutyl, methylphosphonatobutyl, tolylphosphonohexyl, tolylphosphonatohexyl, phosphonooxypropyl, phosphonatooxybutyl, benzyl, phenethyl, α-methylbenzyl, 1-methyl-1-phenylethyl, p-methylbenzyl, cinnamyl, allyl, 1-propenylmethyl, 2-butenyl, 2-methylallyl, 2-methylpropenylmethyl, 2-propynyl, 2-butynyl, and 3-butynyl groups.

Substituent groups that may be introduced into the alkyl groups represented by $R^1$ to $R^6$, in addition to the substituent groups described for the substituted alkyl groups, include the monovalent substituent groups containing one or more nonmetal atoms exemplified below. Preferable examples of the substituents containing the groups described above include halogen atoms (—F, —Br, —Cl, and —I); hydroxyl, alkoxy, aryloxy, mercapto, aklylthio, arylthio, alkyldithio, aryldithio, amino, N-alkylamino, N,N-dialkylamino, N-arylamino, N,N-diarylamino, N-alkyl-N-arylamino, acyloxy, carbamoyloxy, N-alkylcarbamoyloxy, N-arylcarbamoyloxy, N,N-dialkylcarbamoyloxy, N,N-diarylcarbamoyloxy, N-alkyl-N-arylcarbamoyloxy, alkylsulfoxy, arylsulfoxy, acylthio, acylamino, N-alkylacylamino, N-arylacylamino, ureido, N'-alkylureido, N',N'-dialkylureido, N'-arylureido, N',N'-diarylureido, N'-alkyl-N'-arylureido, N-alkylureido, N-arylureido, N'-alkyl-N-alkylureido, N'-alkyl-N-arylureido, N',N'-dialkyl-N-alkylureido, N',N'-dialkyl-N-arylureido, N'-aryl-N-alkylureido, N'-aryl-N-arylureido, N',N'-diaryl-N-alkylureido, N',N'-diaryl-N-arylureido, N'-alkyl-N'-aryl-N-alkylureido, N'-alkyl-N'-aryl-N-arylureido, alkoxycarbonylamino, aryloxycarbonylamino, N-alkyl-N-alkoxycarbonylamino, N-alkyl-N-aryloxycarbonylamino, N-aryl-N-alkoxycarbonylamino, N-aryl-N-aryloxycarbonylamino, formyl, acyl, carboxyl, alkoxycarbonyl, aryloxycarbonyl, carbamoyl, N-alkylcarbamoyl, N,N-dialkylcarbamoyl, N-arylcarbamoyl, N,N-diarylcarbamoyl, N-alkyl-N-arylcarbamoyl, alkylsulfinyl, arylsulfinyl, alkylsulfonyl, arylsulfonyl, sulfo (—$SO_3H$) (and the conjugate bases, referred to as sulfonato), alkoxysulfonyl, aryloxysulfonyl, sulfinamoyl, N-alkylsulfinamoyl, N,N-dialkylsulfinamoyl, N-arylsulfinamoyl, N,N-diarylsulfinamoyl, N-alkyl-N-arylsulfinamoyl, sulfamoyl, N-alkylsulfamoyl, N,N-dialkylsulfamoyl, N-arylsulfamoyl, N,N-diarylsulfamoyl, N-alkyl-N-arylsulfamoyl, phosphono (—$PO_3H_2$) (and the conjugate bases, referred to as phosphonato), dialkylphosphono (—$PO_3(alkyl)_2$), diarylphosphono (—$PO_3(aryl)_2$), alkylarylphosphono (—$PO_3(alkyl)(aryl)$), monoalkylphosphono (—$PO_3(alkyl)$) and the conjugate bases thereof (referred to as alkylphosphonato), monoarylphosphono (—$PO_3H(aryl)$) and the conjugate bases thereof (referred to as arylphosphonato), phosphonooxy (—$OPO_3H_2$) and the conjugate bases thereof (referred to as phosphonatooxy), dialkylphosphonooxy (—$OPO_3(alkyl)_2$), diarylphosphonooxy (—$OPO_3(aryl)_2$), alkylarylphosphonooxy (—$OPO_3(alkyl)(aryl)$), monoalkylphosphonooxy (—$OPO_3H(alkyl)$) and the conjugate bases thereof (referred to as alkylphosphonatooxy), monoarylphosphonooxy (—$OPO_3H(aryl)$) and the conjugate bases thereof (referred to as arylphosphonatooxy), cyano, nitro, aryl, alkenyl, alkynyl, heterocyclic, and silyl groups, and the like.

Specific examples of the alkyl units for the substituents that may be introduced into the alkyl group represented by $R^1$ to $R^6$ are the same as those of the $R^1$ to $R^6$ described above when they are substituted alkyl groups, and the preferable ranges thereof are also the same.

In addition, specific examples of the aryl units of the substituents that may be introduced into the alkyl group represented by $R^1$ to $R^6$ include phenyl, biphenyl, naphthyl, toluyl, xylyl, mesityl, cumenyl, chlorophenyl, bromophenyl, chloromethylphenyl, hydroxyphenyl, methoxyphenyl, ethoxyphenyl, phenoxyphenyl, acetoxyphenyl, benzyoloxyphenyl, methylthiophenyl, phenylthiophenyl, methylaminophenyl, dimethylaminophenyl, acetylaminophenyl, carboxyphenyl, methoxycarbonylphenyl, ethoxyphenylcarbonyl, phenoxycarbonylphenyl, N-phenylcarbamoylphenyl, cyanophenyl, sulfophenyl, sulfonatophenyl, phosphonophenyl, phosphonatophenyl groups.

Examples of the alkenyl groups represented by $R^1$ to $R^6$ include alkenyl groups having 2 to 20 carbon atoms. Among them, alkenyl groups having 2 to 10 carbon atoms are preferable, and alkenyl groups having 2 to 8 carbon atoms are more preferable. The alkenyl group may have one or more substituents additionally. Examples of the substituent groups that may be introduced include halogen atoms, alkyl groups, substituted alkyl groups, aryl groups, and substituted aryl groups; and halogen atoms, and straight-chain, branched-chain, and cyclic alkyl groups having 1 to 10 carbon atoms are preferable. Specific examples of the alkenyl groups include vinyl, 1-propenyl, 1-butenyl, cinnamyl, 1-pentenyl, 1-hexenyl, 1-octenyl, 1-methyl-1-propenyl, 2-methyl-1-propenyl, 2-methyl-1-butenyl, 2-phenyl-1-ethenyl, and 2-chloro-1-ethenyl groups.

Examples of the alkynyl groups represented by $R^1$ to $R^6$ include alkynyl groups having 2 to 20 carbon atoms. Among them, alkynyl groups having 2 to 10 carbon atoms are preferable, and alkynyl group having 2 to 8 carbon atoms are more preferable. Specific examples thereof include ethynyl, 1-propynyl, 1 butynyl, phenylethynyl, and trimethylsilylethynyl groups.

Examples of the aryl groups represented by $R^1$ to $R^6$ include a benzene ring, fused rings of 2 to 3 benzene rings, fused rings of a benzene ring and a five-membered unsaturated ring, and the like. Specific examples thereof include phenyl, naphthyl, anthryl, phenanthryl, indenyl, acenaphthenyl, and fluorenyl groups; and among them, phenyl and naphthyl groups are more preferable.

In addition, the aryl group represented by $R^1$ to $R^6$ may have a substituent group on the ring-forming carbon atom, and examples of the substituent groups include monovalent substituent groups containing one or more non-metal atoms. Preferable examples of the substituent groups to be introduced include those described in explaining the substituent groups for the alkyl, substituted alkyl, and, substituted alkyl groups described above.

As the heterocyclic groups represented by $R^1$ to $R^6$, three- to eight-membered-ring heterocyclic groups are preferable; three- to six-membered-ring heterocyclic groups containing a nitrogen, oxygen, or sulfur atom are more preferable; and five- to six-membered-ring heterocyclic groups containing a nitrogen, oxygen, or sulfur atom are still more preferable. Specific examples thereof include pyrrole, furan, thiophene, benzopyrrole, benzofuran, benzothiophene, pyrazole, isoxazole, isothiazole, indazole, benzisoxazole, benzisothiazole, imidazole, oxazole, thiazole, benzimidazole, benzoxazole, benzothiazole, pyridine, quinoline, isoquinoline, pyridazine, pyrimidine, pyrazine, phthalazine, quinazoline, quinoxaline, aziridine, phenanthridine, carbazole, purine, pyran, piperidine, piperadine, morpholine, indol, indolizine, chromene, cinnoline, acridine, phenothazine, tetrazole, and triazine ring groups.

The heterocyclic group represented by $R^1$ to $R^6$ may have a substituent group on the ring-forming carbon atom, and examples of the substituent groups include monovalent substituent groups containing one or more non-metal atoms. Preferable examples of the substituent groups to be introduced include those described in explaining the substituent groups for the alkyl, substituted alkyl, and substituted alkyl groups above.

The silyl group represented by $R^1$ to $R^6$ may have a substituent group; silyl groups having 0 to 30 carbon atoms are preferable; silyl groups having 3 to 20 carbon atoms are more preferable; and silyl groups having 3 to 10 carbon atoms are still more preferable. Specific examples thereof include trimethylsilyl, triethylsilyl, tripropylsilyl, triisopropylsilyl, cyclohexyldimethylsilyl, and dimethylvinylsilyl groups.

The thiol groups represented by $R^1$ to $R^6$ may have a substituent group; thiol groups having 0 to 30 carbon atoms are preferable; thiol groups having 3 to 20 carbon atoms are more preferable; and thiol groups having 1 to 10 carbon atoms are still more preferable. Specific examples thereof include mercaptomethyl, mercaptoethyl, 4-mercaptocyclohexyl, and 4-mercaptophenyl groups, and the like.

The thioether group represented by $R^1$ to $R^6$ may have a substituent group; thioether groups having 0 to 30 carbon atoms are preferable; thioether groups having 3 to 20 carbon atoms are more preferable; and thioether groups having 1 to 10 carbon atoms are still more preferable. Specific examples thereof include aklylthio groups such as methylthio, ethylthio, and cyclohexylthio, arylthio groups such as phenylthio, and the like. Examples of the halogen atoms represented by $R^1$ to $R^6$ include fluorine, bromine, chlorine, and iodine atoms, and among them, chlorine and bromine atoms are preferable.

The substituted oxy group ($R^{o6}O-$) is a group having a monovalent non-metal atomic group excluding a hydrogen atom as $R^{o6}$. Favorable examples of the substituted oxy groups include alkoxy, aryloxy, acyloxy, carbamoyloxy, N-alkylcarbamoyloxy, N-arylcarbamoyloxy, N,N-dialkylcarbamoyloxy, N,N-diarylcarbamoyloxy, N-alkyl-N-arylcarbamoyloxy, alkylsulfoxy, arylsulfoxy, phosphonooxy, and phosphonatooxy groups. Examples of the alkyl and aryl groups therein include those indicated for the alkyl, substituted alkyl, aryl, and substituted aryl groups above. The acyl group ($R^{o7}CO-$) in the acyloxy group is, for example, a group having one of the alkyl, substituted alkyl, aryl, and substituted aryl groups described above as $R^{o7}$. Among these substituent groups, alkoxy, aryloxy, acyloxy, and arylsulfoxy groups are more preferable. Typical favorable examples of the substituted oxy groups include methoxy, ethoxy, propyloxy, isopropyloxy, butyloxy, pentyloxy, hexyloxy, dodecyloxy, benzyloxy, allyloxy, phenethyloxy, carboxyethyloxy, methoxycarbonylethyloxy, ethoxycarbonylethyloxy, methoxyethoxy, phenoxyethoxy, methoxyethoxyethoxy, ethoxyethoxyethoxy, morpholinoethoxy, morpholinopropyloxy, allyloxyethoxyethoxy, phenoxy, tolyloxy, xylyloxy, mesityloxy, cumenyloxy, methoxyphenyloxy, ethoxyphenyloxy, chlorophenyloxy, bromophenyloxy, acetyloxy, benzoyloxy, naphthyloxy, phenylsulfonyloxy, phosphonooxy, and phosphonatooxy groups.

The amino groups may be substituted amino groups including amido groups. The substituted amino groups including amido groups ($R^{o8}NH-$, $(R^{o9})(R^{o10})N-$) include groups having a monovalent non-metal atomic group excluding a hydrogen atom as $R^{o8}$, $R^{o9}$, or $R^{o10}$. $R^{o9}$ and $R^{o10}$ may bind to each other, forming a ring. Preferable examples of the substituted amino groups include N-alkylamino, N,N-dialkylamino, N-arylamino, N,N-diarylamino, N-alkyl-N-arylamino, acylamino, N-alkylacylamino, N-arylacylamino, ureido, N'-alkylureido, N',N'-dialkylureido, N'-arylureido, N',N'-diarylureido, N'-alkyl-N'-arylureido, N-alkylureido, N-arylureido, N'-alkyl-N-alkylureido, N'-alkyl-N-arylureido, N',N'-dialkyl-N-alkylureido, N'-alkyl-N'-arylureido, N',N'-dialkyl-N-alkylureido, N',N'-dialkyl-N'-arylureido, N'-aryl-N-alkylureido, N'-aryl-N-arylureido, N',N'-diaryl-N-alkylureido, N',N'-diaryl-N-arylureido, N'-alkyl-N'-aryl-N-alkylureido, N'-alkyl-N'-aryl-N-arylureido, alkoxycarbonylamino, aryloxycarbonylamino, N-alkyl-N-alkoxycarbonylamino, N-alkyl-N-aryloxycarbonylamino, N-aryl-N-alkoxycarbonylamino, and N-aryl-N-aryloxycarbonylamino groups. Examples of the alkyl and aryl groups therein include those described for the alkyl, substituted alkyl, aryl, and substituted aryl groups above; and examples of $R^{o7}$ in the acyl group ($R^{o7}CO-$) of acylamino, N-alkylacylamino, and N-arylacylamino groups are the same as those described above. Among them, more preferable are N-alkylamino, N,N-dialkylamino, N-arylamino, and acylamino groups. Typical favorable examples of the substituted amino groups include methylamino, ethylamino, diethylamino, morpholino, pyperidino, pyrrolidino, phenylamino, benzoylamino, and acetylamino groups.

A group having a monovalent non-metal atomic group as $R^{011}$ may be used as the substituted sulfonyl group ($R^{011}$—SO$_2$—). More preferable examples thereof include alkylsulfonyl, arylsulfonyl, and substituted or unsubstituted sulfamoyl groups. Examples of the alkyl and aryl groups therein include those described for the alkyl, substituted alkyl, aryl, and substituted aryl groups above. Specific examples of the substituted sulfonyl groups include butylsulfonyl, phenylsulfonyl, chlorophenylsulfonyl, sulfamoyl, N-alkylsulfamoyl, N,N-dialkylsulfamoyl, N-arylsulfamoyl, and N-alkyl-N-arylsulfamoyl groups.

As described above, the sulfonato group (—SO$_3$—) means a conjugate negative ion group of sulfo group (—SO$_3$H), and is normally, preferably used together with a counter cation. Examples of such counter cations include generally known cations, such as various onium ions (ammonium, sulfonium, phosphonium, iodonium, azinium, and the like) and metal ions (Na$^+$, K$^+$, Ca$^{2+}$, Zn$^{2+}$, and the like).

A group having a monovalent non-metal atomic group as $R^{013}$ may be used as the substituted carbonyl group ($R^{013}$—CO—). Preferable examples of the substituted carbonyl groups include formyl, acyl, carboxyl, alkoxycarbonyl, aryloxycarbonyl, carbamoyl, N-alkylcarbamoyl, N,N-dialkylcarbamoyl, N-arylcarbamoyl, N,N-diarylcarbamoyl, and N-alkyl-N'-arylcarbamoyl groups. Examples of the alkyl and aryl groups therein include those described for the alkyl, substituted alkyl, aryl, and substituted aryl groups above. Among them, more preferable substituted carbonyl groups include formyl, acyl, carboxyl, alkoxycarbonyl, aryloxycarbonyl, carbamoyl, N-alkylcarbamoyl, N,N-dialkylcarbamoyl, and N-arylcarbamoyl group; and still more preferable are formyl, acyl, alkoxycarbonyl, and aryloxycarbonyl groups. Favorable specific examples of the substituted carbonyl groups include formyl, acetyl, benzoyl, carboxyl, methoxycarbonyl, ethoxycarbonyl, allyloxycarbonyl, dimethylaminophenylethenylcarbonyl, methoxycarbonylmethoxycarbonyl, N-methylcarbamoyl, N-phenylcarbamoyl, N,N-diethylcarbamoyl, and morpholinocarbonyl groups, and the like.

A group having a monovalent non-metal atomic group as $R^{014}$ may be used as the substituted sulfinyl group ($R^{014}$—SO—). Preferable examples thereof include alkylsulfinyl, arylsulfinyl, sulfinamoyl, N-alkylsulfinamoyl, N,N-dialkylsulfinamoyl, N-arylsulfinamoyl, N,N-diarylsulfinamoyl, and N-alkyl-N-arylsulfinamoyl groups. Examples of the alkyl and aryl groups therein include those described for the alkyl, substituted alkyl, aryl, and substituted aryl groups above. Among them, more preferable examples thereof are alkylsulfinyl and arylsulfinyl groups. Specific examples of the substituted sulfinyl groups include hexylsulfinyl, benzylsulfinyl, and tolylsulfinyl groups.

The substituted phosphono group means a phosphono group of which one or two hydroxyl groups are replaced with one or two other organic oxo groups, and preferable examples thereof include the dialkylphosphono, diarylphosphono, alkylarylphosphono, monoalkylphosphono, and monoarylphosphono groups described above. Among them, dialkylphosphono and diarylphosphono groups are more preferable. Specific examples thereof include diethylphosphono, dibutylphosphono, and diphenylphosphono groups, and the like.

The phosphonato groups (—PO$_3$H$_2^-$ and —PO$_3$H$^-$) mean the conjugate negative ion groups of phosphono group (—PO$_3$H$_2$) that are formed by dissociation of the one or two second acidic groups. Normally, the groups are used favorably with a counter cation. Examples of the counter cations include generally known cations such as various onium ions (ammonium, sulfonium, phosphonium, iodonium, azinium, etc.) and metal ions (Na$^+$, K$^+$, Ca$^{2+}$, Zn$^{2+}$, and the like.).

The substituted phosphonato group is a conjugate negative ion group of the substituted phosphono group above, of which a hydroxyl group is replaced with an organic oxo group, and specific examples thereof include conjugate bases of the monoalkylphosphono (—PO$_3$H(alkyl)) and monoarylphosphono (—PO$_3$H(aryl)) groups described above.

$R^1$ to $R^6$ each may bind to each other, forming a fused ring such as a benzene or heterocyclic ring together with the carbon atoms bound thereto.

Favorable examples of $R^1$ to $R^6$ are described below. An alkyl group having 1 to 20 carbon atoms which may be substituted is preferably as $R^1$; an alkyl group having 3 to 20 carbons which may be substituted is more preferably; and an alkyl group having 6 to 20 carbon atoms which may be substituted are still more preferable. An alkyl, aromatic, or heterocyclic group having 3 to 20 carbons which may be substituted is preferably as $R^2$ to $R^6$; and an alkyl, aromatic, or heterocyclic group having 6 to 20 carbon atoms which may be substituted is more preferable. As described above, it is because such groups restrict the penetration of an initiator into oxygen-blocking layer and the migration of the generated radicals out of photosensitive layer due to the ablation thereof, and thus allow more efficient use of the generated alkoxy radicals in the reaction.

As described above, the log P value of a particular structural skeleton (cationic unit) in the compound represented by formula (I) is preferably 2.00 or more, more preferably 2.50 or more, and more preferably 3.50 or more.

$X^-$ is an anion, preferably an acid anion. Specific examples thereof include, but are not limited to, halide anions, BF$_4^-$, BCl$_4^-$, ZnCl$_4^-$, SbCl$_6^-$, FeCl$_4^-$, GaCl$_4^-$, GaBr$_4^-$, AlI$_4^-$, AlCl$_4^-$, SbF$_6^-$, CF$_3$SO$_3^-$, PF$_6^-$, BPh$_4^-$, anions of fused polycyclic sulfonic acids such as naphthalene-1-sufonic acid and anthracene-1-sufonic acid, an anthraquinonesulfonate anion, an anthracenesulfonate anion, sulfonate group-containing dyes.

The compounds represented by the formula (I) also include compounds having two or more of the particular structural skeletons in the compound represented by formula (I) (cationic unit) via $R^1$ in the molecule, and such compounds are also used favorably.

A compound represented by the following formula (III) is particularly preferable as the compound represented by formula (I) having two or more particular structural skeletons in the molecule. It is because the compound generates alkoxy radicals at multiple points in the same molecule and crosslinks with the compound having at least one addition-polymerizable ethylenically unsaturated bond (C) described below forming a three-dimensional network.

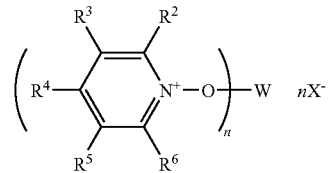

Formula (III)

In the formula (III), $R^2$ to $R^6$ each represent a hydrogen atom or a monovalent organic group. W represents an n-valent organic connecting group. n is an integer of two or more. $X^-$ represents an anion.

In the formula (III), the monovalent organic groups represented by $R^2$ to $R^6$ are the same as the monovalent organic groups represented by $R^2$ to $R^6$ in the formula (I) above, and the preferable ranges are also the same.

The n-valent organic connecting group represented by W is a polyvalent organic group containing one or more non-metal atoms, and those containing 1 to 60 carbon atom, 0 to 10 nitrogen atoms, 0 to 50 oxygen atoms, 1 to 100 hydrogen atoms, and 0 to 20 sulfur atoms are preferable. More specific examples thereof include organic connecting groups containing the following structures alone or in combination of two or more.

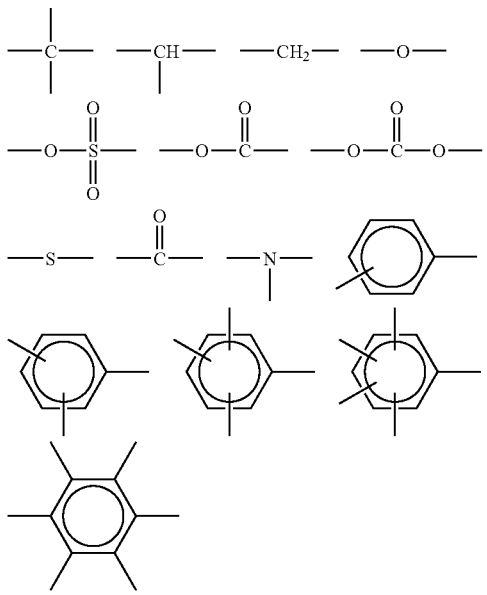

Polyvalent naphthalene, Polyvalent anthracene

The organic connecting group represented by W may have a substituent group additionally, and examples of the substituent groups that may be introduced include halogen atoms; hydroxyl, carboxyl, sulfonato, nitro, cyano, amido, amino, alkyl, alkenyl, alkynyl, aryl, substituted oxy, substituted sulfonyl, substituted carbonyl, substituted sulfinyl, sulfo, phosphono, phosphonato, silyl, and heterocyclic groups.

n is an integer of two or more, preferably 2 to 6, and more preferably 2 to 3.

In the formula (III), $X^-$ is the same as $X^-$ in the formula (I) above, and the preferable range is also the same.

In addition, the compound represented by formula (I) may be connected to a side chain of a polymer via any one of $R^1$ to $R^6$, and such derivatives are also included in favorable examples.

In particular, a compound represented by the following formula (IV) is preferable as the compound represented by formula (I) connected to a side chain of a polymer.

The compound is favorable, because it crosslinks three-dimensionally with the compound having at least one addition-polymerizable ethylenically unsaturated bond more efficiently, similarly to the compounds described above having two or more particular structural skeleton additionally via $R^1$ in the molecule.

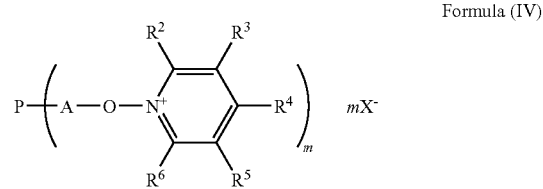

Formula (IV)

In the formula (IV), R2 to R6 each independently represent a hydrogen atom or a monovalent organic group. P represents a main chain of a polymer. A represents a single bond or a bivalent organic connecting group. m is an integer of 1 or more.

In the formula (4), the monovalent organic groups represented by $R^2$ to $R^6$ are the same as the monovalent organic groups represented by $R^2$ to $R^6$ in the formula (I) above and the preferable ranges are also the same.

The main chain represented by P is not particularly limited, but preferably, a polyvinyl, polyurethane, polyacetal, or another chain. Among them, poly(meth)acrylate, polystyrene, and other chains are particularly preferable, from the viewpoints of the printing durability and others when the compound is applied to the recording layer of planographic printing plate precursor.

The bivalent organic connecting group represented by A is a bivalent organic group containing one or more non-metal atoms; and bivalent organic groups containing 1 to 60 carbon atoms, 0 to 10 nitrogen atoms, 0 to 50 oxygen atoms, 1 to 100 hydrogen atoms, and 0 to 20 sulfur atoms are preferable. More specific examples thereof include organic connecting groups containing one or in combination of two or more of the following structures.

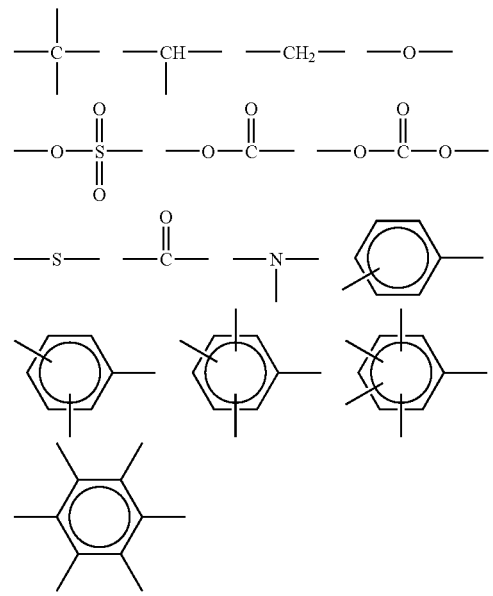

Polyvalent naphthalene, Polyvalent anthracene

The organic connecting group represented by A may have a substituent group additionally, and examples of the substituent groups that may be introduced include halogen atoms; hydroxyl, carboxyl, sulfonato, nitro, cyano, amido group, amino, alkyl, alkenyl, alkynyl, aryl, substituted oxy, substituted sulfonyl, substituted carbonyl, substituted sulfinyl, sulfo, phosphono, phosphonato, silyl, and heterocyclic groups.

m is an integer of two or more, preferably 2 to 6, and more preferably 2 to 3.

$X^-$ in the formula (IV) is the same as $X^-$ in the formula (I) above, and the preferable range is also the same.

Specific examples of the compounds represented by the formula (I), the compounds represented by the formula (III), and the compounds represented by the formula (IV) (exemplary compounds (A-1) to (A-37)) are listed below, but the invention is not restricted by these examples. The log P value of each exemplary compound is also indicated.

| | | logP |
|---|---|---|
| A-1 | | 0.916 |
| A-2 | | 0.835 |
| A-3 | | 0.659 |
| A-4 | | 1.415 |
| A-5 | | 2.503 |
| A-6 | | 3.566 |
| A-7 | | 2.503 |
| A-8 | | 5.545 |

-continued
| | | logP |
|---|---|---|
| A-9 |  | 6.377 |
| A-10 |  | 6.377 |
| A-11 |  | 6.377 |
| A-12 |  | 2.804 |
| A-13 |  | 3.333 |
| A-14 | 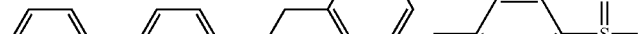 | 4.752 |
| A-15 | 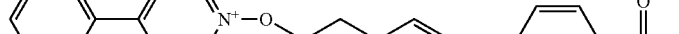 | 4.901 |
| A-16 |  | 5.810 |
| A-17 |  | 6.296 |
| A-18 |  | 6.542 |

-continued

| | | logP |
|---|---|---|
| A-19 | | 6.377 |
| A-20 | | 6.223 |
| A-21 | | 5.663 |
| A-22 | | 8.531 |
| A-23 | | 9.441 |
| A-24 | | 6.587 |
| A-25 | | 6.827 |

-continued
| | | logP |
|---|---|---|
| A-26 | 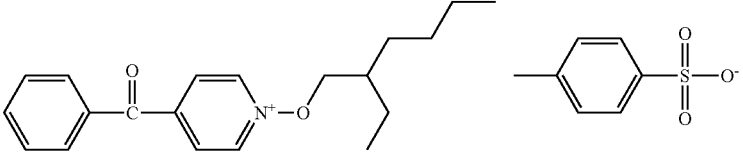 | 5.527 |
| A-27 | 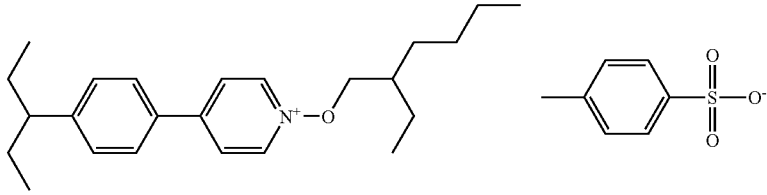 | 6.974 |
| A-28 | 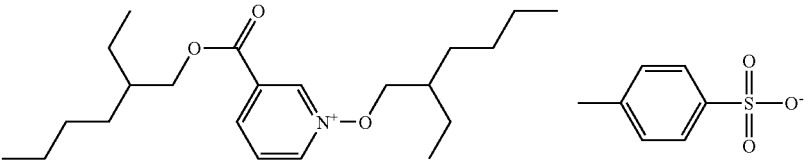 | 8.031 |
| A-29 | 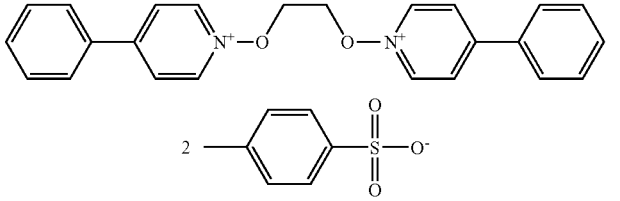 | 5.821 |
| A-30 | 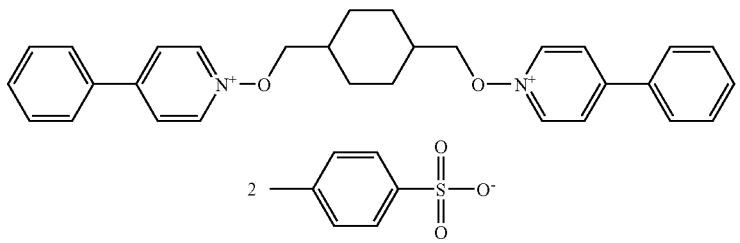 | 6.935 |
| A-31 | 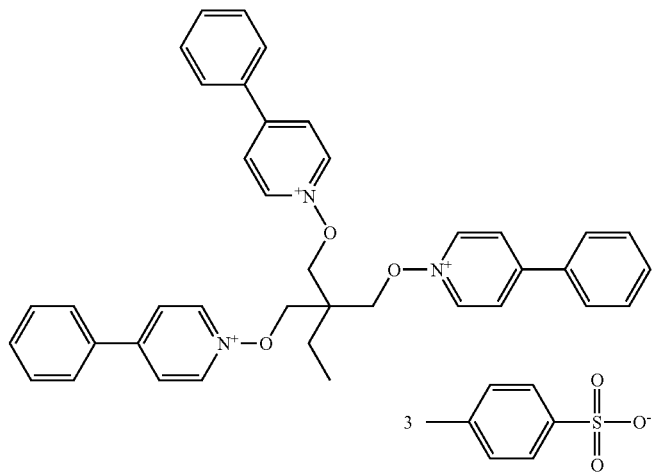 | 10.445 |

-continued

| | | logP |
|---|---|---|
| A-32 | (structure: pyridinium-O-C(=O)-phenyl, Cl⁻) | 1.922 |
| A-33 | (structure: pyridinium-O-C(=O)-O-phenyl, Cl⁻) | 1.922 |
| A-34 | (fused bicyclic pyridinium-O-C(=O)-S, Cl⁻) | 2.021 |
| A-35 | (polymer structure with n=100, ester linkage to ethyleneoxy-N⁺-pyridinium-phenyl, tosylate counterion) | |
| A-36 | (copolymer with blocks n=60 and n=40, ethyleneoxy-N⁺-pyridinium-phenyl and methyl ester, tosylate counterion) | |

A-37

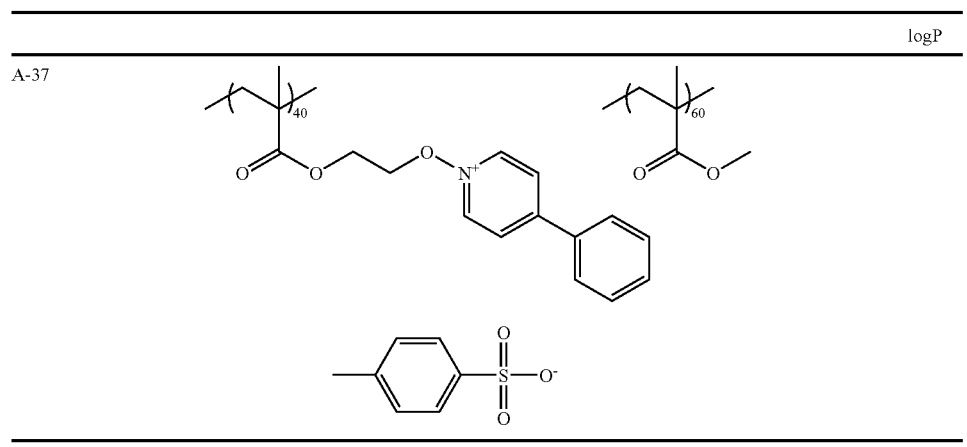

logP

Hereinafter, a method of preparing the exemplary compound (A-9) above will be described as a typical example of preparing the compound represented by formula (I), but the invention is not restricted thereby. Other exemplary compounds can also be synthesized similarly.

<Preparation Example of the Exemplary Compound (A-9)>

(1) Synthesis of 2-ethylhexyl p-toluenesulfonate

In a 1-L round-bottomed flask containing 250 mL of pyridine, added was 75 g of p-toluenesulfonyl chloride. After the reaction solution was cooled to 0° C., 34 g of 2-ethylhexanol was added dropwise over 30 minutes, and the resulting mixture was left at 0° C. while cooled overnight. The reaction solution was poured into cold 1N hydrochloric acid; the product was extracted with ethyl acetate; and the organic layer was washed with 1N hydrochloric acid until the aqueous hydrochloric acid layer became acidic. The organic layer was dried over magnesium sulfate and evaporated, to give 65 g of 2-ethylhexyl p-toluenesulfonate. The fact that the product is the desirable compound was confirmed with NMR, IR, and mass spectrometry spectra.

(2) Synthesis of Exemplary Compound (A-9)

In a 100 mL round-bottomed flask, 2.57 g of 4-phenylpyridine-N-oxide and 4.29 g of 2-ethylhexyl p-toluenesulfonate were placed, and the mixture was stirred at 110° C. for 30 minutes. After the reaction solution was allowed to cool to room temperature and precipitate, the precipitated solid was resuspended in ethyl acetate, filtered, and dried, to give 5.47 g of the exemplary compound (A-9). The fact that the product is the exemplary compound (A-9) was confirmed with NMR, IR, and mass spectrometry spectra.

The content of the compound (A) represented by the formula (I) according to the invention is preferably 0.1 to 50% by mass, more preferably 0.5 to 30% by mass, and still more preferably 5 to 20% by mass, with respect to the total solids contained in the polymerizable composition, similarly to the case when the composition is applied to the recording layer for image recording materials such as planographic printing plate precursor.

The favorable range of the content of the compound (A) in polymerizable composition is the same as that described above even when it is used in the form of the compound represented by formula (III) or (IV).

(B) Infrared Absorbent

The polymerizable composition according to the invention preferably contains an infrared absorbent that absorbs infrared light and converts it into thermal energy. Irradiation of the light having a wavelength that the infrared absorbent can absorb accelerates the radical generation reaction of the radical initiator described below and thus the polymerization reaction of the particular polymerizable compound above. Examples of the infrared absorbents include known photo-selective sensitization colorants as well as dyes or pigments that absorb the light and interact with the photoradical initiator.

Photo-Selective Sensitization Colorant or Dye

Examples of photo-selective sensitization colorants or dyes favorable as the infrared absorbent (B) for use in the invention include polycyclic aromatic compounds (e.g., pyrene, perylene, and triphenylene), xanthenes (e.g., fluorescein, eosin, erythrocin, rhodamine B, and rose bengal), cyanines (e.g., thiacarbocyanine and oxacarbocyanine), merocyanines (e.g., merocyanine and carbomerocyanine), thiazines (e.g., thionine, methylene blue, and toluidine blue), acridines (e.g., acridine orange, chloroflavine, and acriflavine), phthalocyanines (e.g., phthalocyanine and metal phthalocyanines), porphyrins (e.g., tetraphenylporphyrin and central metal-porphyrin complexes), chlorophylls (e.g., chlorophyll, chlorophyllin, and central metal-chlorophyll complexes), metal complexes (e.g., the compounds described below), anthraquinones (e.g., anthraquinone), squaliums (e.g., squalium), and the like.

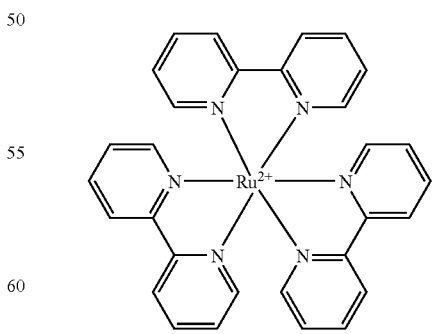

More preferable photo-selective sensitization colorants or dyes include the compounds described in the following patent applications: Pyrylium salts described in JP-B No. 40-28499 such as the followings:

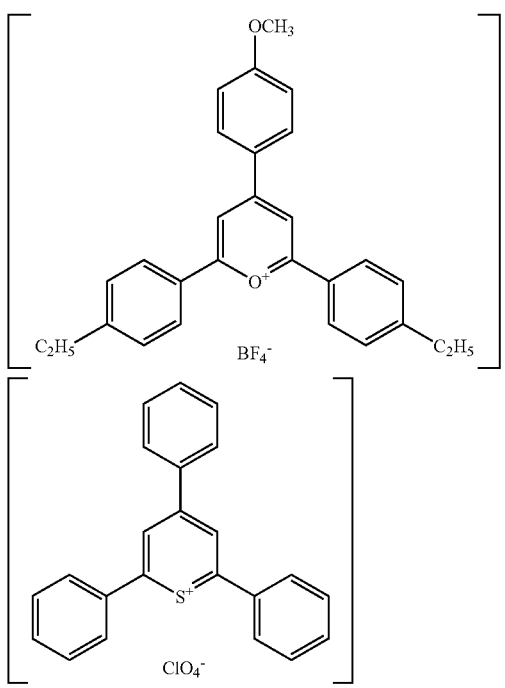

The cyanines described in JP-B No. 46-42363 such as the followings:

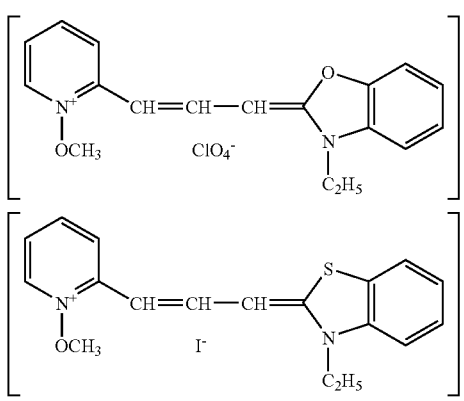

The benzofuran colorants described in JP-A No. 2-63053 such as the followings:

The conjugate ketone colorants described in JP-A Nos. 2-85858 and 2-216154 such as the followings:

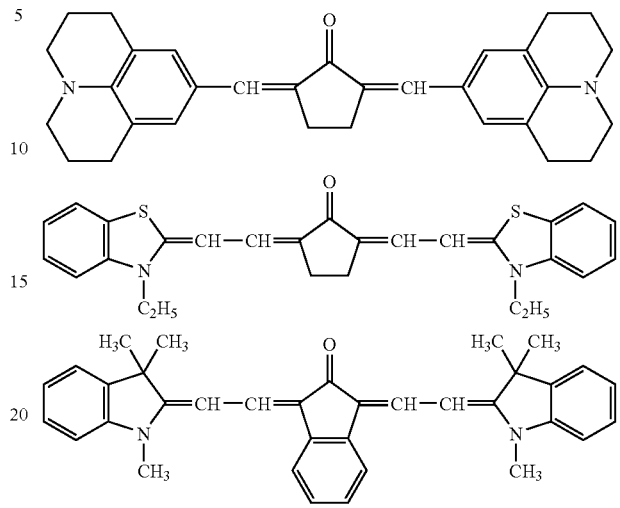

The colorants described in JP-A No. 57-10605 and the azocinnamylidene derivatives described JP-B No. 2-30321 such as the following compound:

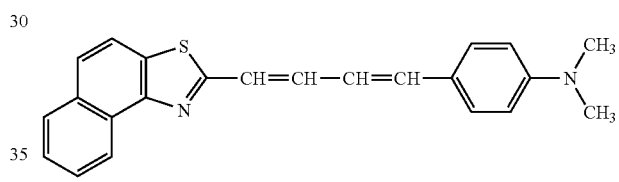

The cyanine colorants described in JP-A No. 1-287105 such as the followings:

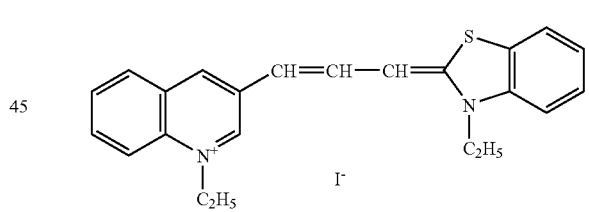

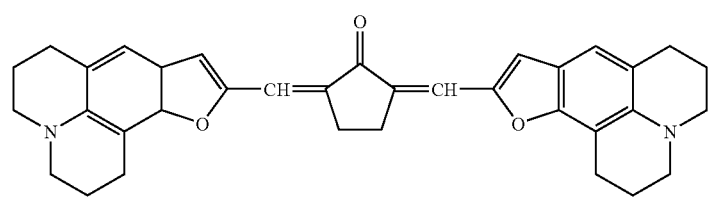

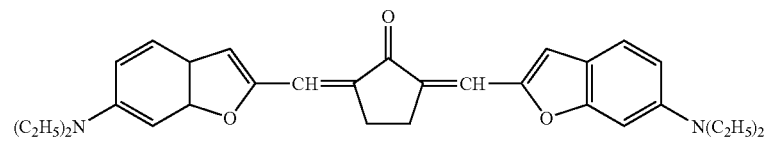

-continued

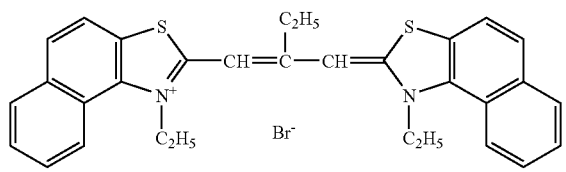

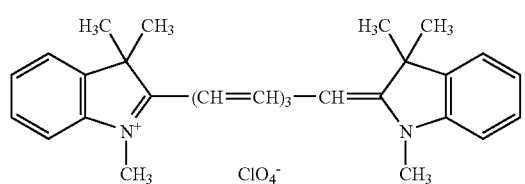

The xanthene colorants described in JP-A Nos. 62-31844, 62-31848, and 62-143043 such as the followings:

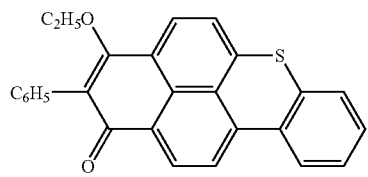

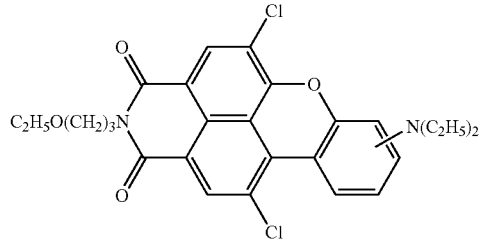

The aminostyrylketones described in JP-B No. 59-28325 such as the followings:

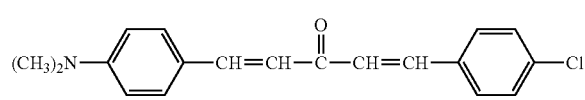

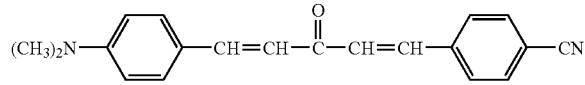

In addition, the following infrared absorbents (dyes or pigments) are also favorably used as the sensitizing colorants. Preferable examples of the dyes include the cyanine dyes described in JP-A Nos. 58-125246, 59-84356, 59-202829, and 60-78787, and others, and the cyanine dyes described in British Patent No. 434,875, and the like.

Other cyanine colorants favorably used in the invention include those described in paragraph numbers [0017] to [0019] of JP-A No. 2001-133969, paragraph numbers [0012] to [0038] of JP-A No. 2002-40638, and paragraph numbers [0012] to [0023] of JP-A No. 2002-23360. Specific examples thereof include the following colorants:

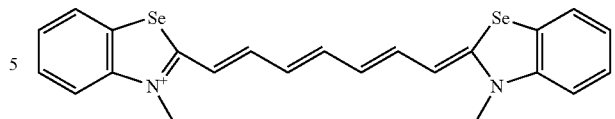

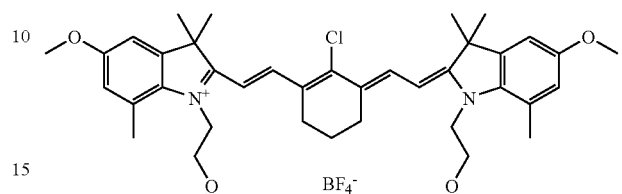

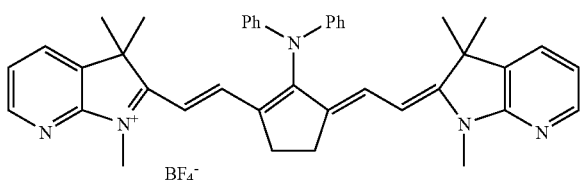

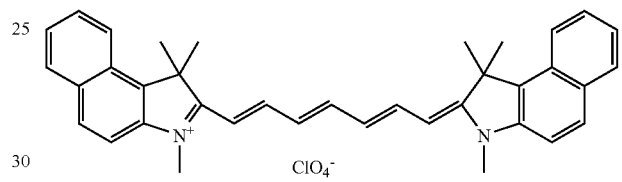

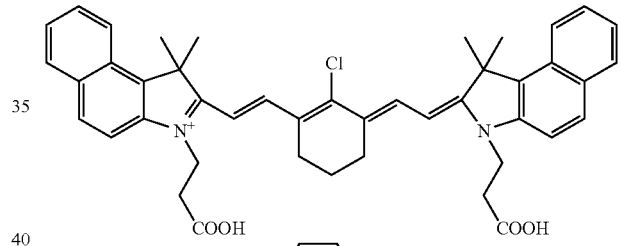

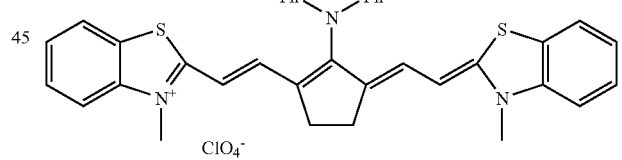

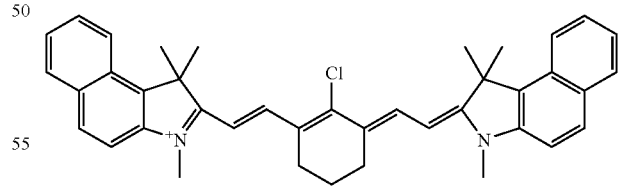

-continued

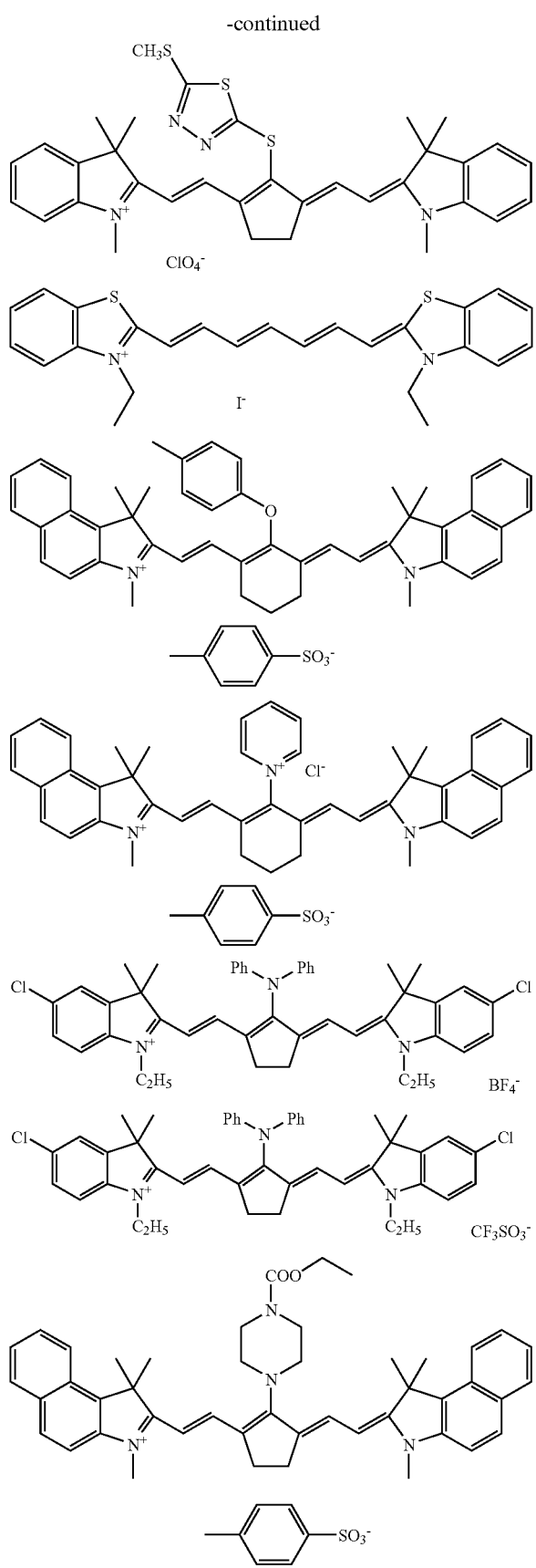

Also favorably used are the infrared-absorbing sensitizers described in U.S. Pat. No. 5,156,938; the arylbenzo(thio) pyrylium salts described in U.S. Pat. No. 3,881,924; the trimethine thiopyrylium salts described in JP-A No. 57-142645 and U.S. Pat. No. 4,327,169; the pyrylium compounds described in JP-A Nos. 58-181051, 58-220143, 59-41363, 5984248, 5984249, 59-146063, and 59-146061; the cyanine colorants described in JP-A No. 59-216146; the pentamethine thiopyrylium salts described in U.S. Pat. No. 4,283,475; and the pyrylium compounds described in JP-B Nos. 5-13514 and 5-19702; and the like.

In addition, the infrared-absorbing dyes represented by the formulae (I) and (II) in U.S. Pat. No. 4,756,993 and the phthalocyanine dyes described in EP 916513A2 are also included in the favorable dyes.

Further, the anionic infrared absorbents described in Japanese Patent Application No. 10-79912 may also be used favorably. The anionic infrared absorbents are infrared absorbents that have no cationic structure but have an anionic structure that practically absorbs infrared tray. Examples thereof include (a) anionic metal complexes, (b) anionic carbon black, (c) anionic phthalocyanines, (d) the compounds represented by the following formula (I), and the like. The counter cations of these anionic infrared absorbents are monovalent or polyvalent cations including a proton ion.

$$[G^9\text{-}M^5\text{-}G^{10}]_m(X^{10})^+ \quad \text{Formula (i)}$$

The anionic metal complexes (a) are metal complexes consisting of a light-absorbing central metal and its ligands that are anionic as a whole.

Examples of the anionic carbon blacks (b) include carbon blacks either having an anionic group such as a sulfonic acid, carboxylic acid, or phosphonic acid group as a substituent group. Each of these anionic groups can be introduced into carbon black, for example, by oxidizing carbon black with a certain acid, as described on p. 12 of "Carbon Black Handbook, Third Ed" (edited and published by the Carbon Black Association of Japan, Apr. 5, 1995).

The anionic phthalocyanines (c) are phthalocyanines having one of the anionic groups described earlier for (b) on the skeleton as a substituent group that are anionic as a whole.

Hereinafter, the compound (d) represented by the formula (i) will be described in detail. In the formula (i) above, $G^9$ represents an anionic substituent group, and $G^{10}$ represents a neutral substituent group. $(X^{10})^+$ represents a mono- to n-valent cation including a proton ion; and m is an integer of 1 to 6. $M^5$ represents a conjugated chain which may have a substituent group or a ring structure. The conjugated chain $M^5$ can be represented by the following formula.

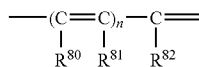

In the formula, $R^{80}$, $R^{81}$, and $R^{82}$ each independently represent a hydrogen atom, or a halogen, cyano, alkyl, aryl, alkenyl, alkynyl, carbonyl, thio, sulfonyl, sulfinyl, oxy, or amino group; and may bind to each other, forming a ring structure. n is an integer of 1 to 8.

Among the anionic infrared absorbents represented by the formula (i) above, the following absorbents IRA-1 to IRA-5 are preferably used.

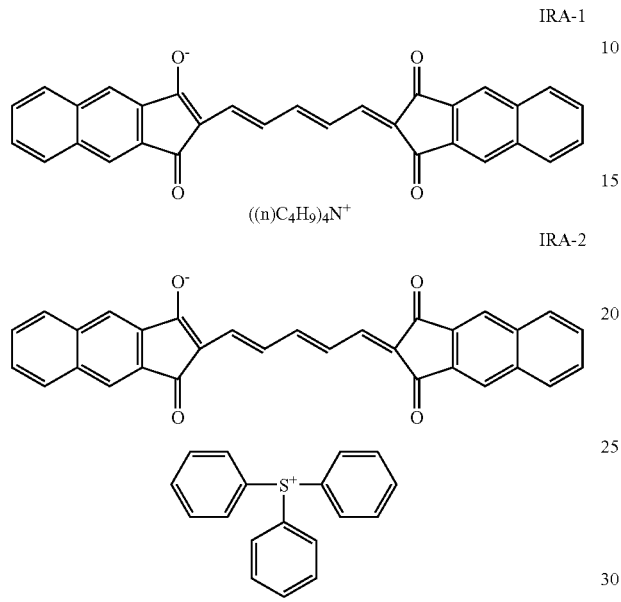

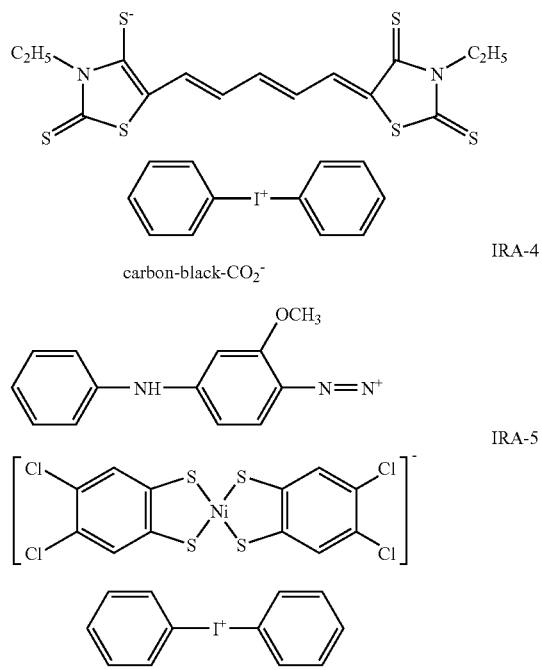

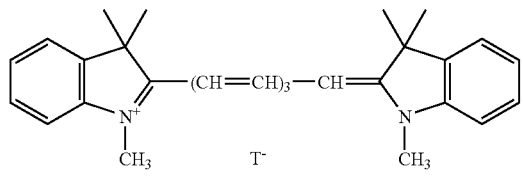

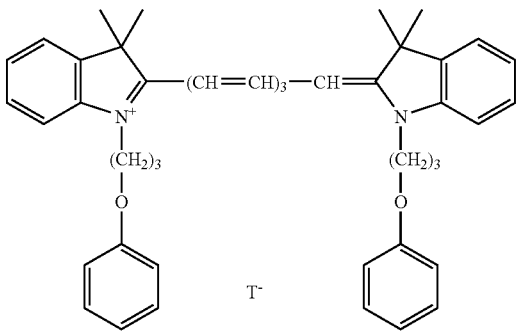

The cationic infrared absorbents represented by the following formulae IRC-1 to IRC-44 are also used favorably.

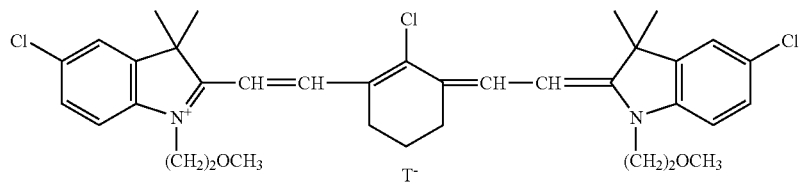

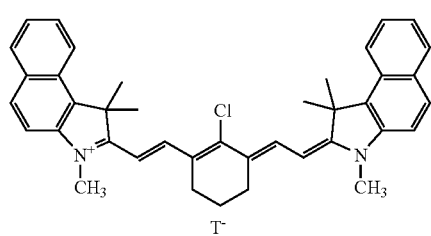

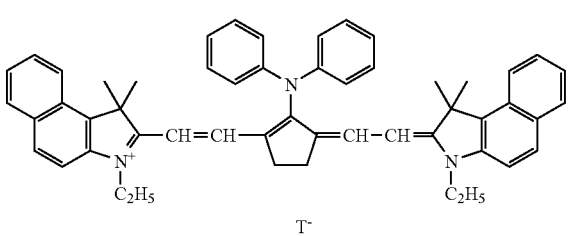

-continued
IRC-6
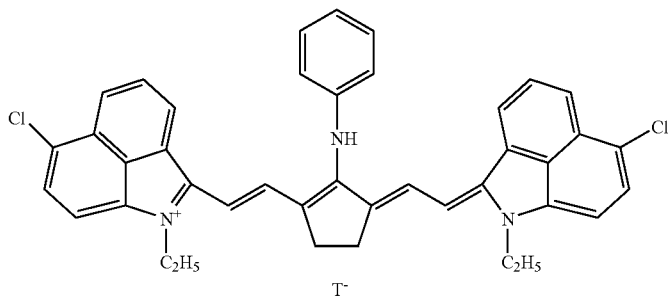
IRC-7
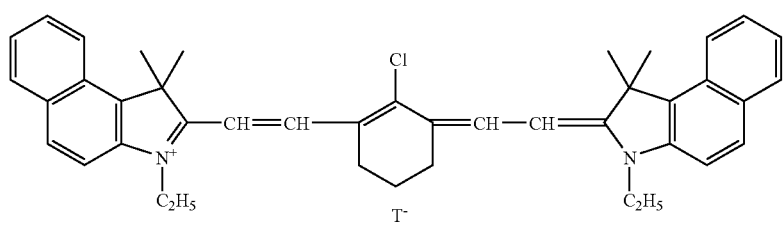
IRC-8
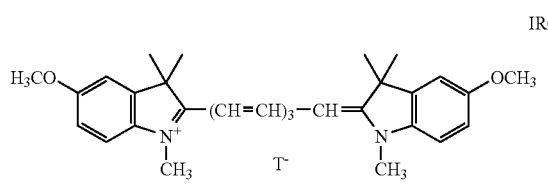
IRC-9
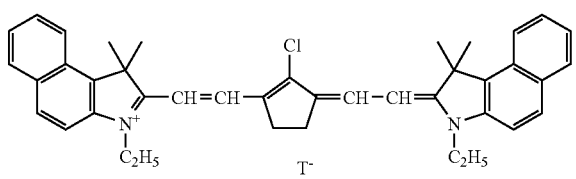
IRC-10
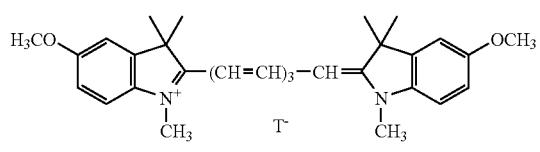
IRC-11
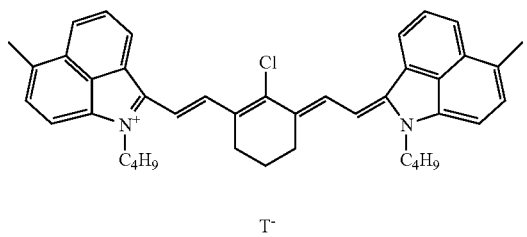
IRC-12
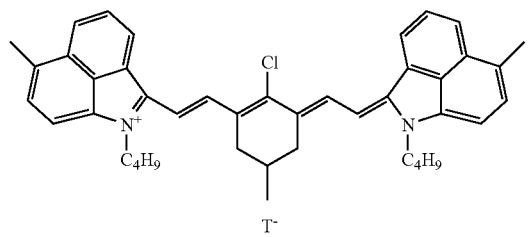
IRC-13
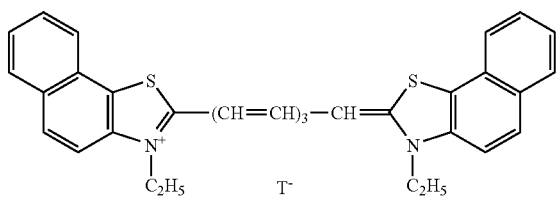
IRC-14
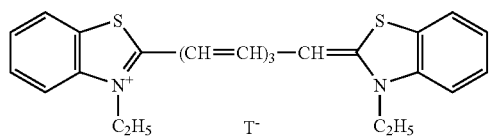
IRC-15
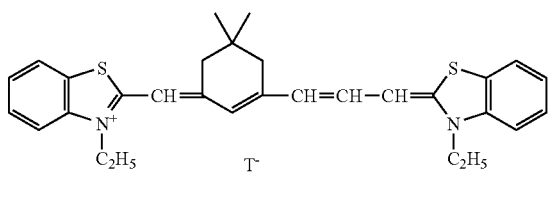

-continued
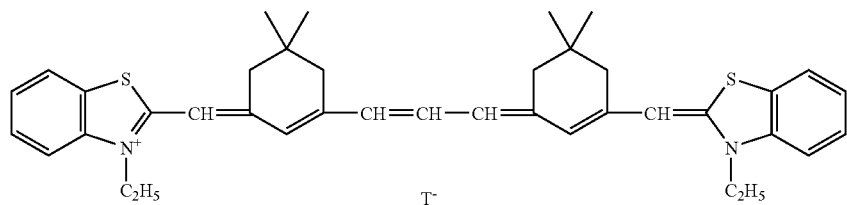
IRC-16
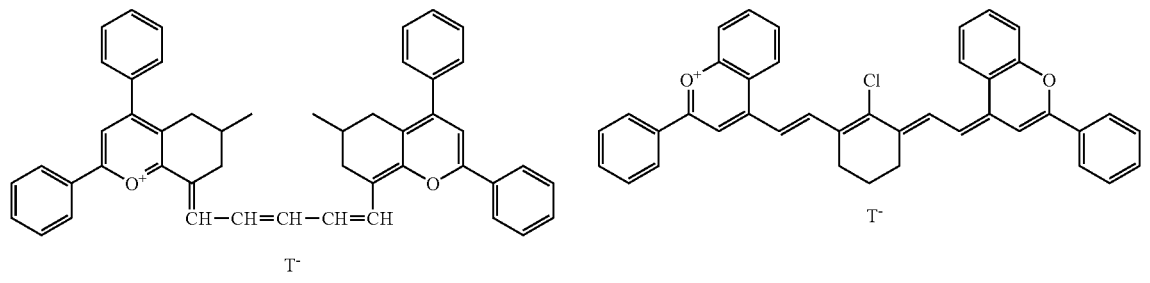
IRC-17   IRC-18
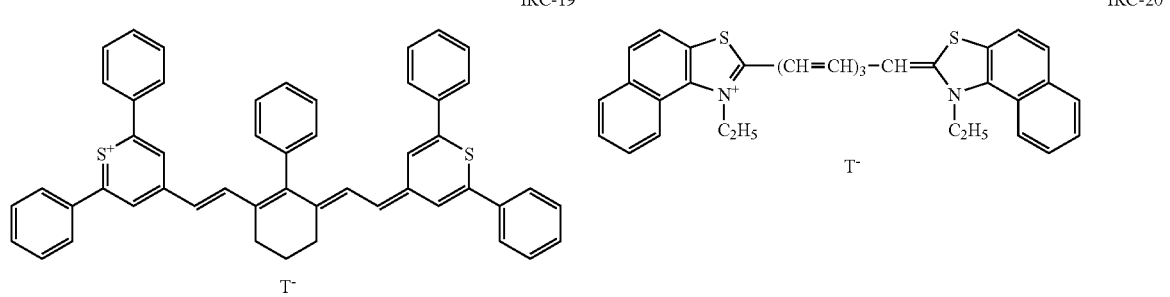
IRC-19   IRC-20
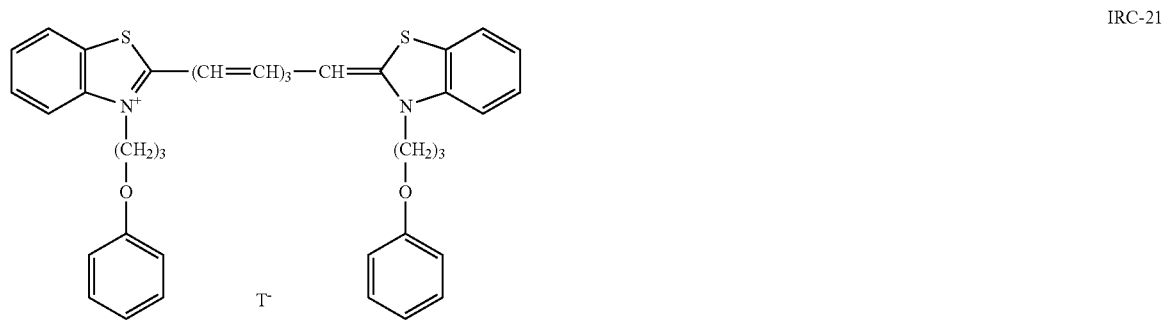
IRC-21
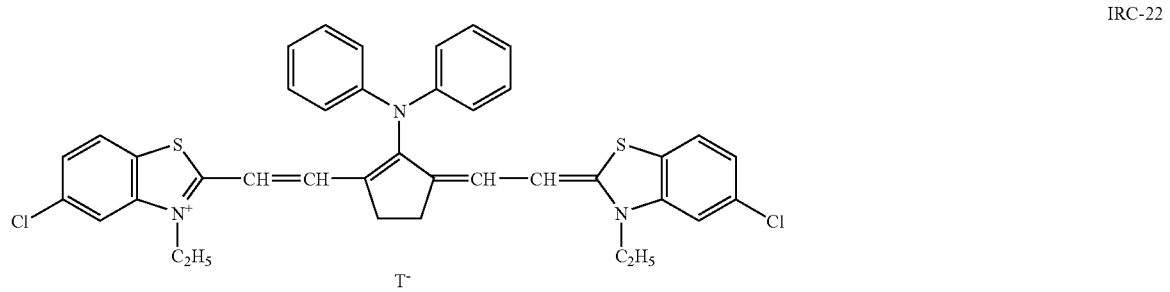
IRC-22
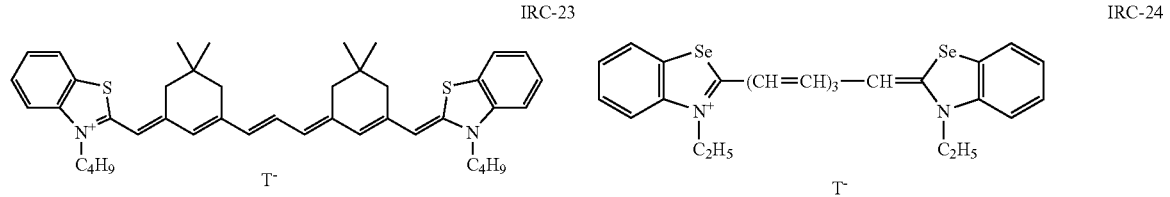
IRC-23   IRC-24

-continued
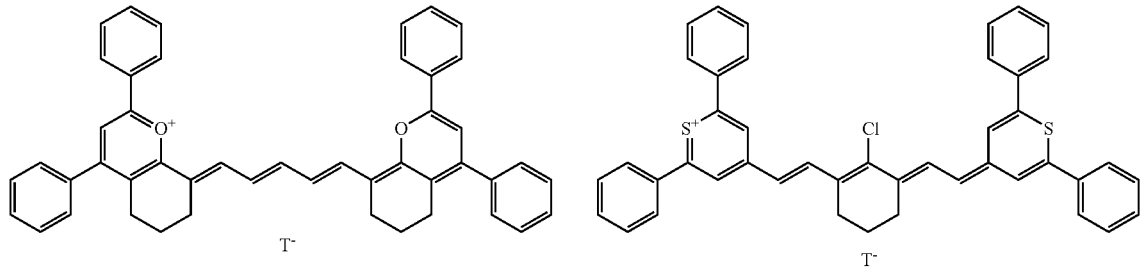
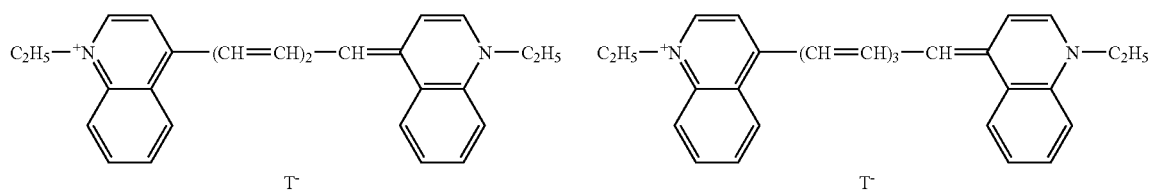
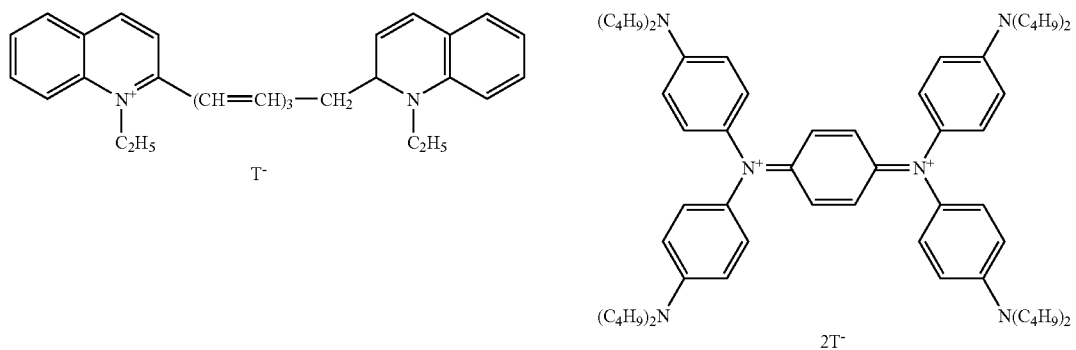
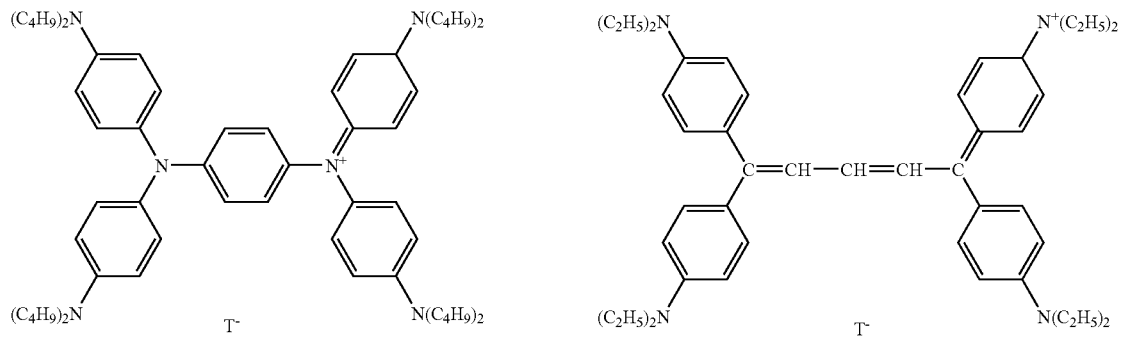
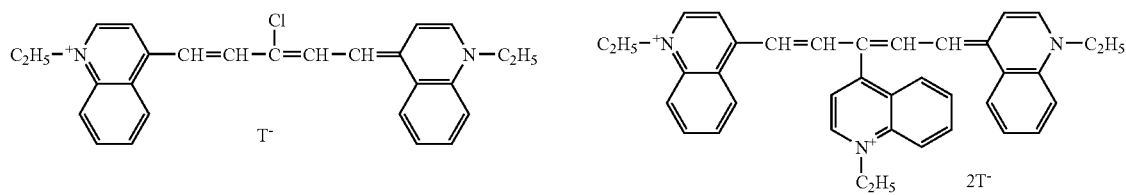

-continued
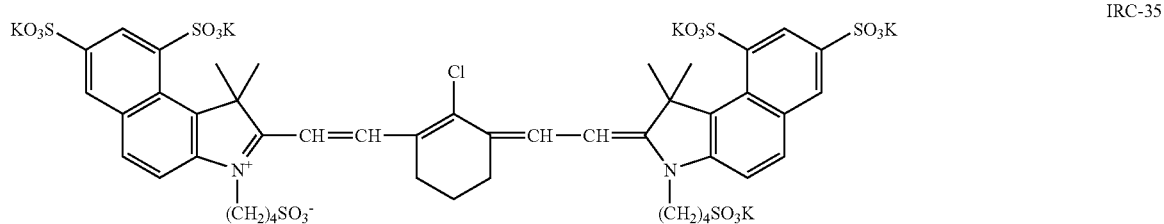
IRC-35
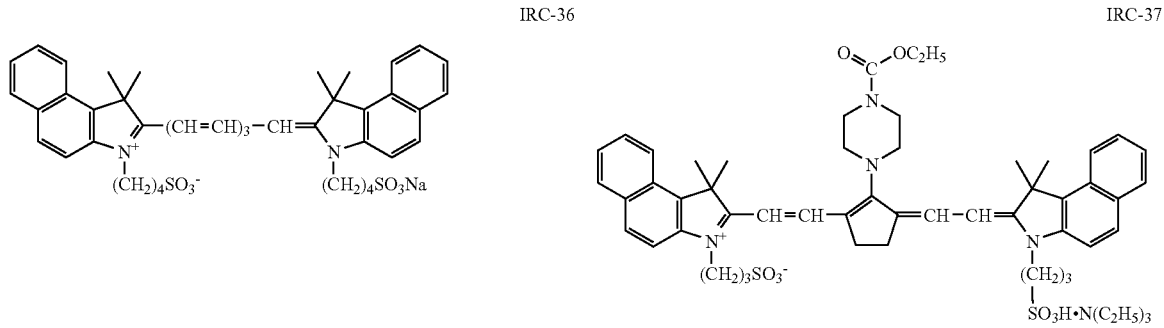
IRC-36
IRC-37
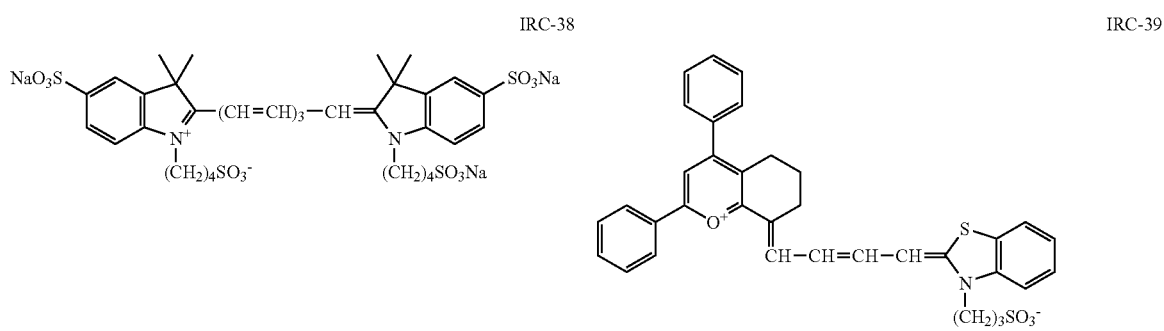
IRC-38
IRC-39
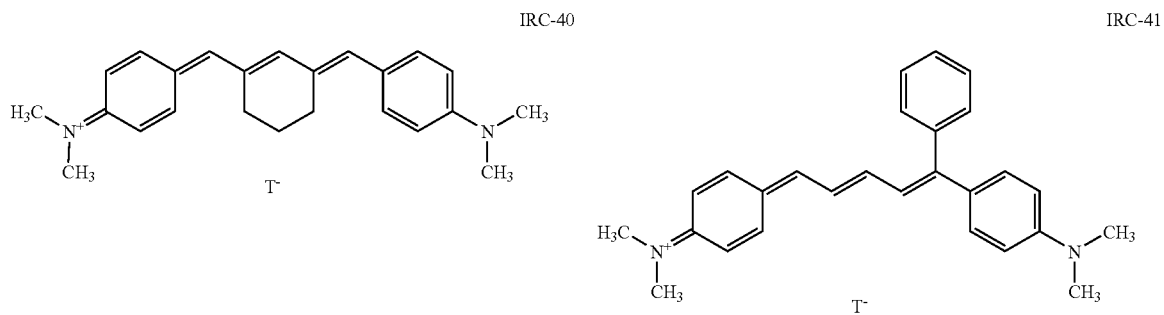
IRC-40
IRC-41
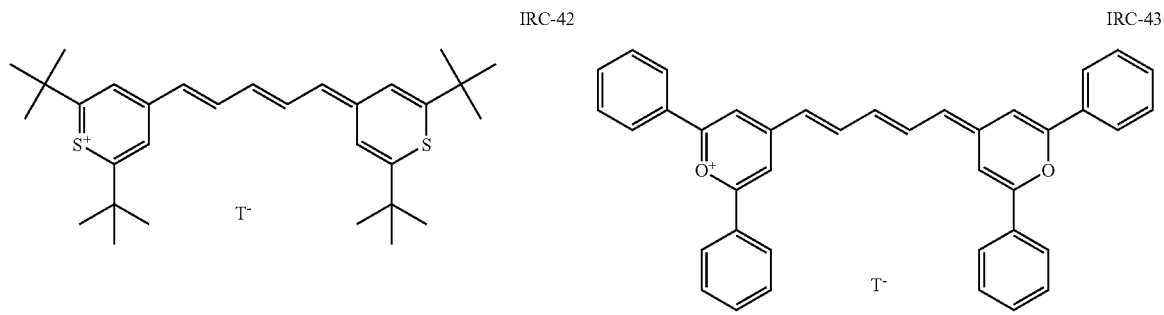
IRC-42
IRC-43

-continued

IRC-44

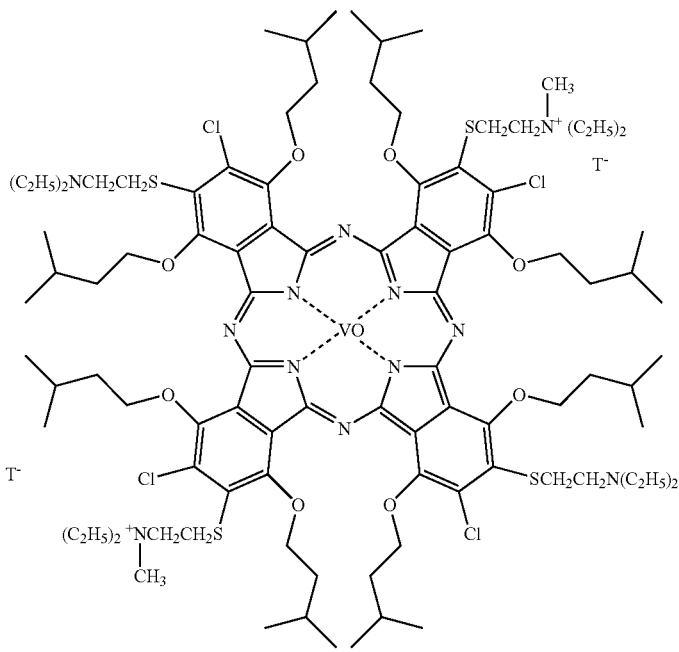

In the structural formulae above, T⁻ represents a monovalent counter anion, preferably a halogen anion (F⁻, Cl⁻, Br⁻, or I⁻), a Lewis acid anion ($BF_4^-$, $PF_6^-$, $SbCl_6^-$, or $ClO_4^-$), an alkylsulfate anion, or an aryl sulfonate anion.

The alkyl group in the alkylsulfuric acid above means a straight-chain, branched-chain or cyclic alkyl group having 1 to 20 carbon atoms, and specific examples thereof include methyl, ethyl, propyl, butyl, pentyl, hexyl, heptyl, octyl, nonyl, decyl, undecyl, dodecyl, tridecyl, hexadecyl, octadecyl, eicosyl, isopropyl, isobutyl, s-butyl, t-butyl, isopentyl, neopentyl, 1-methylbutyl, isohexyl, 2-ethylhexyl, 2-methylhexyl, cyclohexyl, cyclopentyl, and 2-norbornyl groups. Among them, straight-chain alkyl groups having 1 to 12 carbon atoms, branched-chain alkyl groups having 3 to 12 carbon atoms, and cyclic alkyl group having 5 to 10 carbon atoms are more preferable.

Alternatively, the aryl group in the aryl sulfonic acid above means an aryl group having one benzene ring, a fused ring of two or three benzene rings, or a fused ring of a benzene ring and a five-membered unsaturated ring; and specific examples thereof include phenyl, naphthyl, anthryl, phenanthryl, indenyl, acenaphthenyl, and fluorenyl groups; and among them, phenyl and naphthyl groups are more preferable.

In addition, the nonionic infrared absorbents represented by the following formulae IRN-1 to IRN-9 may also be used preferably.

IRN-1

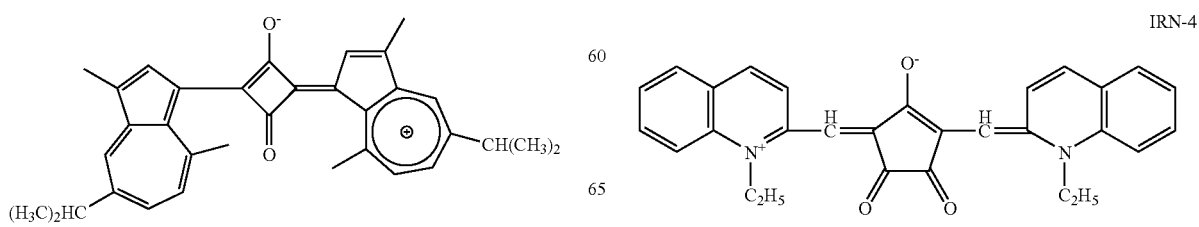

IRN-2

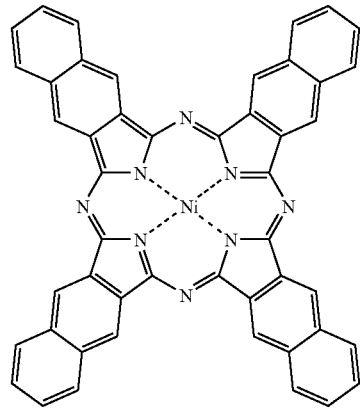

IRN-3

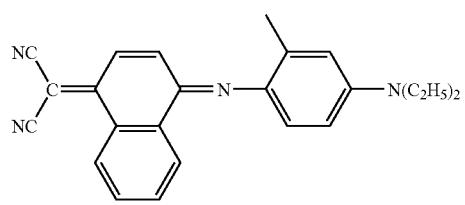

IRN-4

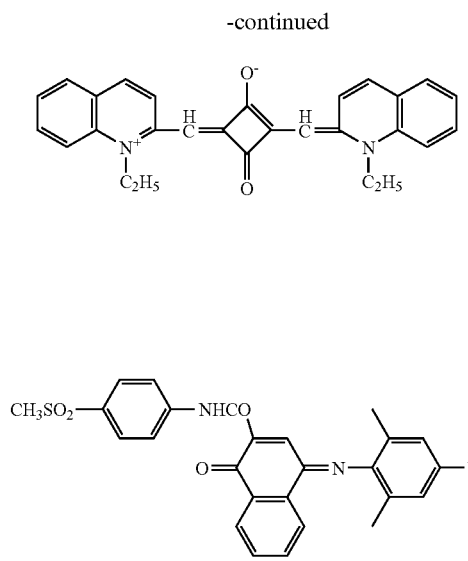

IRN-5

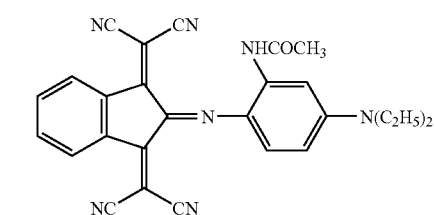

IRN-6

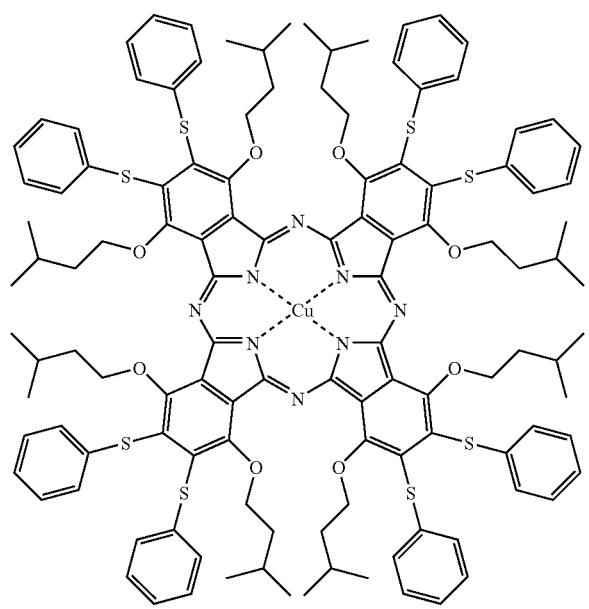

IRN-7

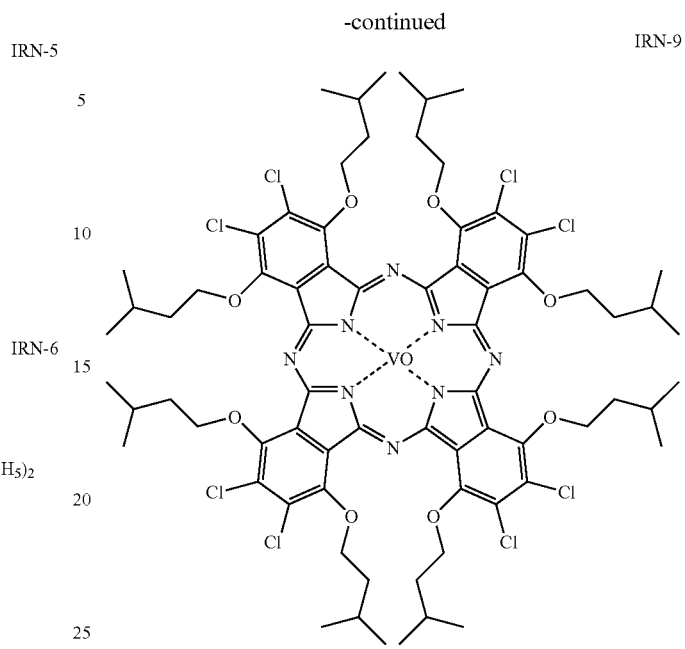

IRN-8

IRN-9

Among the exemplary compounds above, a particularly preferable anionic infrared absorbent is IRA-1; particularly preferable cationic infrared absorbents are IRC-7, IRC-30, IRC-40, and IRC-42; and a particularly preferable nonionic infrared absorbent is IRN-9.

Pigment

The pigments for use in the invention include commercially available pigments and the pigments described in "Color Index (C.I) Handbook" and "Pigment Handbook" (Japan Society of pigment technologies Ed., 1977), "State-of-the-art Pigment Application Technologies" (CMC publication, 1986), and "Printing Ink technologies" (CMC Publishing, 1984).

Examples of the pigments include black pigments, yellow pigments, orange pigments, brown pigments, red pigments, purple pigments, blue pigments, green pigments, fluorescent pigments, metal powder pigments, as well as polymer-bound colorants. Specific examples thereof include insoluble azo pigments, azolake pigments, condensation azo pigments, chelate azo pigments, phthalocyanine pigments, anthraquinone pigments, perylene and perynone pigments, thioindigo pigments, quinacridone pigments, dioxazine pigments, isoindolinone pigments, quinophtharone pigments, dyed lake pigments, azine pigments, nitroso pigments, nitro pigments, natural pigments, fluorescent pigments, inorganic pigments, carbon black, and the like. Among these pigments, preferable is carbon black.

These pigments may be used either with or without surface treatment. The methods for the surface treatment include methods of coating a resin or wax on the surface of pigment; of attaching a surfactant; of binding a reactive substance (e.g., a silane coupling agent, epoxy compound, polyisocyanate, or the like) to the surface of pigment; and the like. The surface treatment methods above are described in "Properties and Applications of Metal Soaps" (Saiwai Shobo), "Printing Ink Technologies" (CMC Publishing, 1984) and "State-of-the-art Pigment Application Technologies" (CMC Publishing, 1986).

The particle diameter of the pigment is preferably in the range of 0.01 to 10 μm, more preferably of 0.05 to 1 μm, and particularly preferably of 0.1 to 1 μm. Pigments having a particle diameter of less than 0.01 μm are not favorable from the point of the stability of the dispersion in recording layer-coating solution, while those having a particle diameter of over 10 μm from the uniformity of recording layer.

For dispersing a pigment, any one of the dispersion techniques known in the art that are used for production of inks, toners, and the like may be used. Suitable dispersing machines include ultrasonic dispersing machine, sand mill, attriter, pearl mill, super mill, ball mill, impeller, disperser, KD mill, colloid mill, dynatron, three roll mill, pressurized kneader, and the like. More detailed description on such dispersing machines is found in the "State-of-the-art Pigment Application Technologies" (CMC Publishing, 1986).

The infrared absorbent for acceleration of the curing reaction of the polymerizable composition according to the invention may be added directly into the composition together with other components, but it is possible to obtain the same advantageous effects if it is added into a neighboring separate layer.

In particular when used as a material for the negative type recording layer of image-recording material described below, the polymerizable composition according to the invention may be added to the layer identical with the recording layer or to a layer separately formed; but when a negative image-recording material is prepared, the optical density of the recording layer is preferably in the range of 0.1 to 3.0 as absorption maximum in the wavelength range of 300 to 1,200 nm, from the viewpoint of sensitivity. The optical density depends on the amount of the sensitizing colorant added and the thickness of the recording layer, and thus a desirable optical density can be achieved by controlling these two conditions. The optical density of recording layer can be determined by any one of common methods. Examples of the measurement methods include a method of forming a recording layer having a post-drying thickness properly selected in the range suitable for planographic printing plate on a transparent or white substrate and measuring the optical density thereof with a transmission optical densitometer, a method of forming the recording layer on a reflexible support such as aluminum and measuring the reflection density thereof, and the like.

Alternatively, the content of the infrared absorbent in the polymerizable composition according to the invention is preferably 0.01 to 20% by mass, more preferably 0.01 to 10% by mass, and particularly preferably 0.02 to 5% by mass with respect to the total solid content in the polymerizable composition, as in the case when it is added to the recording layer of image-recording material.

(C) Compound Having at Least One Addition-Polymerizable Ethylenically Unsaturated Bond The compound having at least one addition-polymerizable ethylenically unsaturated bond for use in the polymerizable composition according to the invention (hereinafter, referred to as "addition-polymerization compound") is selected from compounds having at least one, preferably two or more, ethylenically unsaturated bond. These compounds are well known in the art, and any one of them may be used in the invention without restriction. For example, these compounds have the chemical forms of monomer, prepolymer (i.e., dimer or trimer), and oligomer, or the mixture or the copolymer thereof. Favorable examples of the monomers and the copolymers thereof include unsaturated carboxylic acids (e.g., acrylic acid, methacrylic acid, itaconic acid, crotonic acid, isocrotonic acid, maleic acid, etc.) and the esters and amides thereof, and esters from an unsaturated carboxylic acid and an aliphatic polyvalent alcohol compound, and amides from an unsaturated carboxylic acid and an aliphatic polyvalent amine compound. Addition products from an unsaturated carboxylic ester or amide having a nucleophilic substituent such as a hydroxyl, amino, or mercapto group and a monofunctional or polyfunctional isocyanate or epoxy compound, dehydration condensation products with a monofunctional or polyfunctional carboxylic acid, and the like are also used favorably. Addition products from an unsaturated carboxylic ester or amides having an electrophilic substituent such as an isocyanate or epoxy group and a monofunctional or polyfunctional alcohol, amine, thiol, or the like, and substitution products from an unsaturated carboxylic ester or amide having a nonmagnetic substituent such as a halogen or tosyloxy group and a monofunctional or polyfunctional alcohol, amine, thiol, or the like are also favorable. Further, it is possible to use the compounds above of which the unsaturated carboxylic acid above is replaced by an unsaturated phosphonic acid, styrene, vinyl ether.

Specific examples of the ester monomers from an aliphatic polyvalent alcohol compound and an unsaturated carboxylic acid include acrylic esters such as ethylene glycol diacrylate, triethylene glycol diacrylate, 1,3-butanediol diacrylate, tetramethylene glycol diacrylate, propylene glycol diacrylate, neopentylglycol diacrylate, trimethylolpropane triacrylate, trimethylolpropane tri(acryloyloxypropyl)ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl)isocyanurate, polyester acrylate oligomers.

Examples of the methacrylic esters include tetramethylene glycol dimethacrylate, triethylene glycol dimethacrylate, neopentylglycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy-2-hydroxypropoxy)phenyl]dimethylmethane, bis-[p-methacryloxyethoxy)phenyl]dimethylmethane.

Examples of the itaconic esters include ethylene glycol diitaconate, propylene glycol diitaconate, 1,3-butanediol diitaconate, 1,4-butanediol diitaconate, tetramethylene glycol diitaconate, pentaerythritol diitaconate, sorbitol tetraitaconate. Examples of the crotonic esters include ethylene glycol dicrotonate, tetramethylene glycol dicrotonate, pentaerythritol dicrotonate, sorbitol tetradicrotonate, and the like. Examples of the isocrotonic esters include ethylene glycol diisocrotonate, pentaerythritol diisocrotonate, sorbitol tetraisocrotonate. Examples of the maleic esters include ethylene glycol dimaleate, triethylene glycol dimaleate, pentaerythritol dimaleate, sorbitol tetramaleate.

Examples of other favorable esters include the aliphatic alcohol esters described in JP-B Nos. 46-27926 and 51-47334 and JP-A No. 57-196231; the compounds having an aromatic skeleton described in JP-A Nos. 59-5240, 59-5241, and 2-226149; the compounds having an amino group described in JP-A No. 1-165613; and the like. Further, the ester monomers may be used as a mixture.

Specific examples of the amide monomers from an aliphatic polyvalent amine compound and an unsaturated carboxylic acid include methylene bisacrylamide, methylene bismethacrylamide, 1,6-hexamethylene-bis-acrylamide, 1,6- hexamethylene-bis-methacrylamide, diethylenetriamine trisacrylamide, xylylene bisacrylamide, xylylene bismethacrylamide, and the like. Examples of other preferable amide monomers include the compounds having a cyclohexylene structure described in JP-B No. 54-21726.

Urethane-based addition polymerization compounds produced by addition reaction of an isocyanate and a hydroxyl group-containing compounds are also favorable, and specific examples thereof include the urethane compounds containing two or more polymerizable vinyl groups described in JP-B No. 48-41708, which are prepared by reacting a polyisocyanate compound having two or more isocyanate groups in the molecule with two or more vinyl monomers containing the hydroxyl group represented by the following formula (ii)

$$CH_2=C(R^4)COOCH_2CH(R^5)OH \quad \text{Formula (ii)}$$

(wherein, $R^4$ and $R^5$ each represent H or $CH_3$.)

In addition, the urethane acrylates described in JP-A No. 51-37193, and JP-B Nos. 2-32293 and 2-16765; and the urethane compounds having an ethylene oxide skeleton described in JP-B Nos. 58-49860, 56-17654, 62-39417, and 62-39418 are also favorable. Further, use of the addition-polymerization compounds having an amino or sulfide structure in the molecule described in JP-A Nos. 63-277653, 63-260909, and 1-105238 gives photopolymerizable compositions significantly higher in sensitization speed.

Other examples thereof include polyfunctional acrylates and methacrylates such as the polyester acrylates described in JP-A No. 4864183, JP-B Nos. 49-43191 and 52-30490, and others; epoxy acrylates prepared in a reaction of an epoxy resin with (meth)acrylic acid; and the like. Also included are the particular unsaturated compounds described in JP-B Nos. 46-43946, 1-40337, and 140336; the vinyl phosphonic acid compounds described in JP-A No. 2-25493; and the like. In some cases, the compounds having a perfluoroalkyl group described in JP-A No. 61-22048 are used favorably. Further, the photo-curing monomers and oligomers described in J. Adhesion Soc. Jpn. vol. 20, No. 7, pp. 300 to 308 (1984) may also be used.

Detailed conditions of using these addition-polymerization compounds, for example in its structure, single or combined use, and amount of use, may be determined arbitrarily according to the desired performance of the final planographic printing plate precursor. For example, the compound is selected as follows: A structure having more unsaturated groups per molecule is preferable, and thus a bivalent or higher-valent compound is preferable from the point of sensitization speed. In addition, a trivalent or higher-valent compound is preferable for increasing the strength of image region, i.e., cured film. Further, it is effective to use additionally a compound different in valency and polymerizable group (e.g., acrylic ester, methacrylic ester, styrene compound, of vinyl ether compound) for adjustment of both the photosensitivity and the strength of the resulting image region. A high-molecular weight compound or a more hydrophobic compound is advantageous from the points of sensitization speed and film strength, but often disadvantageous from the points of development speed and the precipitation in developing solution. Further, compatibility with other components (e.g., with binder polymer, initiator, or coloring agent) and dispersibility in photosensitive layer are also important factors in selecting or using the addition-polymerization compound, and for example, it is sometimes possible to increase the compatibility by using a low-purity compound or a mixture of two or more. In addition, a particular structure may be selected for the purpose of improving the adhesion between the support and a layer such as the overcoat layer described below. The content of the addition-polymerization compound in the photosensitive layer is advantageously higher for improvement in sensitivity, but an excessively higher content may lead to phase separation or raise the problems in production processes due to the adhesiveness of the photosensitive layer (e.g., defective products caused by transfer or adhesion of the photosensitive layer components), the problems associated with precipitation thereof in the developing solution, and others.

For that reasons, the addition-polymerization compound is used in an amount in the range of preferably 5 to 80% by mass, more preferably 25 to 75% by mass, with respect to the nonvolatile components in the recording layer. These compounds may be used alone or in combination of two or more. In addition, the structure, composition, and addition amount of the addition-polymerization compound may be selected arbitrarily, considering the extent of polymerization inhibition by oxygen, resolution, background soil, change in refractive index, surface adhesiveness, and others. Further, the planographic printing plate precursor may have plurarity of layers such as upper layer and lower layer, and those of the addition-polymerization compound may be selected, considering the constitution of the layers and a coating method thereof.

(D) Binder Polymer Having at Least One Radically Polymerizable Group on the Side Chain In addition to the components (A) to (C), the polymerizable composition according to the invention preferably contains a binder polymer having at least one radically polymerizable group on the side chain (D) (hereinafter, referred to as "particular binder polymer").

The radically polymerizable group contained in the particular binder polymer is not particularly limited if it polymerizes radically, and examples thereof include α-substituted methylacryl groups [—OC(=O)—C(=CH$_2$Z)=CH$_2$, wherein Z is a hydrocarbon group connected to a heteroatom] and acryl, methacryl, allyl, and styryl groups.

More specifically, the radically polymerizable groups represented by the following formulae (A) to (C) are preferable.

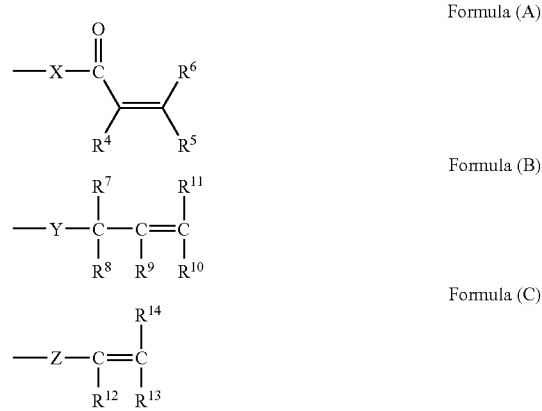

In the formulae (A) to (C), $R^4$ to $R^{14}$ each independently represent a hydrogen atom or a monovalent substituent group. X and Y each independently represent an oxygen atom, a sulfur atom, or —N—$R^{15}$; and Z represents an oxygen atom, a sulfur atom, —N—$R^{15}$, or a phenylene group. $R^{15}$ represents a hydrogen atom or a monovalent organic group.

In the formula (A) above, $R^4$ to $R^6$ each independently represent a hydrogen atom or a monovalent substituent group; $R^4$ represents a hydrogen atom or an organic group such as an alkyl group which may be substituted; and typical favorable examples thereof include a hydrogen atom and methyl, methylalkoxy, and methyl ester groups. In addition, $R^5$ and $R^6$ each independently represent a hydrogen or halogen atom, an amino, dialkylamino, carboxyl, alkoxycarbonyl, sulfo, nitro, or cyano group, an alkyl group which may be substituted, an aryl group which may be substituted, an alkoxy group which may be substituted, an aryloxy group which may be substituted, an alkylamino group which may be substituted, an arylamino group which may be substituted, an alkylsulfonyl group which may be substituted, an arylsulfonyl group which may be substituted, or the like; and among them, a hydrogen atom, a carboxyl group, alkoxycarbonyl groups, alkyl groups which may be substituted, and aryl groups which may be substituted are preferable.

Examples of the substituent groups to be introduced onto these groups include methoxycarbonyl, ethoxycarbonyl, isopropoxycarbonyl, methyl, ethyl, and phenyl groups.

X represents an oxygen or sulfur atom or $-N-R^{15}$, and examples of $R^{15}$ include alkyl groups which may be substituted and the like.

In the formula (B), $R^7$ to $R^{11}$ each independently represent a hydrogen atom or a monovalent substituent group; specific examples thereof include a hydrogen atom, halogen atoms, amino, dialkylamino, carboxyl, alkoxycarbonyl, sulfo, nitro, and cyano groups, alkyl groups which may be substituted, aryl groups which may be substituted, alkoxy groups which may be substituted, aryloxy groups which may be substituted, alkylamino groups which may be substituted, arylamino groups which may be substituted, alkylsulfonyl groups which may be substituted, arylsulfonyl groups which may be substituted, and the like; and among them, a hydrogen atom, a carboxyl group, alkoxycarbonyl groups, alkyl groups which may be substituted, and aryl groups which may be substituted are preferable.

The substituent groups that may be introduced onto these groups include those described as the substituent groups in the formula (A).

Y represents an oxygen atom, a sulfur atom, or $-N-R^{15}$. Examples of the $R^{15}$ group include groups similar to those in the formula (A).

In the formula (C), $R^{12}$ to $R^{14}$ each independently represent a hydrogen atom or a monovalent substituent group; specific examples thereof include hydrogen and halogen atoms, amino, dialkylamino, carboxyl, alkoxycarbonyl, sulfo, nitro, and cyano groups, alkyl groups which may be substituted, aryl groups which may be substituted, alkoxy groups which may be substituted, aryloxy groups which may be substituted, alkylamino groups which may be substituted, arylamino groups which may be substituted, alkylsulfonyl groups which may be substituted, arylsulfonyl groups which may be substituted, and the like; and among them, a hydrogen atom, a carboxyl group, alkoxycarbonyl groups, alkyl groups which may be substituted, aryl groups which may be substituted are preferable.

Examples of the substituent groups that may be introduced onto these groups include those described in the formula (A).

Z represents an oxygen atom, a sulfur atom, $-N-R^{15}$, or a phenylene group. Examples of $R^{15}$ include groups similar to those described in the formula (A).

The polymers containing a radically polymerizable group having a structure represented by the formula (A) above can be prepared by at least one of the following synthetic methods (1) and (2).

—Synthetic Method (1)—

Method of obtaining a desired polymeric compound by preparing a polymeric compound by polymerizing one or more of the radical-polymerizable compounds represented by the following formula (D) and eliminating the proton and the $Z^1$ group by using a base.

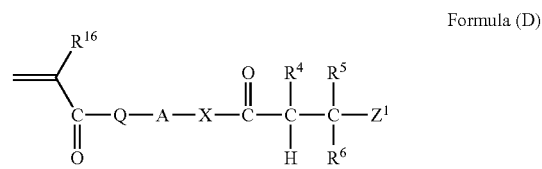

Formula (D)

In the formula (D), $R^4$ to $R^6$ are the same as $R^4$ to $R^6$ in the formula (A) above. Z, is an anionic group to be eliminated. Q represents an oxygen atom, $-NH-$, or $NR^{17}-$ (wherein, $R^{17}$ represents an alkyl group which may have one or more substituents). Examples of $R^{16}$ include a hydrogen atom, alkyl groups which may be substituted, and the like; and among them, a hydrogen atom, and methyl, methylalkoxy, and methyl ester groups are preferable. A represents a bivalent organic connecting group.

Examples of the radical-polymerizable compounds represented by the formula (D) include, but are not limited to, the following compounds.

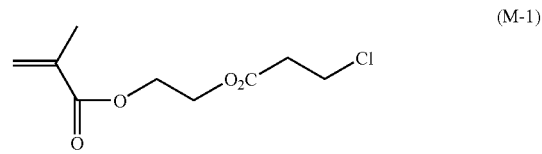
(M-1)

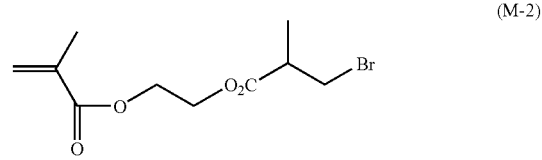
(M-2)

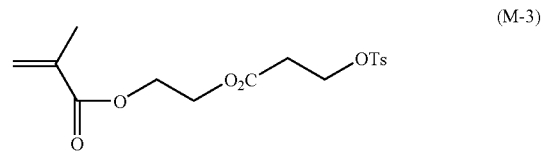
(M-3)

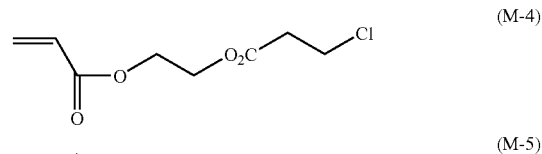
(M-4)

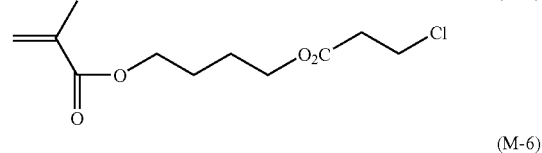
(M-5)

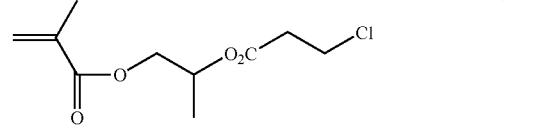
(M-6)

-continued

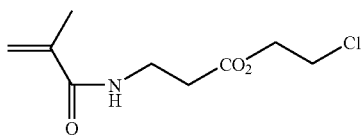 (M-7)

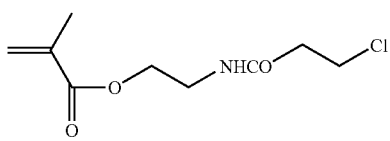 (M-8)

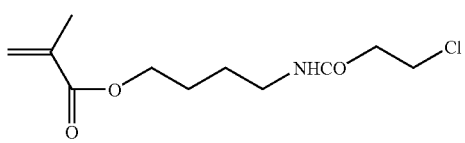 (M-9)

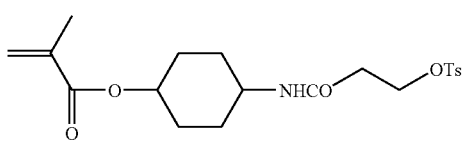 (M-10)

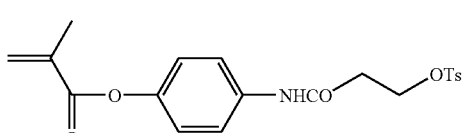 (M-11)

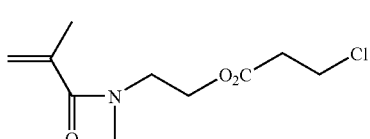 (M-12)

These radical-polymerizable compounds represented by the formula (D) can be easily obtained as commercial products or by the synthetic methods described in the Preparative Examples described below.

The group represented by the formula (A) can be introduced, by preparing a polymeric compound by radical-polymerizable by using one or more of these radical-polymerizable compounds represented by the formula (D) and as needed another radical-polymerizable compound, adding a desired amount of base dropwise into the polymer solution while cooling or heating the mixture allowing the elimination reaction to proceed, and neutralizing the mixture with an acid as needed. Methods generally known in the art such as suspension polymerization and solution polymerization may be applied to preparation of the polymeric compounds.

Either an inorganic compound (inorganic base) or an organic compound (organic base) is used as the base. Preferable examples of the inorganic bases include sodium hydroxide, potassium hydroxide, sodium carbonate, sodium bicarbonate, potassium carbonate, potassium bicarbonate, and the like; and preferable examples of the organic bases include metal alkoxides such as sodium methoxide, sodium ethoxide, and potassium t-butoxide; organic amine compounds such as triethylamine, pyridine, and diisopropylethylamine; and the like.

—Synthetic Method (2)—

Method of obtaining a desired polymeric compound by preparing a backbone polymer compound (polymeric compound forming the main chain) by polymerizing one or more of radical-polymerizable compounds having a functional group and allowing the side-chain functional groups of the backbone polymer compound to react with a compound having the structure represented by the following formula (E)

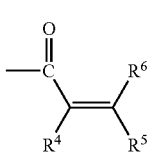

Formula (E)

In the formula (E), $R^4$ to $R^6$ are the same groups as those in the formula (A).

Examples of the functional groups in the radical-polymerizable compound having a functional group for use in the synthesis of backbone polymer compound in the synthetic method (2) include hydroxyl, carboxyl, carboxylic halide, carboxylic anhydride, amino, halogenated alkyl, isocyanate, and epoxy groups, and the like. Specific examples of the radical-polymerizable compounds having a functional group include 2-hydroxylethyl acrylate, 2-hydroxylethyl methacrylate, 4-hydroxybutyl acrylate, 4-hydroxybutyl methacrylate, acrylic acid, methacrylic acid, acrylic chloride, methacrylic chloride, methacrylic anhydride, N,N-dimethyl-2-aminoethyl methacrylate, 2-chloroethyl methacrylate, 2 isocyanatoethyl methacrylate, glycidyl acrylate, glycidyl methacrylate, and the like.

A desired polymeric compound can be obtained by preparing a backbone polymer compounds by polymerizing one or more of these radical-polymerizable compounds having a functional group and as needed copolymerizing them with another radical-polymerizable compound, and then allowing the polymer to react with a compound having the group represented by the formula (E).

Examples of the compounds having the group represented by the formula (E) include the compounds described above as the specific examples of the radical-polymerizable compounds having a functional group.

The polymers containing a radically polymerizable group having the structure represented by the formula (B) above according to the invention can be prepared by at least one of the following synthetic methods (3) and (4).

—Synthetic Method (3)—

Method of obtaining a polymeric compound by polymerizing one or more of radical-polymerizable compounds having an unsaturated group represented by the formula (B) and an ethylenically unsaturated group more reactive in addition polymerization than the unsaturated group and additionally as needed another radical-polymerizable compound. The method uses a compound, such as allyl methacrylate, having multiple ethylenically unsaturated groups different in reactivity in addition polymerization in the same molecule.

Examples of the radical-polymerizable compounds containing an ethylenically unsaturated group more reactive in addition polymerization than the unsaturated group represented by the formula (B) include allyl acrylate, allyl methacrylate, 2-allyloxyethyl acrylate, 2-allyloxyethyl methacrylate, propargyl acrylate, propargyl methacrylate, N-allyl-acrylate, N-allyl-methacrylate, N,N-diallyl-acrylate, N,N-diallyl-methacrylamide, allyl acrylamide, allyl methacrylamide, and the like.

—Synthetic Method (4)—

Method of introducing the group represented by the formula (B) by obtaining a polymeric compound by polymerizing one or more of the radical-polymerizable compounds having a functional group and then allowing the side-chain functional groups thereof to react with a compound having the structure represented by the following formula (F).

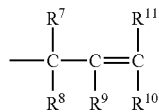

Formula (F)

In the formula (F), $R^7$ to $R^{11}$ are the same groups as $R^7$ to $R^{11}$ in the formula (B).

Specific examples of the radical-polymerizable compounds having a functional group in synthetic method (4) include the specific examples of the radical-polymerizable compounds having a functional group described in the above synthetic method (2).

Examples of the compounds having the structure represented by the formula (F) include allyl alcohol, allylamine, diallyamine, 2-allyloxyethyl alcohol, 2-chloro-1-butene, allyl isocyanate, and the like.

The polymers containing a radically polymerizable group having the structure represented by the formula (C) above according to the invention can be prepared by at least one of the synthetic methods (5) and (6).

—Synthetic Method (5)—

Method of obtaining a polymeric compound by copolymerizing one or more of the radical-polymerizable compounds having an unsaturated group represented by the formula (C) and an ethylenically unsaturated group more reactive in addition polymerization than the unsaturated group and additionally as needed another radical-polymerizable compound.

Examples of the radical-polymerizable compounds containing an ethylenically unsaturated group more reactive in addition polymerization than the unsaturated group represented by the formula (C) include vinyl acrylate, vinyl methacrylate, 2-phenylvinyl acrylate, 2-phenylvinyl methacrylate, 1-propenyl acrylate, 1-propenyl methacrylate, vinyl acrylamide, vinyl methacrylamide, and the like.

—Synthetic Method (6)—

Method of introducing a compound having a structure represented by the formula (G) by preparing a polymeric compound by polymerizing one or more of the radical-polymerizable compounds having a functional group and then allowing the side-chain functional groups thereof to react with the compound having a structure represented by Formula (G).

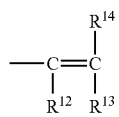

Formula (G)

In the formula (G), $R^{12}$ to $R^{14}$ are the same groups as $R^{12}$ to $R^{14}$ in the formula (C).

Specific examples of the radical-polymerizable compounds having a functional group in synthetic method (6) include the specific examples of the radical-polymerizable compound having a functional group described in synthetic method (2).

Examples of the compounds having a structure represented by the formula (G) include 2-hydroxyethyl monovinylether, 4-hydroxybutyl monovinylether, diethylene glycol monovinylether, 4-chloromethyl styrene, and the like.

Synthetic methods (1) to (6) for preparation of the polymers having a radically polymerizable group having a structure represented by one of the formulae (A) to (C) according to the invention are described so far; and the particular binder polymer according to the invention is prepared by copolymerizing the radical-polymerizable compound and the unit represented by the formula (I) at a certain ratio during polymerization of the radical-polymerizable compound in each synthetic method (1) to (6).

Among these radically polymerizable groups, the radical polymerizable groups represented by the formula (A) and (B) above are preferable. Among them, particularly preferably are the radically polymerizable groups having a structure represented by the formula (A) above; and those having a hydrogen atom or a methyl group as $R^4$ and an oxygen or nitrogen atom as X are particularly preferable.

Typical favorable examples of the repeating units having a radically polymerizable group having the structure represented by the formulae (A) to (C) above are listed below, but the invention is not restricted by these examples.

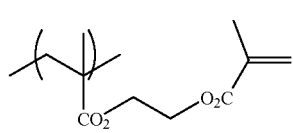

1)

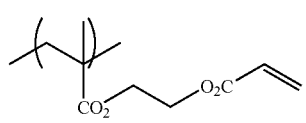

2)

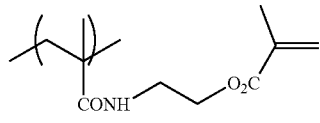

3)

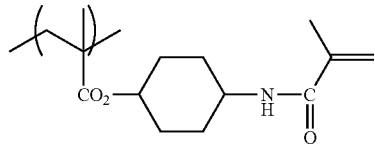

4)

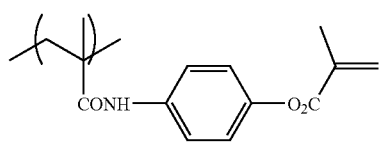

5)

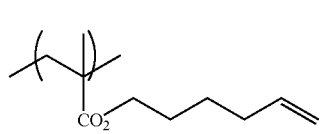

6)

-continued

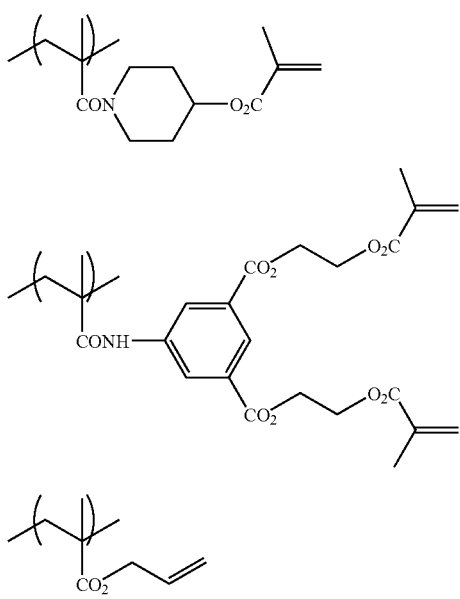

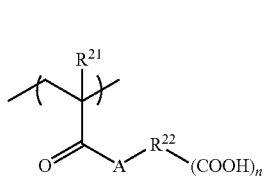

The particular binder polymer according to the invention may be a polymer only from the monomer having a radically polymerizable group described above, but is usually used as a copolymer prepared in combination with another copolymerization component. The total content of the monomer components having a radically polymerizable group in copolymer is suitably decided according to the structure, the design of recording layer, and others, but is preferably in the range of 1 to 99 mole %, more preferably 5 to 40 mole %, and still more preferably 5 to 20 mole % with respect to the total molar amount of the polymer components.

Any known radically polymerizable monomers may be used without restriction as the copolymerization components for the copolymer. Specific examples thereof include the monomers described in "Polymer Data Handbook-Basic-" (Soc. Polymer Science, Japan Ed. Baihukan, 1986). These copolymerization components may be used alone or in combination of two or more.

The particular binder polymer preferably contains additionally a repeating unit represented by the following formula (II).

Formula (II)

$$\underset{O}{\overset{R^{21}}{\underset{|}{\left(\!\!\!\!\!\!\!\!\!\!\!\diagdown\!\!\!\!\!\!\!\diagup\!\!\!\!\!\!\!\!\!\right)}}}\!\!\!-\!\!A\!\!-\!\!R^{22}\!\!-\!\!(COOH)_n$$

In the formula (II), $R^{21}$ represents a hydrogen atom or a methyl group; and $R^{22}$ represents a connecting group containing two or more atoms selected from the group consisting of carbon, hydrogen, oxygen, nitrogen, and sulfur atoms and having a total number of atoms from 2 to 82. A represents an oxygen atom or —$NR^{23}$—; and $R^{23}$ represents a hydrogen atom or a monovalent hydrocarbon group having 1 to 10 carbons. n is an integer of 1 to 5.

$R^{21}$ in the formula (II) represents a hydrogen atom or a methyl group; and a methyl group is preferable.

The connecting group represented by $R^{22}$ in the formula (II) represents a group containing two or more atoms selected from the group consisting of carbon, hydrogen, oxygen, nitrogen, and sulfur atoms and having a total number of atoms from 2 to 82, preferably 2 to 50, and more preferably 2 to 30. The atom number above is an atom number of the connecting group including its substituent if present.

More specifically, the atom number of the main chain of the connecting group represented by $R^{22}$ is preferably 1 to 30, more preferably 3 to 25, still more preferably 4 to 20, and particularly preferably 5 to 10. The "main chain of connecting group" in the invention is an atop or an atomic group used only for connecting A and COOH in the formula (II), and in particular, the atom or atomic group of the route between them having the smallest atom number when there are multiple connecting routes. Therefore, if there is a ring structure in the connecting group, the atom number to be calculated differs depending on the connected site (e.g., o-, m-, or p-).

Hereinafter, structures of the particular binder polymers having the repeating unit represented by the formula (II) are listed, together with the respective atom numbers of the main chains of the connecting groups represented by $R^{22}$ contained in the structures and with the methods of calculating the same.

Atom number of the main chain of connecting group (1)

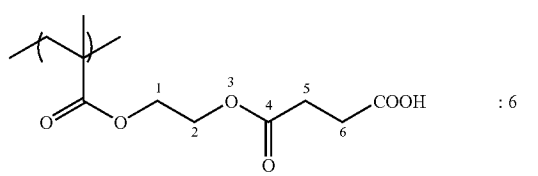 : 6

(2)

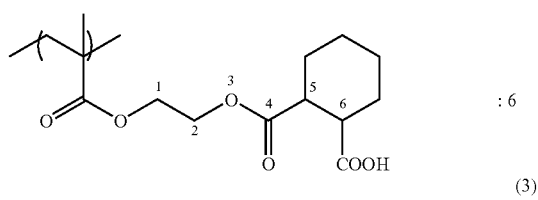 : 6

(3)

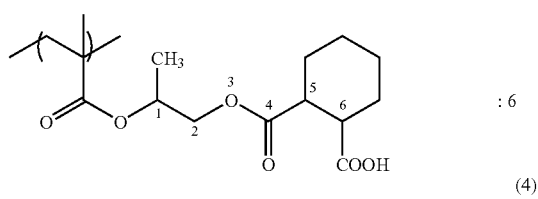 : 6

(4)

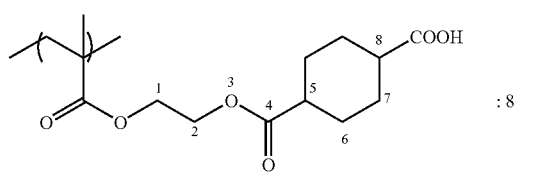 : 8

(5)

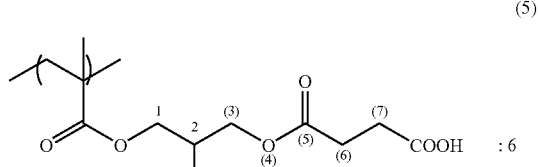

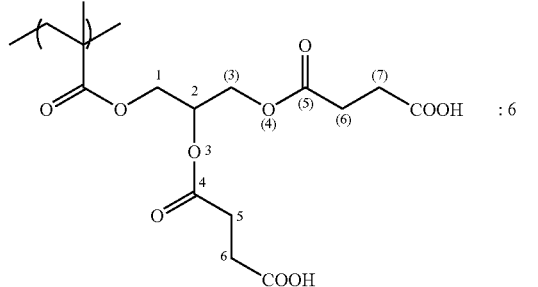 : 6

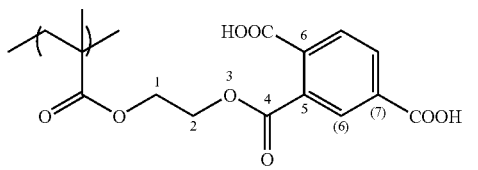
: 6

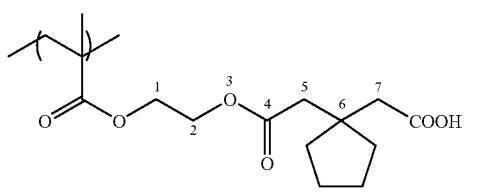
: 7

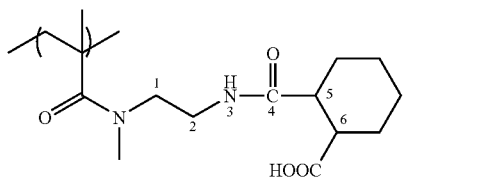
: 6

More specific examples of the connecting groups represented by $R^{22}$ in the formula (II) include alkylenes, substituted alkylenes, arylenes, substituted arylenes, and the like; and these bivalent connecting groups may have a structure in which the connecting groups are connected to each other via amide and/or ester bonds.

Examples of the connecting groups having a chain structure include ethylene, propylene, and the like. Also included favorably are structures in which these alkylenes are bound to each other via ester bonds.

Among them, the connecting group represented by $R^{22}$ in the formula (II) is preferably a (n+1)-valent hydrocarbon group containing an alicyclic structure having 3 to 30 carbon atoms. More specific examples thereof include the (n+1)-valent hydrocarbon groups prepared by eliminating (n+1) hydrogen atoms on any carbon atoms of the compounds having an alicyclic structure, such as cyclopropane, cyclopentane, cyclohexane, cycloheptane, cyclooctane, cyclodecane, dicyclohexyl, tercyclohexyl, and norbornane, which may be substituted with one or more arbitrary substituent groups. In addition, $R^{22}$ including the substituent groups preferably has a carbon number of 3 to 30.

Some of the carbon atoms on the compounds having an alicyclic structure may be replaced with one or more heteroatoms selected from nitrogen, oxygen, and sulfur atoms. From the point of printing durability, $R^{22}$ is preferably an alicyclic (n+1)-valent hydrocarbon group which may have a substituent having 5 to 30 carbon atoms that contains two or more rings such as fused polycyclic aliphatic hydrocarbon, bridged alicyclic hydrocarbon, aliphatic spiro hydrocarbon, aliphatic polycyclic hydrocarbon (multiple rings connected to each other directly or via one or more connecting groups). In this case too, the number of carbons means that including the carbon atoms of the substituent group.

The most favorable connecting groups represented by $R^{22}$ are those containing the main chain thereof having 5 to 10 atoms; and structurally, groups having a chain structure containing an ester bond or a cyclic structure are preferable.

The connecting group represented by $R^{22}$ may have a substituent group; and examples of the substituent groups that may be introduced include monovalent non-metal atomic groups excluding hydrogen; and specific examples thereof include halogen atoms (—F, —Br, —Cl, and —I); hydroxyl, and alkoxy, aryloxy, mercapto, aklylthio, arylthio, alkyldithio, aryldithio, amino, N-alkylamino, N,N-dialkylamino, N-arylamino, N,N-diarylamino, N-alkyl-N-arylamino, acyloxy, carbamoyloxy, N-alkylcarbamoyloxy, N-arylcarbamoyloxy, N,N-dialkylcarbamoyloxy, N,N-diarylcarbamoyloxy, N-alkyl-N-arylcarbamoyloxy, alkylsulfoxy, arylsulfoxy, acylthio, acylamino, N-alkylacylamino, N-arylacylamino, ureido, N'-alkylureido, N',N'-dialkylureido, N'-arylureido, N',N'-diarylureido, N'-alkyl-N'-arylureido, N-alkylureido, N-arylureido, N'-alkyl-N-alkylureido, N'-alkyl-N-arylureido, N',N'-dialkyl-N-alkylureido, N',N'-dialkyl-N-arylureido, N'-aryl-N-alkylureido, N'-aryl-N-arylureido, N',N'-diaryl-N-alkylureido, N',N'-diaryl-N-arylureido, N'-alkyl-N'-aryl-N-alkylureido, N'-alkyl-N'-aryl-N-arylureido, alkoxycarbonylamino, aryloxycarbonylamino, N-alkyl-N-alkoxycarbonylamino, N-alkyl-N-aryloxycarbonylamino, N-aryl-N-alkoxycarbonylamino, N-aryl-N-aryloxycarbonylamino, formyl, acyl, carboxyl and the conjugate base, alkoxycarbonyl, aryloxycarbonyl, carbamoyl, N-alkylcarbamoyl, N,N-dialkylcarbamoyl, N-arylcarbamoyl, N,N-diarylcarbamoyl, N-alkyl-N-arylcarbamoyl, alkylsulfinyl, arylsulfinyl, alkylsulfonyl, arylsulfonyl, sulfo (—SO$_3$H) and the conjugate base, alkoxysulfonyl, aryloxysulfonyl, sulfinamoyl, N-alkylsulfinamoyl, N,N-dialkylsulfinamoyl, N-arylsulfinamoyl, N,N-diarylsulfinamoyl, N-alkyl-N-arylsulfinamoyl, sulfamoyl, N-alkylsulfamoyl, N,N-dialkylsulfamoyl, N-arylsulfamoyl, N,N-diarylsulfamoyl, N-alkyl-N-arylsulfamoyl, N-acylsulfamoyl and the conjugate base, N-alkylsulfonylsulfamoyl(—SO$_2$NHSO$_2$(alkyl)) and the conjugate base, N-arylsulfonylsulfamoyl (—SO$_2$NHSO$_2$(aryl)) and the conjugate base, N-alkylsulfonylcarbamoyl (—CONHSO$_2$(alkyl)) and the conjugate base, N-arylsulfonylcarbamoyl (—CONHSO$_2$(aryl)) and the conjugate base, alkoxysilyl group (—Si(Oalkyl)$_3$), aryloxysilyl (—Si(Oaryl)$_3$), hydroxysilyl (—Si(OH)$_3$) and the conjugate base, phosphono (—PO$_3$H$_2$) and the conjugate base, dialkylphosphono (—PO$_3$(alkyl)$_2$), diarylphosphono (—PO$_3$(aryl)$_2$), alkylarylphosphono (—PO$_3$(alkyl)(aryl)), monoalkylphosphono (—PO$_3$H(alkyl)) and the conjugate base, monoarylphosphono (—PO$_3$H(aryl)) and the conjugate base, phosphonooxy (—OPO$_3$H$_2$) and the conjugate base, dialkylphosphonooxy (—OPO$_3$(alkyl)$_2$), diarylphosphonooxy (—OPO$_3$(aryl)$_2$), alkylarylphosphonooxy (—OPO$_3$(alkyl)(aryl)), monoalkylphosphonooxy (—OPO$_3$H(alkyl)) and the conjugate base, monoarylphosphonooxy (—OPO$_3$H(aryl)) and the conjugate base, cyano, nitro, dialkylboryl (—B(alkyl)$_2$), diarylboryl (—B(aryl)$_2$), alkylarylboryl(—B(alkyl)(aryl)), dihydroxyboryl (—B(OH)$_2$) and the conjugate base, alkylhydroxyboryl(—B(alkyl)(OH)) and the conjugate base, arylhydroxyboryl (—B(aryl)(OH)) and the conjugate base, aryl, alkenyl, and alkynyl groups.

Although it depends on the design of recording layer, substituents group having a hydrogen atom capable of hydrogen bonding and in particular acidic substituent groups having an acid dissociation constant (pKa) smaller than that of carboxylic acids are undesirable, because they may decrease printing durability. On the other hand, hydrophobic substituent groups such as halogen atoms, hydrocarbon groups (alkyl, aryl, alkenyl, and alkynyl), alkoxy groups, and aryloxy groups are more preferable as they increase the printing durability; and in particular, when the cyclic structure is a monocyclic aliphatic hydrocarbon having a six- or lower-membered ring such as cyclopentane or cyclohexane, the structure preferably has such a hydrophobic substituent group. These substituent groups may bind to each other or the substituted hydrocarbon group, forming a ring if possible; and the substituent groups may be substituted additionally.

When A in the formula (II) is $NR^{23}$—, $R^{23}$ represents a hydrogen atom or a monovalent hydrocarbon group having 1 to 10 carbon atoms. The monovalent hydrocarbon groups having 1 to 10 carbon atoms represented by $R^{23}$ include alkyl, aryl, alkenyl, and alkynyl groups. Specific examples of the alkyl groups include straight-chain, branched-chain, and cyclic alkyl groups having 1 to 10 carbon atoms such as methyl, ethyl, propyl, butyl, pentyl, hexyl, heptyl, octyl, nonyl, decyl, isopropyl, isobutyl, sec-butyl, tertbutyl, isopentyl, neopentyl, 1-methylbutyl, isohexyl, 2-ethylhexyl, 2-methylhexyl, cyclopentyl, cyclohexyl, 1-adamantyl, and 2-norbornyl groups.

Specific examples of the aryl groups include phenyl, naphthyl, and indenyl groups, and the like. In addition, a heteroaryl group having up to 10 carbon atoms containing one or more heteroatoms selected from the group consisting of nitrogen, oxygen, and sulfur atoms may also be used; and specific examples thereof include furyl, thienyl, pyrrolyl, pyridyl, and quinolyl groups, and the like.

Specific examples of the alkenyl groups include straight-chain, branched-chain, and annular alkenyl groups having 2 to 10 carbon atoms such as vinyl, 1-propenyl, 1-butenyl, 1-methyl-1-propenyl, 1-cyclopentenyl, and 1-cyclohexenyl groups.

Specific examples of the alkynyl groups include alkynyl groups having 2 to 10 carbon atoms such as ethynyl, 1-propynyl, 1-butynyl, and 1-octynyl group, and the like.

The monovalent hydrocarbon group having 1 to 10 carbons represented by $R^{23}$ may have a substituent group additionally, and the substituent groups that may be introduced include those for $R^{22}$. However, $R^{23}$ including the substituent group has a carbon number of 1 to 10.

A in the formula (II) is preferably an oxygen atom or —NH—, from the point of easiness in production.

n in the formula (II) is an integer of 1 to 5 and preferably 1 from the point of printing durability.

Hereinafter, favorable examples of the repeating units represented by the formula (II) are listed, but the invention is not restricted by these examples.

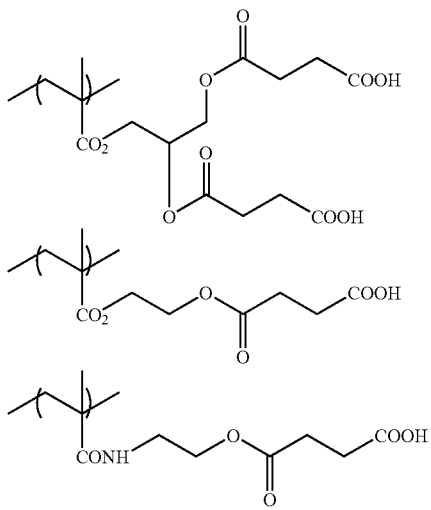

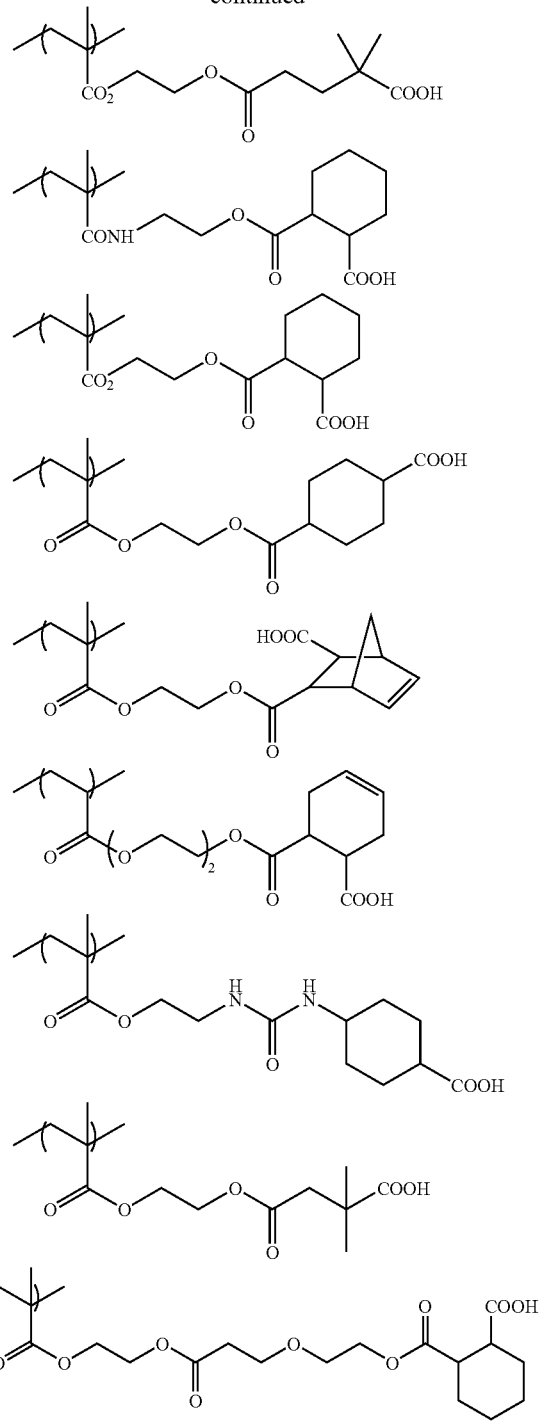

One or more repeating units represented by the formula (II) may be contained in the binder polymer.

The total content of the repeating units represented by the formula (II) in the particular binder polymer is properly decided according to the structure, the design of recording layer, and others, but is in the range of preferably 1 to 99 mole %, more preferably 5 to 40 mole %, and still more preferably 5 to 20 mole % with respect to the total molar amount of the polymer components.

Preferable copolymerization components for the particular binder polymer also include units having an amide group. The amide groups are preferably the amide groups having a structure represented by the following formula (H).

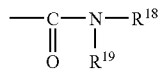

Formula (H)

In the formula (H), $R^{18}$ and $R^{19}$ each independently represent a hydrogen atom or an alkenyl, alkynyl, aryl, heterocyclic, or substituted sulfonyl group which may have one or more substituents alkyl group; or $R^{18}$ and $R^{19}$ may bind to each other, forming an alicyclic structure.

Preferable examples of $R^{18}$ and $R^{19}$ will be described below in detail. The alkyl group represented by $R^{18}$ and $R^{19}$ is, for example, a straight-chain, branched-chain, or cyclic alkyl group having 1 to 20 carbon atoms; and specific examples thereof include methyl, ethyl, propyl, butyl, pentyl, hexyl, heptyl, octyl, nonyl, decyl, undecyl, dodecyl, tridecyl, hexadecyl, octadecyl, eicosyl, isopropyl, isobutyl, s-butyl, t-butyl, isopentyl, neopentyl, 1-methylbutyl, isohexyl, 2-ethylhexyl, 2-methylhexyl, cyclohexyl, cyclopentyl, and 2-norbornyl groups. Among them, straight-chain alkyl groups having 1 to 12 carbon atoms, branched alkyl groups having 3 to 12 carbon atoms, and cyclic alkyl groups having 5 to 10 carbon atoms are more preferable.

The substituent group in the substituted alkyl groups represented by $R^{18}$ and $R^{19}$ used is a group of monovalent nonmetal atomic groups excluding a hydrogen atom; and preferable examples thereof include halogen atoms (—F, —Br, —Cl, and —I); hydroxyl, alkoxy, aryloxy, mercapto, aklylthio, arylthio, alkyldithio, aryldithio, amino, N-alkylamino, N,N-dialkylamino, N-arylamino, N,N-diarylamino, N-alkyl-N-arylamino, acyloxy, carbamoyloxy, N-alkylcarbamoyloxy, N-arylcarbamoyloxy, N,N-dialkylcarbamoyloxy, N,N-diarylcarbamoyloxy, N-alkyl-N-arylcarbamoyloxy, alkylsulfoxy, arylsulfoxy, acylthio, acylamino, N-alkylacylamino, N-arylacylamino, ureido, N'-alkylureido, N',N'-dialkylureido, N'-arylureido, N',N'-diarylureido, N'-alkyl-N'-arylureido, N'-alkylureido, N-arylureido, N'-alkyl-N-alkylureido, N'-alkyl-N-arylureido, N',N'-dialkyl-N-alkylureido, N',N'-alkyl-N-arylureido, N'-aryl-N-alkylureido, N'-aryl-N-arylureido, N',N'-diaryl-N-alkylureido, N',N'-diaryl-N-arylureido, N'-alkyl-N'-aryl-N-alkylureido, N'-alkyl-N'-aryl-N-arylureido, alkoxycarbonylamino, aryloxycarbonylamino, N-alkyl-N-alkoxycarbonylamino, N-alkyl-N-aryloxycarbonylamino, N-aryl-N-alkoxycarbonylamino, N-aryl-N-aryloxycarbonylamino, formyl, acyl($R^{01}$CO—), carboxyl, alkoxycarbonyl, aryloxycarbonyl, carbamoyl, N-alkylcarbamoyl, N,N-dialkylcarbamoyl, N-arylcarbamoyl, N,N-diarylcarbamoyl, N-alkyl-N-arylcarbamoyl, alkylsulfinyl, arylsulfinyl, alkylsulfonyl, arylsulfonyl, sulfo (—$SO_3H$) and the conjugate base (referred to as sulfonato), alkoxysulfonyl, aryloxysulfonyl, sulfinamoyl, N-alkylsulfinamoyl, N,N-dialkylsulfinamoyl, N-arylsulfinamoyl, N,N-diarylsulfinamoyl, N-alkyl-N-arylsulfinamoyl, sulfamoyl, N-alkylsulfamoyl, N,N-dialkylsulfamoyl, N-arylsulfamoyl, N,N-diarylsulfamoyl, N-alkyl-N-arylsulfamoyl, phosphono (—$PO_3H_2$) and the conjugate base (referred to as phosphonato), dialkylphosphono (—$PO_3(alkyl)_2$), diarylphosphono (—$PO_3(aryl)_2$), alkylarylphosphono (—$PO_3(alkyl)(aryl)$), monoalkylphosphono (—$PO_3H(alkyl)$) and the conjugate base (referred to as alkylphosphonato), monoarylphosphono (—$PO_3H(aryl)$) and the conjugate base (referred to as arylphosphonato), phosphonooxy (—$OPO_3H_2$) and the conjugate base (referred to as phosphonatooxy), dialkylphosphonooxy (—$OPO_3H(alkyl)_2$), diarylphosphonooxy (—$OPO_3(aryl)_2$), alkylarylphosphonooxy (—$OPO_3(alkyl)(aryl)$), monoalkylphosphonooxy (—$OPO_3H(alkyl)$) and the conjugate base (referred to as alkylphosphonatooxy), monoarylphosphonooxy (—$OPO_3H(aryl)$) and the conjugate base (referred to as arylphosphonatooxy), cyano, nitro, aryl, alkenyl, alkynyl, heterocyclic, and silyl groups, and the like.

Specific examples of the alkyl groups in these substituent groups include the alkyl groups described above; and specific examples of the aryl groups include phenyl, biphenyl, naphthyl, toluyl, xylyl, mesityl, cumenyl, chlorophenyl, bromophenyl, chloromethylphenyl, hydroxyphenyl, methoxyphenyl, ethoxyphenyl, phenoxyphenyl, acetoxyphenyl, benzyoloxyphenyl, methylthiophenyl, phenylthiophenyl, methylaminophenyl, dimethylaminophenyl, acetylaminophenyl, carboxyphenyl, methoxycarbonylphenyl, ethoxyphenylcarbonyl, phenoxycarbonylphenyl, N-phenylcarbamoylphenyl, cyanophenyl, sulfophenyl, sulfonatophenyl, phosphonophenyl, and phosphonatophenyl groups, and the like.

Examples of the alkenyl groups in these substituent groups include vinyl, 1-propenyl, 1-butenyl, cinnamyl, and 2-chloro-1-ethenyl group, and the like; and examples of the alkynyl groups include ethynyl, 1-propynyl, 1-butynyl, and trimethylsilylethynyl groups, and the like.

Further, examples of $R^{01}$ in the acyl group ($R^{01}$CO—) of these substituent groups include a hydrogen atom, and the alkyl and aryl groups described above.

Among these substituent groups, still more preferable are halogen atoms (—F, —Br, —Cl, and —I); and alkoxy, aryloxy, aklylthio, arylthio, N-alkylamino, N,N-dialkylamino, acyloxy, N-alkylcarbamoyloxy, N-arylcarbamoyloxy, acylamino, formyl, acyl, carboxyl, alkoxycarbonyl, aryloxycarbonyl, carbamoyl, N-alkylcarbamoyl, N,N-dialkylcarbamoyl, N-arylcarbamoyl, N-alkyl-N-arylcarbamoyl, sulfo, sulfonato, sulfamoyl, N-alkylsulfamoyl, N,N-dialkylsulfamoyl, N-arylsulfamoyl, N-alkyl-N-arylsulfamoyl, phosphono, phosphonato, dialkylphosphono, diarylphosphono, monoalkylphosphono, alkylphosphonato, monoarylphosphono, arylphosphonato, phosphonooxy, phosphonatooxy, aryl, and alkenyl groups. In addition, the heterocyclic groups include pyridyl and piperidinyl groups, and the like. The silyl groups include a trimethylsilyl group and the like.

On the other hand, the alkylene group in the substituted alkyl group is, for example, a bivalent organic residue obtained by removing a hydrogen atom on the carbon atom of the alkyl group above having 1 to 20 carbon atoms; and preferable examples thereof include straight-chain alkylene groups having 1 to 12 carbon atoms, branched alkylene groups having 3 to 12 carbon atoms, and cyclic alkylene groups having 5 to 10 carbon atoms. Typical favorable examples of the substituted alkyl groups obtained by binding the alkylene group to a substituent group include chloromethyl, bromomethyl, 2-chloroethyl, trifluoromethyl, methoxymethyl, isopropoxymethyl, butoxymethyl, s-butoxybutyl, methoxyethoxyethyl, allyloxymethyl, phenoxymethyl, methylthiomethyl, tolylthiomethyl, pyridylmethyl, tetramethylpiperidinylmethyl, N-acetyl-tetramethylpiperidinylmethyl, trimethylsilylmethyl, methoxyethyl, ethylaminoethyl, diethylaminopropyl, morpholinopropyl, acetyloxymethyl, benzoyloxymethyl, N-cyclohexylcarbamoyloxyethyl, N-phenylcarbamoyloxyethyl, acetylaminoethyl, N-methylbenzoylaminopropyl, 2-oxoethyl, 2-oxopropyl, carboxypropyl, methoxycarbonylethyl, allyloxycarbonylbutyl, chlorophenoxycarbonylmethyl, carbamoylmethyl, N-methylcarbamoylethyl, N,N-dipropylcarbamoylmethyl, N-methoxyphenyl)carbamoylethyl, N-methyl-N-sulfophenyl)carbamoylmethyl, sulfobutyl, sulfonatobutyl, sulfamoylbutyl, N-ethylsulfamoylmethyl, N,N-dipropylsulfamoylpropyl, N-tolylsulfamoylpropyl, N-methyl-N-phosphonophenyl)sulfamoyloctyl, phosphonobutyl, phosphonatohexyl, diethylphosphonobutyl, diphenylphosphonopropyl, methylphosphonobutyl, methylphosphonatobutyl, tolylphosphonohexyl, tolylphosphonatohexyl, phosphonooxypropyl, phosphonatooxybutyl, benzyl, phenethyl, α-methylbenzyl, 1-methyl-1-phenylethyl, p-methylbenzyl, cinnamyl, allyl, 1-propenylmethyl, 2-butenyl, 2-methylallyl, 2-methylpropenylmethyl, 2-propynyl, 2-butynyl, and 3-butynyl groups, and the like.

Examples of the aryl groups of $R^{18}$ and $R^{19}$ include groups having a benzene ring, a fused ring of 1 to 3 benzene rings and a fused ring of a benzene ring and a five-membered unsaturated ring; specific examples thereof include phenyl, naphthyl, anthryl, phenanthryl, indenyl, acenaphthenyl, and fluorenyl groups; and among them, phenyl and naphthyl groups are more preferable.

An aryl group described above having a monovalent non-metal atomic groups excluding a hydrogen atom as the substituent group on the ring carbon thereon is used as the substituted aryl group represented by $R^{18}$ and $R^{19}$. Preferable examples of the substituent groups include the alkyl and substituted alkyl groups described above and the substituent groups described above for the substituted alkyl groups. Typical favorable example of the substituted aryl groups include biphenyl, toluyl, xylyl, mesityl, cumenyl, chlorophenyl, bromophenyl, fluorophenyl, chloromethylphenyl, trifluoromethylphenyl, hydroxyphenyl, methoxyphenyl, methoxyethoxyphenyl, allyloxyphenyl, phenoxyphenyl, methylthiophenyl, tolylthiophenyl, ethylaminophenyl, diethylaminophenyl, morpholinophenyl, acetyloxyphenyl, benzoyloxyphenyl, N-cyclohexylcarbamoyloxyphenyl, N-phenylcarbamoyloxyphenyl, acetylaminophenyl, N-methyl-benzoylaminophenyl, carboxyphenyl, methoxycarbonylphenyl, allyloxycarbonylphenyl, chlorophenoxycarbonylphenyl, carbamoylphenyl, N-methylcarbamoylphenyl, N,N-dipropylcarbamoylphenyl, N-methoxyphenyl)carbamoylphenyl, N-methyl-N-sulfophenyl)carbamoylphenyl, sulfophenyl, sulfonatophenyl, sulfamoylphenyl, N-ethylsulfamoylphenyl, N,N-dipropylsulfamoylphenyl, N-tolylsulfamoylphenyl, N-methyl-N-phosphonophenyl)sulfamoylphenyl, phosphonophenyl, phosphonatophenyl, diethylphosphonophenyl, diphenylphosphonophenyl, methylphosphonophenyl, methylphosphonatophenyl, tolylphosphonophenyl, tolylphosphonatophenyl, allylphenyl, 1-propenylmethylphenyl, 2-butenylphenyl, 2-methylallylphenyl, 2-methylpropenylphenyl, 2-propynylphenyl, 2-butynylphenyl, and 3-butynylphenyl groups, and the like.

The alkenyl groups, substituted alkenyl groups, alkynyl groups, and substituted alkynyl groups ($—C(R^{02})=C(R^{03})(R^{04})$ and $—C\equiv C(R^{05})$) represented by $R^{18}$ and $R^{19}$ include groups containing monovalent non-metal atomic groups as $R^{02}$, $R^{03}$, $R^{04}$, and $R^{05}$. Favorable examples of $R^{02}$, $R^{03}$, $R^{04}$, and $R^{05}$ include a hydrogen atom, halogen atoms, alkyl groups, substituted alkyl groups, aryl groups, and substituted aryl groups. Specific examples thereof include those described above. Groups more preferable as $R^{02}$, $R^{03}$, $R^{04}$, and $R^{05}$ include a hydrogen atom, halogen atoms, and straight-chain, branched-chain, and cyclic alkyl groups having 1 to 10 carbon atoms. Typical favorable examples of the alkenyl groups, substituted alkenyl groups, alkynyl groups, and substituted alkynyl groups represented by $R^{18}$ and $R^{19}$ include vinyl, 1-propenyl, 1-butenyl, 1-pentenyl, 1-hexenyl, 1-octenyl, 1-methyl-1-propenyl, 2-methyl-1 propenyl, 2-methyl-1-butenyl, 2-phenyl-1-ethenyl, 2-chloro-1-ethenyl, ethynyl, 1-propynyl, 1-butynyl, and phenylethynyl groups.

Examples of the heterocyclic groups represented by $R^{18}$ and $R^{19}$ include the pyridyl group and the like exemplified as the substituent groups of substituted alkyl groups.

The substituted sulfonyl group represented by $R^{18}$ and $R^{19}$ ($R^{011}—SO_2—$) is, for example, a group having a monovalent non-metal atomic group as $R^{011}$. More preferable examples thereof include alkylsulfonyl and arylsulfonyl groups. Examples of the alkyl and aryl groups therein include those described for the alkyl, substituted alkyl, aryl, and substituted aryl groups above. Specific examples of the substituted sulfonyl groups include butylsulfonyl, phenylsulfonyl, and chlorophenylsulfonyl groups, and the like.

In addition, the rings formed by mutual binding of $R^{18}$ and $R^{19}$ in the formula (H) include morpholine, piperadine, pyrrolidine, pyrrole, indoline, and the like. These rings may be additionally substituted with any one of the substituent groups described above. Among them, alicyclic rings are preferable.

In the formula (H), favorable examples of $R^{18}$ and $R^{19}$ are alkyl, alkenyl, aryl, and substituted sulfonyl groups. In addition, $R^{18}$ and $R^{19}$ may form an alicyclic ring.

Favorable examples of the monomers or repeating units containing an amide group having the structure represented by the formula (H) are shown below, but the invention is not restricted by these examples.

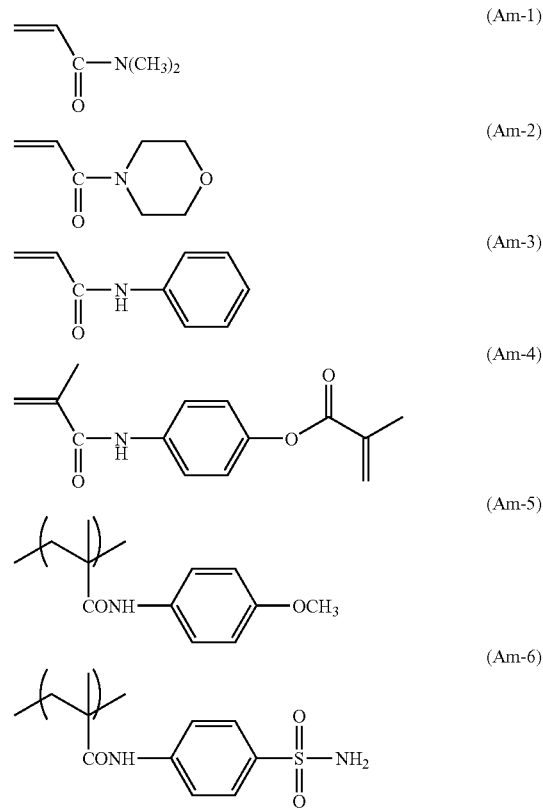

A copolymer containing the unit having a radically polymerizable group described above and the unit represented by the formula (II) or having an amide group is more preferable as the particular binder polymer for use in the invention; and a copolymer containing three units, the unit having a radically polymerizable group, the unit represented by the formula (II), and the unit having an amide group described above, is particularly preferable.

The molecular weight of the particular binder polymer according to the invention is properly decided from the viewpoints of image-forming property and printing durability. Normally, a higher molecular weight leads to improvement in printing durability but also to deterioration in image-forming property. On the contrary, a lower molecular weight leads to improvement in image-forming property but to deterioration in printing durability. The molecular weight is in the range of preferably 2,000 to 1,000,000, more preferably 5,000 to 500,000, and still more preferably 10,000 to 300,000.

Alternatively, the content of the radically polymerizable group in the particular binder polymer (as determined by iodine titration) is preferably 0.1 to 10.0 mmol, more preferably 1.0 to 8.0 mmol, and most preferably 2.0 to 7.0 mmol with respect to 1 g of binder polymer, from the viewpoints of sensitivity and storage life.

The content of the alkali-soluble group in the particular binder polymer (acid value as determined by neutralization titration) is preferably 0.1 to 3.0 mmol, more preferably 0.2 to 2.0 mmol, and most preferably 0.3 to 1.5 mmol with respect to 1 g of binder polymer, from the viewpoints of printing efficiency and durability.

The glass transition point (Tg) of the particular binder polymer is in the range of preferably 70 to 300° C., more preferably 80 to 250° C., and most preferably 90 to 200° C., from the viewpoints of storage stability and sensitivity.

The binder polymer for use in the invention may be a single particular binder polymer or a mixture thereof with one or more other binder polymers. The binder polymers used in combination are used in an amount in the range of 1 to 60% by mass, preferably 1 to 40% by mass, and still more preferably 1 to 20% by mass, with respect of the total amount of the binder polymer components. Any one of known binder polymers may be used without restriction, and specifically, acrylic main-chain binders, urethane binders and others commonly used in the art are used preferably.

The total amount of the particular binder polymer and the binder polymers that may be used combinedly in the polymerizable composition is decided properly, but is normally in the range of 10 to 90% by mass, preferably 20 to 80% by mass, and still more preferably 30 to 70% by mass, with respect to the total amount of the nonvolatile components in the recording layer.

Favorable examples of the particular binder polymers for use in the invention will be shown below, but the invention is not restricted by these examples.

1)

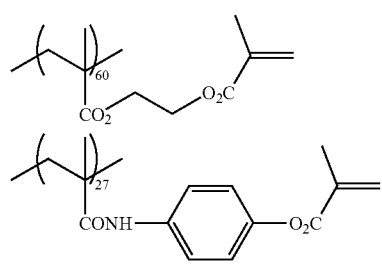

2)

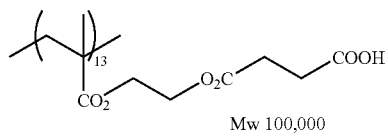

Mw 100,000

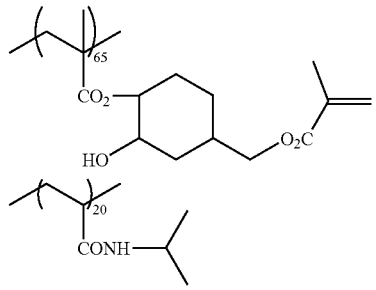

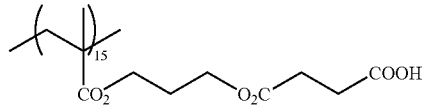

Mw 110,000

3)

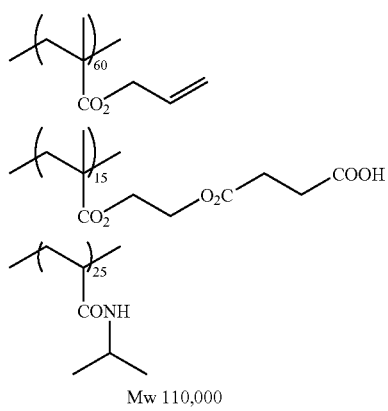

Mw 110,000

4)

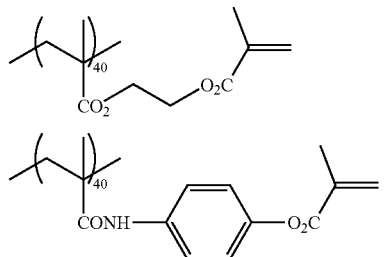

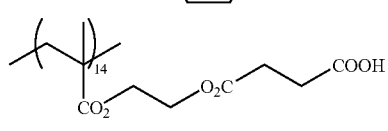

Mw 100,000

5)

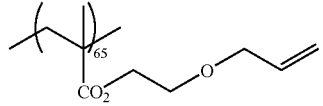

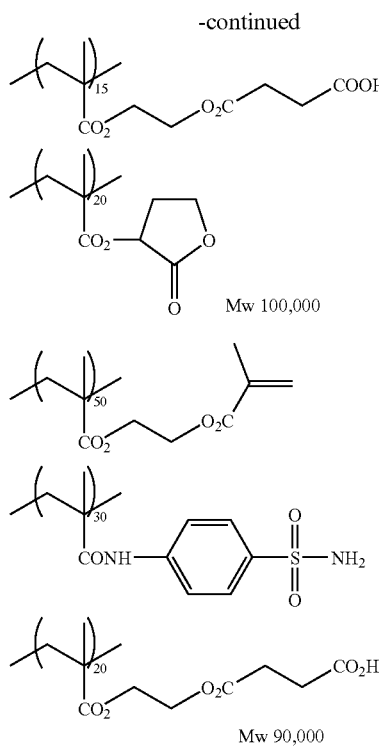

(E) Coinitiator

The polymerizable composition according to the invention may contain a coinitiator (E) for improvement in sensitivity.

The coinitiators favorable in the invention include (a) aromatic ketones, (b) onium salt compounds, (c) organic peroxides, (d) thio compounds, (e) hexaarylbiimidazole compounds, (f) ketoxime ester compounds, (g) borate compounds, (h) azinium compounds, (i) metallocene compounds, j) active ester compounds, (k) compounds having one or more carbon-halogen bonds, and the like. Hereinafter, specific examples of the compounds (a) to (k) will be described, but the invention is not restricted by these examples.

(a) Aromatic Ketones

The aromatic ketones (a) favorable as the radical initiator for use in the invention include the compounds having a benzophenone or thioxanthone skeleton described in "RADIATION CURING IN POLYMER SCIENCE AND TECHNOLOGY" J. P. Fouassier, J. F. Rabek (1993), pp. 77-117, such as the followings:

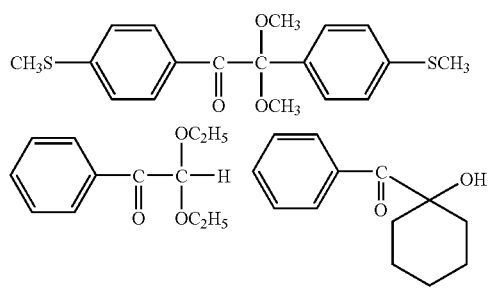

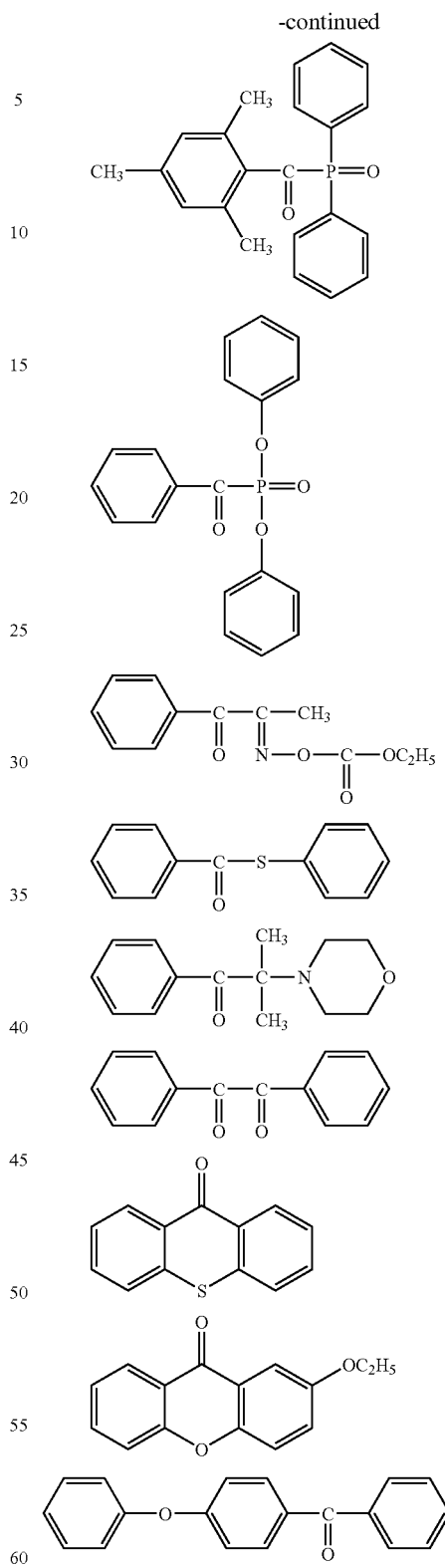

Among them, particularly preferable aromatic ketones (a) include the α-thiobenzophenone compound described in JP-B No. 47-6416 and the benzoin ether compounds described in JP-B No. 47-3981, such as the following compound:

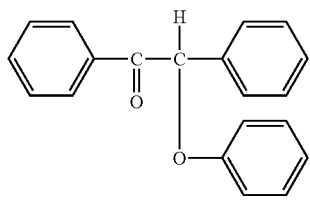

The α-substituted benzoin compounds described in JP-B No. 47-22326, such as the following compound:

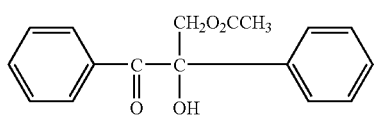

The benzoin derivatives described in JP-B No. 47-23664, the aroylphosphonic esters described in JP-A No. 57-30704, and the dialkoxybenzophenones described in JP-B No. 60-26483, such as the following compound:

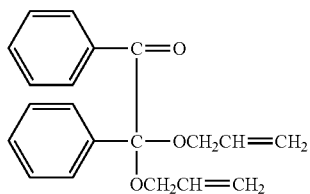

The benzoin ethers described in JP-B No. 60-26403 and JP-A No. 62-81345, such as the following compound:

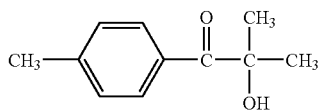

The α-aminobenzophenones described in JP-B No. 1-34242, U.S. Pat. No. 4,318,791, and E.P. No. 0284561A1, such as the followings:

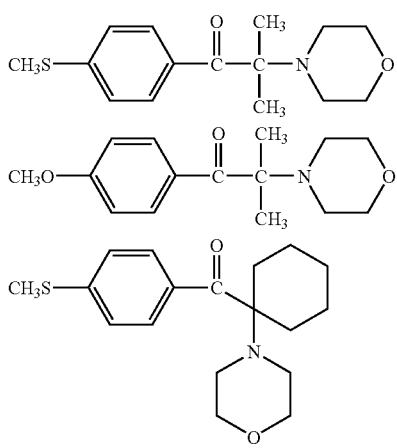

p-Di(dimethylaminobenzoyl)benzene described in JP-A No. 2-211452, shown below:

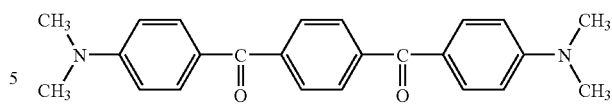

The thio-substituted aromatic ketones described in JP-A No. 61-194062, such as the following compound:

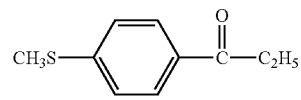

The acyl phosphine sulfides described in JP-B No. 24597, such as the followings:

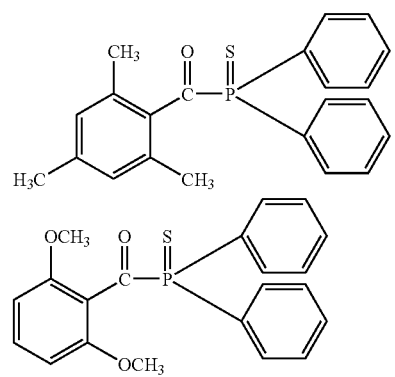

The acyl phosphines described in JP-B No. 2-9596, such as the followings:

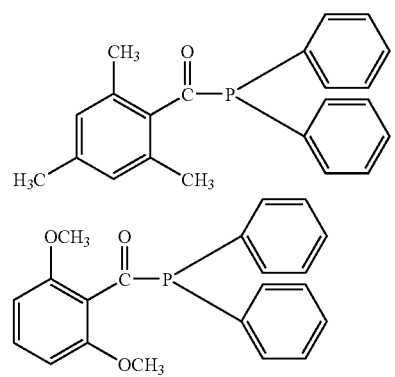

In addition, the thioxanthones described in JP-B No. 63-61950, and coumarins described in JP-B No. 59-42864, and the like.

(b) Onium Salt Compound

The onium salt compounds (b) preferable as the radical initiator for use in the invention include the compounds represented by the following formulae (1) to (3).

$Ar^1$—$I^+$—$Ar^2(Z^2)^-$      Formula (1)

$Ar^3$—$N^+$≡$N(Z^3)^-$      Formula (2)

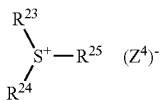

Formula (3)

In the formula (1), $Ar^1$ and $Ar^2$ each independently represent an aryl group having up to 20 carbon atoms which may have one or more substituents. Preferable examples of the substituents of the aryl group when present include halogen atoms, a nitro group, alkyl groups having up to 12 carbon atoms, alkoxy groups having up to 12 carbon atoms, and aryloxy groups having up to 12 carbon atoms. $(Z^2)^-$ represents a counter ion selected from the group consisting of halides, perchlorate, carboxylate, tetrafluoroborate, hexafluorophosphate, and sulfonate and is preferably a perchlorate, hexafluorophosphate, or aryl sulfonate ion.

In the formula (2), $Ar^3$ represents an aryl group having up to 20 carbon atoms which may have one or more substituents. Preferable examples of the substituent groups include halogen atoms, a nitro group, alkyl groups having up to 12 carbon atoms, alkoxy groups having up to 12 carbon atoms, aryloxy groups having up to 12 carbon atoms, alkylamino groups having up to 12 carbon atoms, dialkylamino groups having up to 12 carbon atoms, arylamino groups having up to 12 carbon atoms, and diarylamino groups having up to 12 carbon atoms. $(Z^3)^-$ represents the same counter ion as $(Z^2)^-$.

In the formula (3), $R^{23}$, $R^{24}$ and $R^{25}$ each independently represent a hydrocarbon group having up to 20 carbon atoms which may have one or more substituents. Preferable examples of the substituent groups include halogen atoms, a nitro group, alkyl groups having up to 12 carbon atoms, alkoxy groups having up to 12 carbon atoms, and aryloxy groups having up to 12 carbon atoms. $(Z^4)^-$ represents the same counter anion as $(Z^2)^-$.

Specific examples of the onium salts favorably used in the invention include those described in paragraph numbers [0030] to [0033] of Japanese Patent Application No. 11-310623 filed by the inventors; those described in paragraph numbers [0015] to [0046] of Japanese Patent Application No. 2000-160323; the particular aromatic sulfonium salt compounds described in Japanese Patent Application Nos. 2000-266797, 2001-177150, 2000-160323, 2000-184603, 2000-310808, 2002-265467, and 2002-366539; and the like.

The onium salt for use in the invention preferable has a maximum absorption wavelength of 400 nm or less and more preferably 360 nm or less. It becomes possible to process the planographic printing plate precursor under white light, by reducing the absorption wavelength into the ultraviolet ray range.

(c) Organic Peroxide

The organic peroxides (c) favorable as the radical initiator for use in the invention include almost all organic compounds having one or more oxygen-oxygen bonds in the molecule; and examples thereof include methylethylketone peroxide, cyclohaxanone peroxide, 3,3,5-trimethylcyclohaxanone peroxide, methylcyclohaxanone peroxide, acetylacetone peroxide, 1,1-bis(tert-butylperoxy)-3,3,5-trimethyl cyclohexane, 1,1-bis(tert-butylperoxy)cyclohexane, 2,2-bis(tert-butylperoxy)butane, tert-butyl hydroperoxide, cumene hydroperoxide, diisopropylbenzene hydroperoxide, paramethane hydroperoxide, 2,5-dimethylhexane-2,5-dihydroperoxide, 1,1,3,3-tetramethylbutyl hydroperoxide, di-tert-butyl peroxide, tert-butylcumyl peroxide, dicumyl peroxide, bis(tert-butylperoxyisopropyl)benzene, 2,5-dimethyl-2,5-di(tert-butylperoxy)hexane, 2,5-xanoyl peroxide, persuccinic acid, benzoyl peroxide, 2,4-dichlorobenzoyl peroxide, meta-toluoyl peroxide, diisopropyl peroxydicarbonate, di-2-ethylhexyl peroxydicarbonate, di-2-ethoxyethyl peroxydicarbonate, dimethoxyisopropyl peroxycarbonate, di(3-methyl-3-methoxybutyl) peroxydicarbonate, tert-butyl peroxyacetate, tert-butyl peroxypivalate, tert-butyl peroxyneodecanoate, tert-butyl peroxyoctanoate, tert-butyl peroxy-3,5,5-trimethylhexanoate, tert-butyl peroxylaurate, tertiary carbonate, 3,3'4,4'-tetra-t-butylperoxycarbonyl)benzophenone, 3,3'4,4'-tetra-t-amylperoxycarbonyl)benzophenone, 3,3'4,4'-tetra-t-hexylperoxycarbonyl)benzophenone, 3,3'4,4'-tetra-t-octyl peroxycarbonyl)benzophenone, 3,3'4,4'-tetra-cumylperoxycarbonyl)benzophenone, 3,3'4,4'-tetra-p-isopropylcumylperoxycarbonyl)benzophenone, carbonyl-di(t-butylperoxy dihydrogen diphthalate), carbonyl-di(t-hexylperoxy dihydrogen diphthalate), and the like.

Among them, peroxidated esters such as 3,3'4,4'-tetra-t-butylperoxycarbonyl)benzophenone, 3,3'4,4'-tetra-t-amylperoxycarbonyl)benzophenone, 3,3'4,4'-tetra-t-hexylperoxycarbonyl)benzophenone, 3,3'4,4'-tetra-t-octyl peroxycarbonyl)benzophenone, 3,3'4,4'-tetra-cumylperoxycarbonyl)benzophenone, 3,3'4,4'-tetra-p-isopropylcumylperoxycarbonyl)benzophenone, and di-t-butyldiperoxy isophthalate are preferable.

(d) Thio Compound

The thio compounds (d) favorably as the radical initiator used in the invention include compounds having the structure represented by the following formula (4).

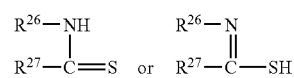

Formula (4)

In the formula (4), $R^{26}$ represents an alkyl, aryl, or substituted aryl group; and $R^{27}$ represents a hydrogen atom or an alkyl group. Alternatively, $R^{26}$ and $R^{27}$ represent non-metal atomic groups that binds to each other, forming a five- to seven-membered ring containing one or more heteroatoms selected from oxygen, sulfur and nitrogen atoms.

The alkyl group in the formula (4) above is preferably an alkyl group having 1 to 4 carbon atoms. In addition, the aryl group is preferably a group having 6 to 10 carbon atoms such as phenyl and naphthyl, and preferable substituted aryl groups include the aryl groups above additionally containing one or more halogen atoms such as chlorine, one or more alkyl groups such as methyl, or one or more alkoxy groups such as methoxy and ethoxy. Preferably, $R^{27}$ represents an alkyl group having 1 to 4 carbon atoms. Specific examples of the thio compounds represented by the formula (4) include the following compounds:

TABLE 1

| No. | $R^{26}$ | $R^{27}$ |
|---|---|---|
| 1 | —H | —H |
| 2 | —H | —$CH_3$ |
| 3 | —$CH_3$ | —H |
| 4 | —$CH_3$ | —$CH_3$ |
| 5 | —$C_6H_5$ | —$C_2H_5$ |
| 6 | —$C_6H_5$ | —$C_4H_9$ |
| 7 | —$C_6H_4Cl$ | —$CH_3$ |
| 8 | —$C_6H_4Cl$ | —$C_4H_9$ |
| 9 | —$C_6H_4$—$CH_3$ | —$C_4H_9$ |
| 10 | —$C_6H_4$—$OCH_3$ | —$CH_3$ |
| 11 | —$C_6H_4$—$OCH_3$ | —$C_2H_5$ |

TABLE 1-continued

| No. | R²⁶ | R²⁷ |
|---|---|---|
| 12 | —C₆H₄—OC₂H₅ | —CH₃ |
| 13 | —C₆H₄—OC₂H₅ | —C₂H₅ |
| 14 | —C₆H₄—OCH₃ | —C₄H₉ |
| 15 | —(CH₂)₂— | |
| 16 | —(CH₂)₂—S— | |
| 17 | —CH(CH₃)—CH₂—S— | |
| 18 | —CH₂—CH(CH₃)—S— | |
| 19 | —C(CH₃)₂—CH₂—S— | |
| 20 | —CH₂—C(CH₃)₂—S— | |
| 21 | —(CH₂)₂—O— | |
| 22 | —CH(CH₃)—CH₂—O— | |
| 23 | —C(CH₃)₂—CH₂—O— | |
| 24 | —CH=CH—N(CH₃)— | |
| 25 | —(CH₂)₃—S— | |
| 26 | —(CH₂)₂—CH(CH₃)—S— | |
| 27 | —(CH₂)₃—O— | |
| 28 | —(CH₂)₅— | |
| 29 | —C₆H₄—O— | |
| 30 | —N=C(SCH₃)—S— | |
| 31 | —C₆H₄—NH— | |
| 32 | 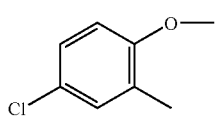 | |

(e) Hexaarylbiimidazole Compound

The hexaarylbiimidazole compounds (e) favorable as the radical initiator for use in the invention include the Rofin dimers described in JP-B Nos. 45-37377 and 44-86516, such as 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl)biimidazole, 2,2'-bis(o,o'-dichlorophenyl)-4,4',5,5'-tetraphenylbiimidazole, 2,2'-bis(o-nitrophenol)-4,4',5,5'-tetraphenylbiimidazole, 2,2'-bis(o-methylphenyl)-4,4',5,5'-tetraphenylbiimidazole, 2,2'-bis(o-trifluorophenyl)-4,4',5,5'-tetraphenylbiimidazole, and the like.

(f) Ketoxime Ester Compound

The ketoxime ester compounds (f) favorable as the radical initiator for use in the invention include 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one, 2-ethoxycarbonyloxyimino-1-phenylpropan-1-one, and the like.

(g) Borate Compound

The borate compounds (g) favorable as the radical initiator for use in the invention include the compounds represented by the following formula (5).

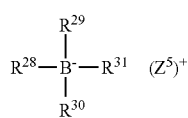

Formula (5)

In the formula (5), $R^{28}$, $R^{29}$, $R^{30}$ and $R^{31}$ each independently represent a substituted or unsubstituted alkyl group, a substituted or unsubstituted aryl group, a substituted or unsubstituted alkenyl group, a substituted or unsubstituted alkynyl group, or a substituted or unsubstituted heterocyclic group; or two or more groups of $R^{28}$, $R^{29}$, $R^{30}$ and $R^{31}$ may bind to each other, forming a cyclic structure. However, at least one of $R^{28}$, $R^{29}$, $R^{30}$ and $R^{31}$ is a substituted or unsubstituted alkyl group. $(Z^5)^+$ represents an alkali metal cation or a quaternary ammonium cation.

The alkyl groups of $R^{28}$ to $R^{31}$ include straight-chain, branch, and cyclic alkyl groups, and those having 1 to 18 carbon atoms are preferable. Specific examples thereof include methyl, ethyl, propyl, isopropyl, butyl, pentyl, hexyl, octyl, stearyl, cyclobutyl, cyclopentyl, cyclohexyl, and the like. In addition, the substituted alkyl groups include the alkyl groups above additionally containing one or more halogen atoms (e.g., —Cl, —Br, etc.), cyano groups, nitro groups, aryl groups (preferably phenyl), hydroxy groups, —COOR³² (wherein, $R^{32}$ represents a hydrogen atom or an alkyl or aryl group having 1 to 14 carbons), —OCOR³³ or —OR³⁴ (wherein, $R^{33}$ and $R^{34}$ each represents an alkyl or aryl group having 1 to 14 carbons), and the groups represented by the following formula as the substituent groups.

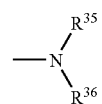

$R^{35}$ and $R^{36}$ each independently represent a hydrogen atom or an alkyl or aryl group having 1 to 14 carbons.

The aryl groups of $R^{23}$ to $R^{31}$ include monocyclic to tricyclic groups such as phenyl and naphthyl groups; and the substituted aryl groups include the aryl groups above that have additionally the substituent group for the substituted alkyl group described above or an alkyl group having 1 to 14 carbons. The alkenyl groups of $R^{28}$ to $R^{31}$ include straight-chain, branch, and cyclic alkenyl groups having 2 to 18 carbon atoms; and the substituent groups of the substituted alkenyl group include those described as the substituent groups of the substituted alkyl group. The alkynyl groups of $R^{28}$ to $R^{31}$ include straight-chain or branched-chain alkynyl groups having 2 to 28 carbons; and the substituent groups of the substituted alkynyl group include those described as the substituent groups of the substituted alkyl group. Further, the heterocyclic groups of $R^{28}$ to $R^{31}$ include heterocyclic groups of five- or higher membered rings, preferably 5 to 7-membered rings, containing at least one N, S, or O atom; and the heterocyclic group may be a fused ring. The heterocyclic groups may have additionally one of the groups described as the substituent groups of the substituted aryl group described above as their substituent group. Specific examples of the compounds represented by the formula (5) include the compounds described in U.S. Pat. Nos. 3,567,453 and 4,343,891, and E.P. Nos. 109,772 and 109,773 and the compounds shown below.

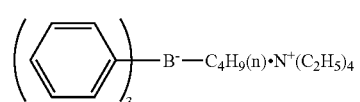

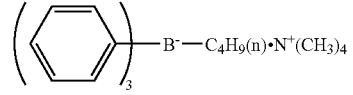

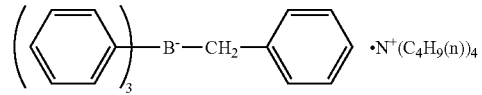

-continued

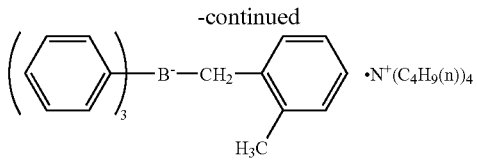

(h) Azinium Compound

The azinium salt compounds (h) favorable as the radical initiator for use in the invention include the compounds having one or more N—O bonds described in JP-A No 63-138345, 63-142345, 63-142346, and 63-143537 and JP-B No. 46-42363.

(i) Metallocene Compound

The metallocene compounds (i) favorable as the radical initiator for use in the invention include the titanocene compounds described in JP-A Nos. 59-152396, 61-151197, 63-41484, 2-249, and 2-4705; and the iron-allene complexes described in JP-A Nos. 1-304453 and 1-152109.

Specific examples of the titanocene compounds include di-cyclopentadienyl-Ti-di-chloride, di-cyclopentadienyl-Ti-bis-phenyl, di-cyclopentadienyl-Ti-bis-2,3,4,5,6-pentafluorophen-1-yl, di-cyclopentadienyl-Ti-bis-2,3,5,6-tetrafluorophen-1-yl, di-cyclopentadienyl-Ti-bis-2,4,6-trifluorophen-1-yl, di-cyclopentadienyl-Ti-2,6-difluorophen-1-yl, di-cyclopentadienyl-Ti-bis-2,4-difluorophen-1-yl, di-methyl cyclopentadienyl-Ti-bis-2,3,4,5,6-pentafluorophen-1-yl, di-methylcyclopentadienyl-Ti-bis-2,3,5,6-tetrafluorophen-1-yl, di-methylcyclopentadienyl-Ti-bis-2,4-difluorophen-1-yl, bis(cyclopentadienyl)bis[2,6-difluoro-3-pyr-1-yl)phenyl] titanium, bis(cyclopentadienyl)bis[2,6-difluoro-3-methylsulfonamido)phenyl]titanium, bis(cyclopentadienyl) bis[2,6-difluoro-3-N-butylbiaroyl-amino)phenyl]titanium, bis(cyclopentadienyl)bis[2,6-difluoro-3-(N-butyl-(4-chlorobenzoyl)amino)phenyl]titanium, bis(cyclopentadienyl) bis-[2,6-difluoro-3-(N-benzyl-2,2-dimethylpentanoylamino)phenyl]titanium, bis(cyclopentadienyl)bis[2,6-difluoro-3-(N-(2-ethylhexyl)-4-tolyl-sulfonyl)amino] phenyl]titanium, bis(cyclopentadienyl)bis[2,6-difluoro-3-(N-3-oxaheptyl)benzoylamino)phenyl]titanium, bis (cyclopentadienyl)bis[2,6-difluoro-3-(N-3,6-dioxadecyl) benzoylamino)phenyl]titanium, bis(cyclopentadienyl)bis[2, 6-difluoro-3-(trifluoromethyl)amino]phenyl]titanium, bis (cyclopentadienyl)bis[2,6-difluoro-3-(trifluoroaceylamino) phenyl]titanium, bis(cyclopentadienyl)bis[2,6-difluoro-3-(2-chlorobenzoyl)amino)phenyl]titanium, bis (cyclopentadienyl)bis[2,6-difluoro-3-(4-chlorobenzoyl) amino)phenyl]titanium, bis(cyclopentadienyl)bis[2,6-difluoro-3-(N-(3,6-dioxadecyl)-2,2-dimethylpentanoylamino)phenyl]titanium, bis (cyclopentadienyl)bis[2,6-difluoro-3-(N-(3,7-dimethyl-7-methoxyoctyl)benzoylamino)phenyl]titanium, bis (cyclopentadienyl)bis(2,6-difluoro-3-N-cyclohexylbenzoylamino)phenyl]titanium, and the like.

(j) Active Ester Compound

The active ester compounds (j) preferable for use in the invention radical initiator include the imide sulfonate compounds described in JP-B No. 62-6223; the active sulfonates described in JP-B No. 63-14340 and JP-A No. 59-174831; and the like.

(k) Compound Having a Carbon-Halogen Bond

The compounds having a carbon-halogen bond (k) preferable for use as the radical initiator in the invention include the following compounds represented by the formulae (6) to (12).

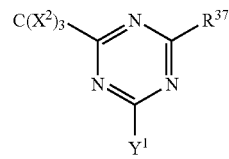

Formula (6)

In the formula (6), $X^2$ represents a halogen atom; and $Y^1$ represents $—(X^2)_3$, $—NH_2$, $—NHR^{38}$, $—NR^{38}$, or $OR^{38}$. $R^{38}$ represents an alkyl, substituted alkyl, aryl, or substituted aryl group. In addition, $R^{37}$ represents $—C(X^2)_3$, an alkyl group, a substituted alkyl group, an aryl group, a substituted aryl group, or a substituted alkenyl group.

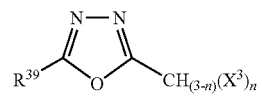

Formula (7)

In the formula (7), $R^{39}$ represents an alkyl, substituted alkyl, alkenyl, substituted alkenyl, aryl, substituted aryl group, a halogen atom, an alkoxy or substituted alkoxyl group, a nitro group or a cyano group; $X^3$ represents a halogen atom; and n is an integer of 1 to 3.

$$R^{40}—Z^5—CH_{(2-m)}(X^3)_m R^{41}$$
Formula (8)

In the formula (8), $R^{40}$ represents an aryl or substituted aryl group; $R^{41}$ represents one of the following groups or a halogen atom; $Z^6$ represents $C(=O)—$, $—C(=S)—$, or $—SO_2—$, $X^3$ represents a halogen atom; and m is 1 or 2.

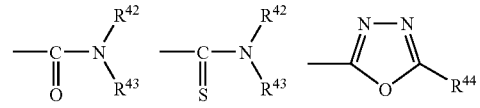

$R^{42}$ and $R^{43}$ each represent an alkyl, substituted alkyl, alkenyl, substituted alkenyl, aryl, or substituted aryl group; and $R^{44}$ is the same as $R^{38}$ in the formula (6).

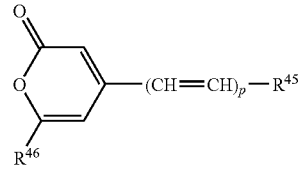

Formula (9)

In the formula (9), $R^{45}$ represents an aryl or heterocyclic group that may be substituted; $R^{46}$ represents a trihaloalkyl or trihaloalkenyl group having 1 to 3 carbon atoms; and p is 1, 2 or 3.

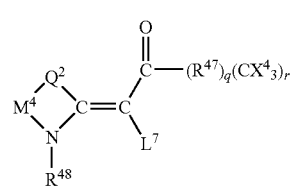

Formula (10)

The formula (10) represents a heterocyclic carbonylmethylene compound having a trihalogenomethyl group. $L^7$ represents a hydrogen atom or a substituent group represented by the formula: $CO-R^{47})_q(C(X^4)_3)_r$; $Q^2$ represents a sulfur, selenium or oxygen atom, or a dialkylmethylene, alken-1,2-ylene, 1,2-phenylene, or $-N-R-$ group; $M^4$ represents a substituted or unsubstituted alkylene, alkenylene, or 1,2-arylene group; $R^{48}$ represents an alkyl, aralkyl, or alkoxyalkyl group; $R^{47}$ represents an alicyclic or heterocyclic bivalent aromatic group; $X^4$ represents a chlorine, bromine, or iodine atom; and q is 0 and r is 1, or q is 1 and r is 1 or 2.

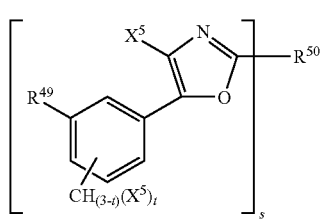

Formula (11)

The formula (11) represents a 4-halogeno-5-halogenomethyl-phenyl)-oxazole derivative. $X^5$ represents a halogen atom; t is an integer of 1 to 3; s is an integer of 1 to 4; $R^{49}$ represents a hydrogen atom or a $CH_{3-t}X^5{}_t$ group; $R^{50}$ represents an s-valent organic group that may be substituted unsaturated.

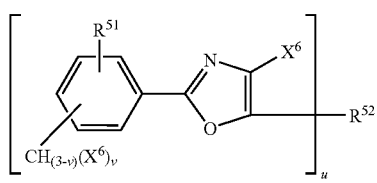

Formula (12)

The formula (12) represents a 2-halogenomethyl-phenyl)-4-halogenooxazole derivative. $X^6$ represents a halogen atom; v is an integer of 1 to 3; u is an integer of 1 to 4; $R^{51}$ represents a hydrogen atom or a $CH_{3-v}X^6{}_v$ group; and $R^{52}$ represent a u-valent organic group that may be substituted unsaturated.

Specific examples of the compounds having a carbon-halogen bond include the compounds described in Wakabayashi et al., Bull. Chem. Soc. Japan, 42, 2924 (1969). Examples of thereof include 2-phenyl-4,6-bis(trichloromethyl)-S-triazine, 2-(p-chlorophenyl)-4,6-bis(trichloromethyl)-S-triazine, 2-(p-tolyl)-4,6-bis(trichloromethyl)-S-triazine, 2-(p-methoxyphenyl)-4,6-bis(trichloromethyl)-S-triazine, 2-(2',4'-dichlorophenyl)-4,6-bis(trichloromethyl)-S-triazine, 2,4,6-tris(trichloromethyl)-S-triazine, 2-methyl-4,6-bis(trichloromethyl)-S-triazine, 2-n-nonyl-4,6-bis(trichloromethyl)-S-triazine, 2-(α,α,β-trichloroethyl)-4,6-bis(trichloromethyl)-S-triazine, and the like. Other examples thereof include the compounds described in British Patent 1388492 such as 2-styryl-4,6-bis(trichloromethyl)-S-triazine, 2-(p-methylstyryl)-4,6-bis(trichloromethyl)-S-triazine, 2-(p-methoxystyryl)-4,6-bis(trichloromethyl)-S-triazine, and 2-(p-methoxystyryl)-4-amino-6-trichloromethyl-S-triazine; the compounds described in JP-A No. 53-133428 such as 2-(4-methoxy-naphtho-1-yl)-4,6-bistrichloromethyl-S-triazine, 2-(4-ethoxynaphtho-1-yl)-4,6-bistrichloromethyl-S-triazine, 2-(4-(2-ethoxyethyl)-naphtho-1-yl)-4,6-bis-trichloromethyl-S-triazine, 2-(4,7-dimethoxy-naphtho-1-yl)-4,6-bistrichloromethyl-S-triazine), and 2-(acenaphtho-5-yl)-4,6-bistrichloromethyl-S-triazine; the compounds described in Germany Patent 3337024 such as the following compounds; and the like.

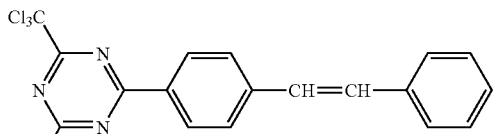

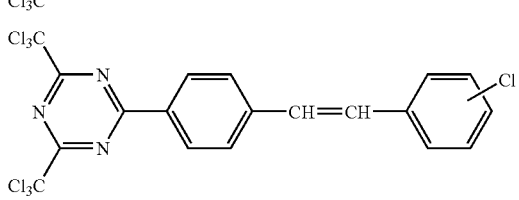

Also included are the compounds described in F. C. Schaefer et al., J. Org. Chem. 29, 1527 (1964) such as 2-methyl-4,6-bis(tribromomethyl)-S-triazine, 2,4,6-tris(tribromomethyl)-S-triazine, 2,4,6-tris(dibromomethyl)-S-triazine, 2-amino-4-methyl-6-tribromomethyl-S-triazine, and 2-methoxy-4-methyl-6-chloromethyl-S-triazine; and the like. Further included are the compounds described in JP-A No. 62-58241 such as the following compounds:

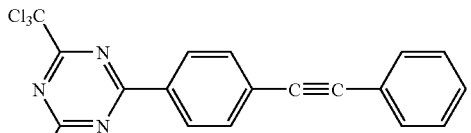

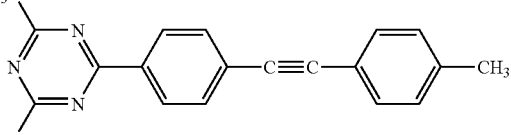

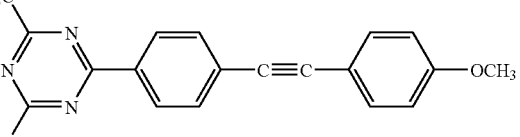

The compounds described in JP-A No. 5-281728 such as the following compounds are also included.

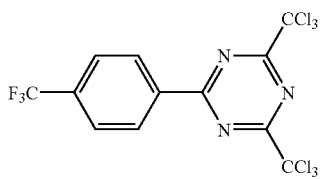

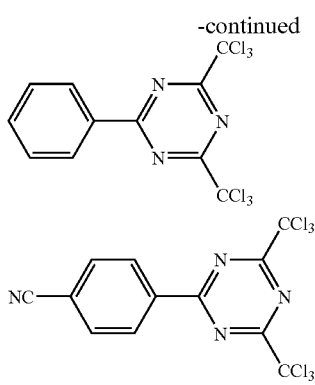

Further, the compounds that can be easily prepared by those skilled in the art according to the synthetic method described in M. P. Hutt, E. F. Elslager and L. M. Herbel, "Journal of Heterocyclic Chemistry" Vol. 7 (No. 3), pp. 511- (1970), such as the following compounds, are also included.

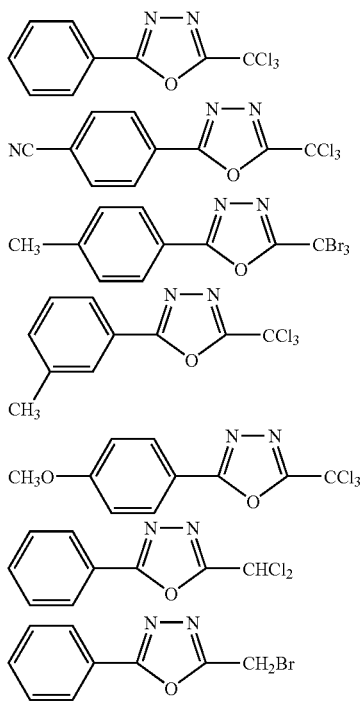

(1) Azo Compound

The azo compounds (i) favorable as the radical initiator for use in the invention include 2,2'-azobisisobutylonitrile, 2,2'-azobispropionitrile, 1,1'-azobis(cyclohexane-1-carbonitrile), 2,2'-azobis(2-methylbutylonitrile), 2,2'-azobis(2,4-dimethylvaleronitrile), 2,2'-azobis(4-methoxy-2,4-dimethylvaleronitrile), 4,4'-azobis(4-cyanovaleric acid), 2,2'-dimethyl azobisisobutyrate, 2,2'-azobis(2-methylpropionamidoxime), 2,2'-azobis[2-(2-imidazolin-2-yl)propane], 2,2'-azobis(2-methyl-N-[1,1-bis(hydroxymethyl)-2-hydroxyethyl]propionamide), 2,2'-azobis[2-methyl-N-2-hydroxyethyl)propionamide], 2,2'-azobis(N-butyl-2-methylpropionamide), 2,2'-azobis(N-cyclohexyl-2-methylpropionamide), 2,2'-azobis[N-2-propenyl)-2-methylpropionamide], 2,2'-azobis(2,4,4-trimethylpentane), and the like.

Still more preferable examples of the radical initiators according to the invention include the aromatic ketones (a), onium salt compounds (b), organic peroxides (c), hexaarylbiimidazole compounds (e), metallocene compounds (i), and compounds having a carbon-halogen bond (k) described above; and still more preferable examples include aromatic iodonium salts, aromatic sulfonium salts, titanocene compounds, and the trihalomethyl-S-triazine compounds represented by the formula (6).

The coinitiators may be used alone or in combination of two or more. The coinitiator (E) is contained in an amount of preferably 0.1 to 50% by mass, more preferably 0.5 to 30% by mass, and particularly preferably 5 to 20% by mass with respect to the total solid matters contained in the polymerizable composition.

Other Components

In the invention, a dye having a strong absorption in the visible light region may be used as an image colorant. Specific examples thereof include Oil Yellow #101, Oil Yellow #103, Oil Pink #312, Oil Green BG, Oil Blue BOS, Oil blue #603, Oil Black BY, Oil Black BS, Oil Black T-505 (manufactured by Orient Chemical Industries); Victoria Pure Blue, crystal violet (CI42555), methyl violet (CI42535), ethyl violet, rhodamine B (CI145170B), malachite green (CI42000), methylene blue (CI52015), and the dyes described in JP-A No. 62-293247. Other pigments such as phthalocyanine pigments, azo pigments, carbon black, and titanium oxide may be also used favorably.

These colorants are preferably added for easier differentiation between image and nonimage areas after image formation. The addition amount is 0.01 to 10% by mass with respect to the total solid matters in the polymerizable composition, similarly to the case when the composition is applied to the recording layer of image recording material or the like.

In the invention, a thermal polymerization inhibitor is also preferably added in a small amount for prevention of the undesirable thermal polymerization of polymerizable compounds during production or storage of the polymerizable composition. Examples of the suitable thermal polymerization inhibitors include hydroquinone, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol), N-nitroso-N-phenyl hydroxylamine aluminum salt, and the like. The amount of the thermal polymerization inhibitor to be added is preferably approximately 0.01 to approximately 5% by mass with respect to the mass of the entire composition. In addition, a higher fatty acid derivative such as behenic acid or behenic amide, or the like may be added as needed for prevention of the polymerization inhibition due to oxygen, and left localized on the surface of recording layer in the drying process after application. The amount of the higher fatty acid derivative added in entire composition is preferably approximately 0.1 to approximately 10% by mass.

The polymerizable composition according to the invention prepared as described above is a polymerizable composition superior in sensitivity and storage stability, and may be used for three-dimensional optical modeling or holography, or as an image-forming material such as planographic printing plate, color proof, photoresist, or color filter, or alternatively as an ink, paint, or adhesive, and particularly favorably as the recording layer of a negative planographic printing plate precursor.

Planographic Printing Plate Precursor

The planographic printing plate precursor according to the invention is a planographic printing plate precursor comprising a substrate and a recording layer containing the polymerizable composition according to the invention formed thereon.

The planographic printing plate precursor according to the invention may comprise as needed other layers such as backcoat layer, intermediate layer, and protective layer.

The polymerizable composition according to the invention for use as the recording layer of a planographic printing plate precursor may be prepared by dissolving the polymerizable composition in a solvent and coating the solution on a suitable substrate. In addition, various additives described below may be added, or various layers such as backcoat layer, intermediate layer, and protective layer may be formed depending on applications.

Examples of the solvents for use in preparing the recording layer-coating solution include, but are not limited to, ethylene dichloride, cyclohaxanone, methylethylketone, methanol, ethanol, propanol, ethylene glycol monomethylether, 1-methoxy-2-propanol, 2-methoxyethyl acetate, 1-methoxy-2-propyl acetate, dimethoxymethane, methyl lactate, ethyl lactate, N,N-dimethylacetamide, N,N-dimethylformamide, tetramethylurea, N-methylpyrrolidone, dimethylsulfoxide, sulfolane, γ-butylolactone, toluene, water, and the like. These solvents may be used alone or as a mixture. The concentration of the components (total solids including additives) above in solvent is preferably 1 to 50% by mass.

The coating amount (solid matter) as the recording layer on supporting after coating and drying may vary according to applications, but is generally, preferably 0.5 to 5.0 $g/m^2$ from the viewpoints of sensitivity and film properties, when the composition is used for production of planographic printing plate precursor.

Various coating methods including, for example, bar coater coating, spin coating, spray coating, curtain coating, dip coating, air knife coating, blade coating, roll coating, and the like, may be used as the coating method.

Further, the polymerizable composition according to the invention is favorably used as the recording layer of planographic printing plate precursor, and a surfactant such as the nonionic surfactant described in JP-A Nos. 62-251740 and 3-208514, the amphoteric surfactant described in JP-A Nos. 59-121044 and 4-13149, and the fluorochemical surfactant described in JP-A No. 62-170950 may be added, for improving the stability thereof under the developing condition of the recording layer.

Specific examples of the nonionic surfactants include sorbitan tristearate, sorbitan monopalmitate, sorbitan trioleate, stearic acid monoglyceride, polyoxyethylene nonylphenylether, and the like.

Specific examples of the amphoteric surfactant include alkyldi(aminoethyl)glycine, alkylpolyaminoethylglycine hydrochloride salt, 2-alkyl-N-carboxyethyl-N-hydroxyethylimidazolinium betaine, N-tetradecyl-N,N-betaines (for example, trade name: Amorgen K, manufactured by Daiichi Kogyo), and the like.

The content of the surfactants in the recording layer-coating solution is preferably 0.05 to 15% by mass and more preferably 0.1 to 5% by mass.

In addition, a plasticizer is added to the recording layer-coating solution according to the invention as needed, for providing the coated layer with flexibility or the like. Examples thereof include polyethylene glycol, tributyl citrate, diethyl phthalate, dibutyl phthalate, dihexyl phthalate, dioctyl phthalate, tricresyl phosphate, tributyl phosphate, trioctyl phosphate, tetrahydrofurfuryl oleate, and the like.

Support

The support for use when a planographic printing plate precursor is formed by using the polymerizable composition according to the invention is not particularly limited if it is a dimensionally stable plate, and examples thereof include papers, papers laminated with a plastic resin (for example, polyethylene, polypropylene, polystyrene, etc.), metal plates (for example, aluminum, zinc, copper, etc.), plastic films (e.g., cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, etc.), and the like. The support may be a single component sheet, for example, of a resin film or a metal plate, or a laminated sheet of two or more materials, and examples thereof include papers and plastic films laminated or deposited with the metals above, laminated sheets of different plastic films, and the like.

The supporting plate usable in the invention is preferably a polyester film or aluminium plate, and particularly preferable an aluminium plate, as it is superior in dimensional stability and relatively cheap. The supporting plate usable in the invention is preferably a polyester film or aluminium plate, and particularly preferable an aluminium plate, as it is superior in dimensional stability and relatively cheap. The foreign elements in the aluminium alloys include silicon, iron, manganese, copper, magnesium, chromium, zinc, bismuth, nickel, and titanium. The content of the foreign elements in the alloy is 10% by mass at the maximum. Although the most preferable aluminium in the invention is pure aluminium, the aluminum plate may contain a small amount of foreign elements, as it is difficult to prepare completely pure aluminium due to the problems in refining process. As described above, the aluminium plates to be used in the invention are not particularly specified, and any one of the aluminium plates known and used in the art may be used arbitrarily. The thickness of the aluminium plates used in the invention is about 0.1 mm to 0.6 mm, preferably 0.15 mm to 0.4 mm, and particularly preferably 0.2 mm to 0.3 mm.

If desired, the surface of the aluminum plate is subjected, before surface roughening, to degreasing treatment for removing the rolling oils on the surface thereof, with a surfactant, organic solvent, aqueous alkaline solution, or the like. Various methods may be used for surface roughening of aluminium plates, and examples thereof include methods of scratching mechanically, dissolving the surface electrochemically, and dissolving selectively the surface chemically. The mechanical methods include methods known in the art such as ball milling, brush milling, blast milling, and buff milling. The electrochemical surface roughening may be conducted, for example, in an electrolyte containing hydrochloric acid or nitric acid by applying alternate or direct current. Alternatively, the combined mechanical and electrochemical method described in JP-A No. 54-63902 may also be sued.

The aluminium plate scratched in this manner may be etched in an alkaline solution and neutralized and then subjected to an anodizing process if desired for improvement in the water holding property and abrasion resistance of the surface. Various electrolytes that can form porous oxide layer may be used as the electrolyte used in the anodizing process of the aluminium plates, and generally include sulfuric acid, phosphoric acid, oxalic acid, chromic acid and the mixture thereof. The concentrations of these electrolytes are decided according to the kinds of the electrolytes.

The conditions for the anodic oxidation vary according to the electrolytes used and are not particularly specified, but are generally suitable if the concentration of the electrolytes is 1 to 80% by mass; liquid temperature, 5 to 70° C.; the electric current density, 5 to 60 A/dm$^2$; the voltage, 1 to 100 V; and the electrolysis period, 10 seconds to 5 minutes.

The amount of the anodized layer is in the range of preferably 1.0 g/m$^2$ or more and more preferably 2.0 to 6.0 g/m$^2$. The anodized layer formed on the film in an amount of less than 1.0 g/m$^2$ tends to provide insufficient printing durability and the nonimage portions of the planographic printing plate more susceptible to damages, and consequently the problems of "scratch staining" that inks adhere to the damaged portions during printing. Although the anodizing processing is performed on the printing surface of planographic printing plate support, an anodized layer of 0.01 to 3 g/m$^2$ in thickness is generally formed on the rear face for prevention of the adverse effects by the electric lines of force reaching there.

Any one of the methods commonly practiced in the art may be used for hydrophilization of substrate surfaces after the anodizing processing. An example of the hydrophilizing treatment used in the invention is the treatment with an alkali metal silicate (e.g., aqueous sodium silicate solution) disclosed in U.S. Pat. Nos. 2,714,066, 3,181,461, 3,280,734 and 3,902,734. By this method, the supporting plate is immersed and treated in an aqueous sodium silicate solution or electrolyzed. Alternatively, the supporting plate may be subjected to the methods of treating it with potassium fluorozirconate disclosed in JP-B No. 36-22063 and of treating it with polyvinylphosphonic acid disclosed in U.S. Pat. Nos. 3,276,868, 4,153,461, and 4,589,272.

Among these methods, particularly preferable in the invention is the silicate salt treatment. The silicate salt treatment will be described below.

The aluminum plate carrying the anodized oxide layer formed as described above is immersed in an aqueous solution containing an alkali metal silicate salt at a concentration of 0.1 to 30% by mass, preferably 0.5 to 10% by mass and having a pH of 10 to 13 at 25° C., for example, at 15 to 80° C. for 0.5 to 120 seconds. A pH of the aqueous alkali metal silicate salt solution of less than 10 leads to gelation of the solution, while a pH of higher than 13.0 to dissolution of the oxide film. Examples of the alkali metal silicate salts for use in the invention include sodium silicate, potassium silicate, lithium silicate, and the like. Hydroxides used for raising the pH of the aqueous alkali metal silicate salt solution include sodium hydroxide, potassium hydroxide, hydroxide lithium, and the like. An alkali earth metal salt or a Group-IVB metal salt may be added to the processing solution above. Examples of the alkali earth metal salts include water-soluble salts including nitrate salts such as calcium nitrate, strontium nitrate, manganese nitrate, barium nitrate, sulfate salts, hydrochloride salts, phosphate salts, acetate salts, oxalate salts, borate salts, and the like. Examples of the Group-IVB metal salts include titanium tetrachloride, titanium trichloride, titanium potassium fluoride, titanium potassium oxalate, titanium sulfate, titanium tetraiodide, zirconium chloride oxide, zirconium dioxide, zirconium oxychloride, zirconium tetrachloride, and the like. The alkali earth metal salts or the Group-IVB metal salts may be used alone or in combination of two or more. The content of these metal salts is in the range of preferably 0.01 to 10% by mass and more preferably 0.05 to 5.0% by mass.

The silicate salt treatment improves the hydrophilicity of the aluminum plate surface further, prohibiting ink to adhere onto the nonimage portion and improving the smut resistance of the plate.

Backcoat Layer

A backcoat layer is formed as needed on the rear face of the support.

A metal oxide film prepared by hydrolysis and polycondensation of the organic polymer compound described in JP-A No. 5-45885 or the organic or inorganic metal compounds described in JP-A No. 6-35174 is favorably used as the backcoat. Among these films, metal oxide films prepared from silicon alkoxides are particularly preferable, because the silicon alkoxide compounds such as $Si(OCH_3)_4$, $Si(OC_2H_5)_4$, $Si(OC_3H_7)_4$, and $Si(OC_4H_9)_4$ can be obtained cheaply and the films are superior in development endurance.

Intermediate Layer

An intermediate layer may be formed between the recording layer and the support on the planographic printing plate precursor according to the invention, for improving the adhesiveness and smut resistance of the plate. Specific examples of the intermediate layer include those described in JP-B No. 50-7481; JP-A Nos. 54-72104, 59-101651, 60-149491, 60-232998, 3-56177, 4-282637, 5-16558, 5-246171, 7-159983, 7-314937, 8-202025, 8-320551, 9-34104, 9-236911, 9-269593, 1069092, 10-115931, 10-161317, 10-260536, 10-282682, and 11-84674; Japanese Patent Application Nos. 8-225335, 8-270098, 9-195863, 9-195864, 9-89646, 9-106068, 9-183834, 9-264311, 9-127232, 9-245419, 10-127602, 10-170202, 11-36377, 11-165861, 11-284091, and 2000-14697; and others.

Protective Layer

A protective layer (also called overcoat layer) is normally, preferably formed additionally on the recording layer of a planographic printing plate precursor carrying the recording layer of the polymerizable composition according to the invention, for enabling exposure in air. The protective layer allows exposure in air, by preventing penetration into the photosensitive layer of oxygen and low-molecular weight compounds including basic materials present in air which inhibit the image formation reaction in the photosensitive layer caused by exposure. Accordingly, the most important property for the protective layer is lower penetration of low-molecular weight compound such as oxygen, and the protective layer, which practically does not interfere the penetration of light used for exposure, has a superior adhesiveness to the photosensitive layer, and is easily removed in the developing step after exposure, is desirable. There are many studies for improvement of the protective layer in the past, and some of them are described in detail in U.S. Pat. No. 3,458,311 and JP-B No. 55-49729. Materials usable for the protective layer are preferably water-soluble polymer compounds relatively higher in crystallinity, and specific examples thereof include water-soluble polymers such as polyvinyl alcohol, polyvinylpyrrolidone, acidic celluloses, gelatin, gum arabic, polyacrylic acid, and among them, polymers having polyvinyl alcohol as the primary component are most effective in improving the basic properties the protective layer such as oxygen-blocking property and removability during development.

The polyvinyl alcohol for use in protective layer may be partly substituted in the form of ester, ether and acetal, if it has some unsubstituted vinyl alcohol units necessary for desirable oxygen-blocking property and water-solubility. In addition, the polyvinyl alcohol may contain some other copolymerization components. Specific examples of the polyvinyl alcohols are those that are hydrolyzed at an amount of 71 to 100%, and having a molecular weight in the range of 300 to 2,400. Specific examples thereof include PVA-105, PVA-110, PVA-117, PVA-117H, PVA-120, PVA-124, PVA-124H, PVA-CS, PVA-CST, PVA-HC, PVA-203, PVA-204, PVA-205, PVA-210, PVA-217, PVA-220, PVA-224, PVA-217EE, PVA-217E, PVA-220E, PVA-224E, PVA-405, PVA-420, PVA-613, and L-8, manufactured by Kuraray Co. Ltd. and the like.

The components of the protective layer (kind of PVA, use of other additives) and the amounts thereof are determined according to the desirable oxygen-blocking property, removability during development, background oil, adhesiveness, and scratch resistance of the protective layer. Generally, the oxygen-blocking property and thus the sensitivity become greater, as the hydrolysis ratio of the PVA used becomes higher (as the content of unsubstituted vinyl alcohol units in the protective layer becomes higher) and the film thickness becomes larger. However, excessive increase in oxygen-blocking property may lead to the problems of generation of undesirable polymerization reaction during production and storage and of undesirable background soil, and thickening of image lines during image exposure. In addition, adhesiveness to image portion and scratch resistance are also very important in handling the plates. When a hydrophilic layer of a water-soluble polymer is formed over a lipophilic photosensitive layer, the hydrophilic layer is often separated due to insufficient adhesive power, and the photosensitive layer in the separated region causes defects such as improper hardening of the layer due to the polymerization inhibition by oxygen. Various methods are proposed for improvement in the adhesiveness between the two layers. For example, it was disclosed in U.S. Pat. Nos. 292,501 and 44,563 that a hydrophilic layer having a sufficiently large adhesiveness can be prepared by mixing an acrylic emulsion or a water-insoluble vinylpyrrolidone-vinyl acetate copolymer in a hydrophilic polymer mainly containing polyvinyl alcohol in an amount of 20 to 60% by weight and coating the resulting composition onto a photosensitive layer.

Any one of these known methods may be used for the protective layer according to the invention. Methods of applying these protective layers are described in detail, for example, in U.S. Pat. No. 3,458,311 and JP-B No. 55-49729.

Accordingly, combined use of polyvinyl alcohol and polyvinylpyrrolidone is preferably in the invention, from the viewpoints of adhesiveness, sensitivity, and undesirable background soil. The ratio of polyvinyl alcohol/polyvinylpyrrolidone (weight ratio) is preferably 3/1 or less. The coating amount is preferably 1.0 to 3.0 g/m$^2$.

Exposure, Development, and Printing

Images can be recorded on the planographic printing plate precursor carrying a recording layer of the polymerizable composition according to the invention on the support surface by using infrared laser. It is also possible to record images by using a ultraviolet lamp or a thermal head. In the invention, favorable is image exposure by using an infrared light-emitting solid state or semiconductor laser emitting a light having a wavelength of 760 to 1,200 nm.

After exposure to infrared laser, the planographic printing plate precursor is preferably developed with water or an aqueous alkaline solution.

If an aqueous alkaline solution is used as the developing solution, any one of known aqueous alkaline solutions may be used as developing and replenishing solutions for the polymerizable composition according to the invention. Examples of the alkali compounds include inorganic alkali salts such as sodium silicate, potassium silicate, trisodium phosphate, tripotassium phosphate, triammonium phosphate, disodium phosphate, dipotassium phosphate, diammonium phosphate, sodium carbonate, potassium carbonate, ammonium carbonate, sodium bicarbonate, potassium bicarbonate, ammonium bicarbonate, sodium borate, potassium borate, ammonium borate, sodium hydroxide, ammonium hydroxide, potassium hydroxide, and lithium hydroxide, organic bases such as monomethylamine, dimethylamine, trimethylamine, monoethylamine, diethylamine, triethylamine, monoisopropylamine, diisopropylamine, triisopropylamine, N-butylamine, monoethanolamine, diethanolamine, triethanolamine, monoisopropanolamine, diisopropanolamine, ethyleneimine, ethylenediamine, pyridine; and the like. These alkali agents may be used alone or in combination of two or more.

In addition, it is known that it is possible to develop a greater number of planographic printing plate precursors in automatic developing machine without exchanging the developing solution in developing tank for an extended period of time, by adding the same developing solution or an aqueous solution (replenishing solution) higher in alkali strength than the developing solution thereto. The replenishing method is favorable applied also to the present invention.

Various surfactants and organic solvents may be added if needed to the developing and replenishing solutions for the purpose of accelerating or suppressing the printing efficiency, dispersing the development scum, and improving the hydrophilicity of the image portions of the printing plate. Preferable surfactants include anionic, cationic, nonionic and amphoteric surfactants. Preferable organic solvents include benzyl alcohol and the like. Addition of polyethylene glycol or the derivative thereof, or poly propylene glycol or the derivative thereof, or the like is also preferable. Further, a nonreducing sugar such as arabit, sorbit, or mannitol may be added.

In addition, hydroquinone, resorcin, a reducing agent such as sodium or potassium salt of an inorganic acid such as sodium or potassium sulfite and bisulfite, an organic carboxylic acid, an antifoam agent, and/or a water softener may be added if needed to the developing and replenishing solutions.

The printing plate processed using the developing and replenishing solutions is then post-treated with washing water, a rinsing solution containing surfactants and the like, and/or a desensitizing solution containing gum arabic or a starch derivative. If used as a planographic printing plate, the image recording material according to the invention may be post-processed in combination of these treatments.

Recently, automatic-developing machines for the printing plates have been widely used for the purpose of streamlining and standardizing the plate-making processes in the printing-plate and printing industries. The automatic developing machines generally consist of a developing unit, a post-treatment unit, a unit for conveying printing plates, various solution stock tanks, and units for spraying the solutions, wherein the exposed printing plates are developed while they are conveyed horizontally and sprayed via spray nozzles with the solutions pumped out from the tanks. Also known is another kind of automatic developing systems, wherein the printing plates are conveyed while immersed in treatment solution tanks filled with treating solutions one after another by means of the submerged guide rolls or the like. In such automatic processing, the plates are processed while the solution tanks are periodically replenished with the replenishing solutions according to the number of the plates and the period of processing. The replenishing solution may be filled automatically by detecting the electric conductivity with a sensor. In addition, the method of using only essentially unused treating solutions, i.e., single-round method, may also be used in the invention.

The developed planographic printing plate thus obtained may further coated with a desensitizing gum if desired before it is sent to the printing process; or the plate is additionally subjected to a burning treatment if desired for the purpose of obtaining planographic printing plates higher in printing durability.

If the planographic printing plates are to be burned, the plates are preferably treated before the burning treatment with an affinitizing solution described in JP-B Nos. 61-2518 and 55-28062 and JP-A Nos. 62-31859 and 61-159655.

The methods include application of the affinitizing solution onto planographic printing plate with sponge or cotton moistened therewith, application by immersing the printing plate into a bath filled with the affinitizing solution, and application by an automatic coater. Additionally, adjustment of the coating amount to uniformity by using a squeezee or a squeezee roller after application of the affinitizing solution provides further preferable results.

The suitable coating amount of the affinitizing solution is generally 0.03 to 0.8 g/m$^2$ (as dry mass).

The planographic printing plate applied with the affinitizing solution is then dried if needed and heated at high temperature in a burning processor (e.g., Burning Processor BP-1300 sold by Fuji Photo Film). The temperature and the period of the heating vary according to the kind of the components constituting the images, but are preferably in the range of 180 to 300° C. and of 1 to 20 minutes.

The planographic printing plate after the burning treatment may be then subjected if needed to treatments commonly practiced in the art such as water washing and gumming, but if an affinitizing solution containing a water-soluble polymer compound or the like is used, so-called desensitizing treatments such as gumming and the like may be eliminated.

The planographic printing plates obtained after these treatments are then supplied to an offset printing machine or the like, wherein they are used for printing numerous papers.

EXAMPLES

Hereinafter, the present invention will be described in detail with reference to Examples, but it should be understood that the invention is not deemed to be limited thereto. In the Examples of the invention, the polymerizable compositions according to the invention are evaluated as the planographic printing plate precursors carrying the compositions, and the results are regarded as those of the polymerizable composition according to the invention.

Examples 1 to 17, and Comparative Examples 1 to 3

Preparation of Support

A 99.5% pure molten JIS A1050 alloy containing 0.30% Fe, 0.10% Si, 0.02% Ti, and 0.013% Cu was purified and cast. The molten alloy was purified by deaeration for removal of undesirable gases such as hydrogen in the molten alloy and filtration through a ceramic tube filter. The casting was performed by the DC casting method. The solidified plate having a thickness of 500 mm was ground from the surface to a depth of 10 mm, and annealed at 550° C. for 10 hours for prevention of granulation of the intermetallic compounds.

Then, the plate was hot-rolled at 400° C., annealed in a continuous annealing oven at 500° C. for 60 seconds, and then cold-rolled into a rolled aluminum plate having a thickness of 0.30 mm. The average surface roughness Ra of the plate on the centerline after cold rolling was controlled to 0.2 μm, by adjusting the roughness of the roll. The plate was additionally processed in a tension leveler for improvement in its planarity.

Then, the plate was subjected to a surface treatment for production of a planographic printing plate support. The plate was degreased in an aqueous 10% sodium aluminate solution at 50° C. for 30 seconds for removal of the rolling oil remaining on the aluminum plate surface, and then neutralized and desmutted with an aqueous 30% sulfuric acid solution at 50° C. for 30 seconds.

The plate was then subjected to a so-called surface roughening, a treatment for roughening the surface, for improvement in the adhesiveness between support and recording layer and for providing nonimage areas with water holding property. The aluminum web was supplied continuously into an aqueous solution containing 1% nitric acid an 0.5% aluminum nitrate at 45° C., and surface-roughened under an anodic electric charge of 240 c/dm$^2$ by using an alternate current at an electric current density of 20 A/dm$^2$ and a duty ratio of 1:1 supplied from an indirect power cell. The aluminum web was then etched in an aqueous 10% sodium aluminate solution at 50° C. for 30 seconds, and neutralized and desmutted in an aqueous 30% sulfuric acid solution at 50° C. for 30 seconds.

It is further anodized forming an oxide film on the support, for improvement in abrasion resistance, chemical resistance, and water holding property. The electrolyte used was an aqueous 20% sulfuric acid solution at 35° C., and the aluminum web is continuously supplied into the electrolyte and electrolyzed under the load of a direct current of 14 A/dm$^2$ supplied from an indirect power cell, to give an anodized layer of 2.5 g/m$^2$ in thickness.

Formation of Recording Layer

A recording layer-coating solution 1 having the following composition was prepared, coated on the aluminum support thus prepared with a wire bar, and dried in a hot air dryer at 115° C. for 45 seconds, forming a recording layer. The coating amount after drying was in the range of 1.2 to 1.3 g/m$^2$.

In addition, an overcoat layer-coating solution A or an overcoat layer-coating solution B having the following composition was coated thereon by using a slide hopper, dried in a hot air dryer at 120° C. for 75 seconds. In each of the Examples and the Comparative Examples, 2 kinds of planographic printing plate precursor samples (having overcoat layers formed with the overcoat layer-coating solutions A and B) were prepared. The coating amount of the overcoat layer was 2.3 g/m$^2$.

Recording Layer-Coating Solution 1

(A) Compound represented by the formula (I) or another radical initiator (compound shown in Table 1) 0.35 g (B) infrared absorbent (compound shown in Table 2) 0.08 g (C) Compound having at least one addition-polymerizable ethylenically unsaturated bond (A-BPE-4, manufactured by Shin-Nakamura Chemical) 2.0 g (D) Binder polymer (compound shown in Table 2) 2.0 g Fluorochemical surfactant (Magafac F-177, manufactured by Dainippon Ink and Chemicals, Inc.) 0.01 g Methylethylketone 9.0 g Propylene glycol monomethylether 8.0 g Methanol 10.0 g Overcoat Layer-Coating Solution A Polyvinyl alcohol 2.5 g (saponification value: 98.5 mole % and polymerization degree: 500)

Polyvinylpyrrolidone 0.5 g (K30, manufactured by Tokyo Kasei Kogyo Co., molecular weight: 40,000)

Nonionic surfactant 0.05 g (EMAREX NP-10, manufactured by Nihon-Emulsion Co., Ltd.)

Ion-exchange water 96.95 g

Overcoat Layer-Coating Solution B

Polyvinyl alcohol 0.5 g (saponification value: 98.5 mole %, and polymerization degree: 500)

Polyvinylpyrrolidone 2.5 g (K30, manufactured by Tokyo Kasei Kogyo Co., molecular weight: 40,000)

Nonionic surfactant 0.05 g (EMAREX NP-10, manufactured by Nihon-Emulsion Co., Ltd.)

Ion-exchange water 96.95 g

The compound of component (A) used in each Example is an exemplary compound of the component (A) according to the invention, and compounds (S-1) and (S-2) used in Comparative Examples are the compounds (radical initiators) having the structures below, which are without the scope of the invention.

Structures of the infrared absorbents (IR-1) to (IR-3) used in Examples and Comparative Examples are shown below:

IR-1
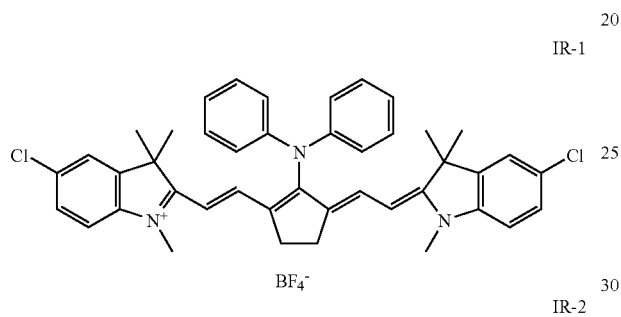
BF$_4^-$

IR-2
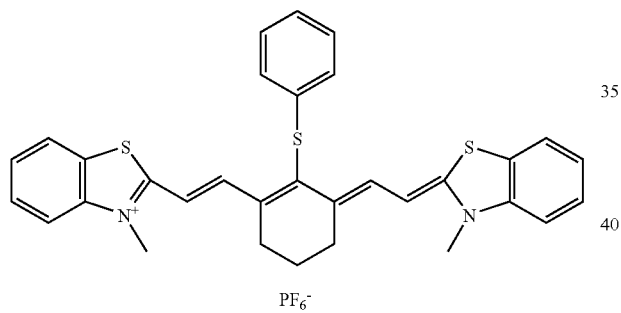
PF$_6^-$

IR-3
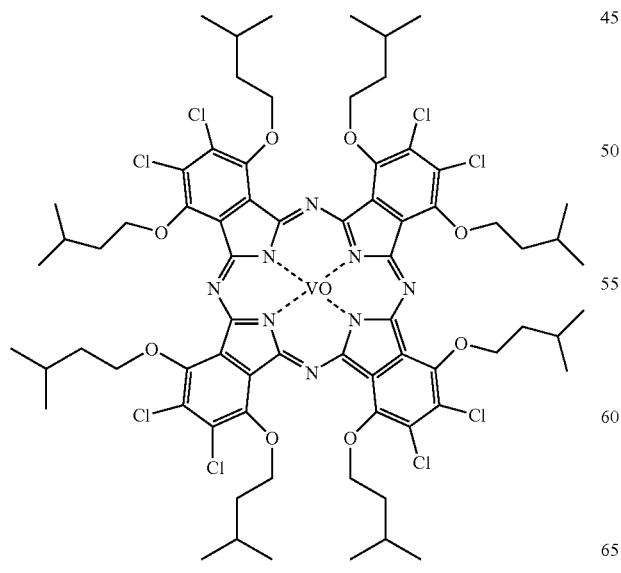

Then, structures of the binder polymers (B-1) to (B-3) used in Examples and Comparative Examples are shown below:

(B-1)
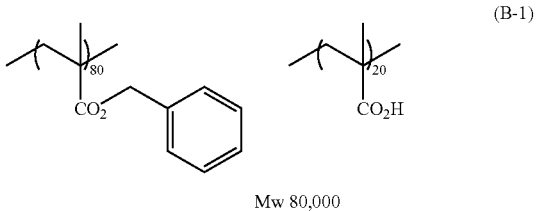
Mw 80,000

(B-2)
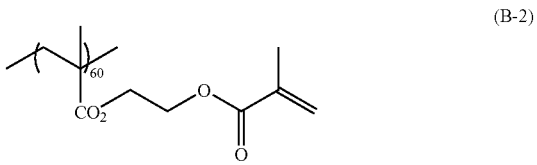

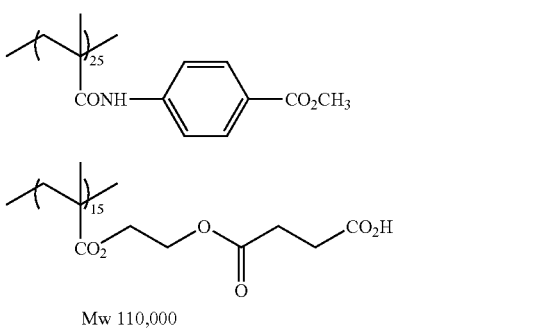
Mw 110,000

(B-3)
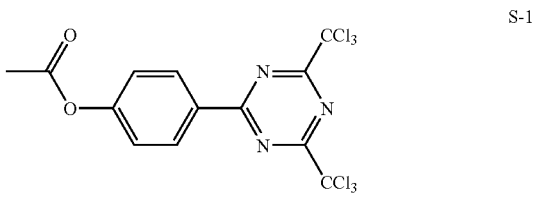

Mw 65,000

In addition, structures of the radical (co)initiators (S-1) to (S-4) used in Examples and Comparative Examples are shown below:

S-1

-continued

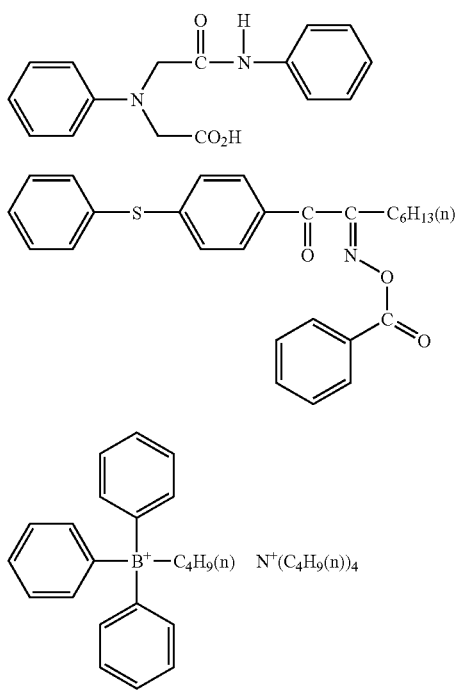

S-2

S-3

S-4

Exposure and Development

Each of the negative planographic printing plate precursors thus obtained was exposed and developed, to give a planographic printing plate. Details of the treatments are as follows:

Exposure

The negative planographic printing plate precursor obtained was exposed to light in the Trendsetter 3244VFS manufactured by Creo having a built-in water-cooled 40 W infrared ray semiconductor laser, under the condition of an output of 9 W, an external-drum rotational frequency of 210 rpm, and a resolution of 2,400 dpi.

Development

The exposed precursor was developed in an automatic developing machine Stablon 900N manufactured by Fuji Photo Film. The developing solutions, both original and replenishing solutions, used were 1:4 water-diluted solution of the DV-2 developing solution manufactured by Fuji Photo Film. The temperature of the developing bath was 30° C. In addition, the finisher used was 1:1 water-diluted solution of FN-6 manufactured by Fuji Photo Film (pH: 10.8).

Evaluation

1. Sensitivity and Dependence of Sensitivity on Oxygen Amount

For each of the planographic printing plate precursor carrying a overcoat layer A or B, a minimum energy needed for recording was calculated on the basis of the line width of the image obtained by the exposure (by an infrared laser having a wavelength of approximately 830 to 850 nm) and the development above, laser output, loss in optical system, and scanning speed. A smaller value indicates a higher sensitivity. Results are summarized in Table 2.

Separately, the dependence of the sensitivity on oxygen amount was examined by comparing the sensitivity when an overcoat layer A having a smaller oxygen permeability is used and that when an overcoat layer B having a larger oxygen permeability is used; and when there is no difference in sensitivity, the dependence of the sensitivity on the oxygen amount was judged to be smaller.

2. Storage Stability

Each planographic printing plate precursor carrying an overcoat layer A before laser exposure was left under a high humidity condition (45° C., 75% RH) for 3 days; then, the energy needed for recording by laser exposure was calculated similarly with respect to the photosensitive material after storage, and the ratio of the energies before and after storage at high humidity (energy after storage at high humidity/energy before storage at high humidity) was determined. An energy ratio of 1.1 or less is favorable both in production and storage. Results are summarized in Table 2.

3. Printing Durability

An image was printed on paper continuously in a printing machine R201 manufactured by Roland Corporation by using each planographic printing plate carrying an overcoat layer A and an ink GEOS-G(N) manufactured by Dainippon Ink and Chemicals, Inc., and counted the number of the papers printed until the image became thinner by visual observation of the broadly painted area. A greater number indicates a better printing durability. Results are summarized in Table 2.

4. Smut Resistance

By using each planographic printing plate obtained after the exposure and development, an image was printed continuously on 10,000 papers similarly to 3, and the smut or stain in the print after printing on 10,000 papers was evaluated by visual observation. Results are summarized in Table 2.

The results are grouped into three classes: No smut, A; practically no problem, B; and significantly stained, C.

TABLE 2

| | (A) Compound represented by Formula (I), or another radical initiator | (B) Infrared absorbent | (D) Binder | Sensitivity (mJ/cm²) | | Storage stability (ratio) | Printing durability (×10,000 papers) | Smut resistance |
| | | | | OC coating solution A | OC coating solution B | | | |
|---|---|---|---|---|---|---|---|---|
| Example 1 | A-1 | IR-1 | B-2 | 110 | 105 | 1.1 | 6.0 | A |
| Example 2 | A-2 | IR-1 | B-2 | 120 | 120 | 1.1 | 6.1 | A |
| Example 3 | A-3 | IR-1 | B-2 | 100 | 105 | 1.2 | 7.3 | A |
| Example 4 | A-5 | IR-1 | B-2 | 85 | 90 | 1.1 | 8.2 | A |
| Example 5 | A-6 | IR-1 | B-2 | 80 | 80 | 1.1 | 8.3 | A |

TABLE 2-continued

| | (A) Compound represented by Formula (I), or another radical initiator | (B) Infrared absorbent | (D) Binder | Sensitivity (mJ/cm²) OC coating solution A | Sensitivity (mJ/cm²) OC coating solution B | Storage stability (ratio) | Printing durability (×10,000 papers) | Smut resistance |
|---|---|---|---|---|---|---|---|---|
| Example 6 | A-8 | IR-1 | B-2 | 60 | 65 | 1.1 | 8.9 | A |
| Example 7 | A-9 | IR-1 | B-2 | 50 | 55 | 1.0 | 11.0 | A |
| Example 8 | A-9 | IR-2 | B-2 | 55 | 55 | 1.0 | 11.0 | A |
| Example 9 | A-9 | IR-3 | B-2 | 55 | 55 | 1.0 | 10.8 | A |
| Example 10 | A-11 | IR-1 | B-2 | 60 | 60 | 1.0 | 10.3 | A |
| Example 11 | A-17 | IR-1 | B-2 | 65 | 70 | 1.0 | 10.0 | A |
| Example 12 | A-21 | IR-1 | B-2 | 70 | 75 | 1.1 | 8.9 | A |
| Example 13 | A-28 | IR-1 | B-2 | 60 | 60 | 1.0 | 9.7 | A |
| Example 14 | A-29 | IR-1 | B-2 | 45 | 45 | 1.0 | 11.5 | A |
| Example 15 | A-36 | IR-1 | B-2 | 40 | 40 | 1.0 | 11.7 | A |
| Example 16 | A-9 | IR-1 | B-1 | 110 | 120 | 1.1 | 5.7 | B |
| Example 17 | A-9 | IR-1 | B-3 | 105 | 110 | 1.1 | 5.9 | B |
| Comparative Example 1 | S-1 | IR-1 | B-2 | 140 | 210 | 2.0 | 5.0 | B |
| Comparative Example 2 | S-3 | IR-1 | B-2 | 140 | 220 | 2.0 | 4.3 | B |
| Comparative Example 3 | S-3 | IR-1 | B-1 | 150 | 220 | 2.0 | 4.8 | C |

As apparent from Table 2, the planographic printing plate precursors of Examples 1 to 17 employing a compound represented by the formula (I) according to the invention as the component (A) were superior in sensitivity, dependence of sensitivity on oxygen amount, storage stability, printing durability, and smut resistance to the planographic printing plate precursors of Comparative Examples 1 to 4 employing the compound outside the scope of the invention as component (A).

Examples 18 to 34, and Comparative Examples 4 to 6

Formation of Undercoat Layer

An undercoat solution having the following composition was coated on an aluminum support similar to that in Example 1 with a wire bar, and dried in a hot air dryer at 90° C. for 30 seconds. The coating amount after drying was 10 mg/m².

Undercoat Solution

β-Alanine 0.1 g

Phenylphosphonic acid 0.1 g

Methanol 40 g

Pure water 60 g

Formation of Recording Layer

Separately, a recording layer-coating solution 2 having the following composition was prepared, coated on the aluminum plate having the undercoat layer with a wire bar, and dried in a hot air dryer at 115° C. for 45 seconds, forming a recording layer. The coating amount of the recording layer after drying was in the range of 1.2 to 1.3 g/m². Then, an overcoat layer-coating solution A or B similar to Example 1 was coated thereon by using a slide hopper coating and dried in a hot air dryer at 120° C. for 75 seconds, to give a planographic printing plate precursor. The coating amount of the overcoat layer was 2.3 g/m².

Recording Layer-Coating Solution 2

(A) Compound represented by the formula (I) or another radical initiator (compound shown in Table 1) 0.35 g (B) infrared absorbent (compound shown in Table 3) 0.08 g (C) Compound having at least one addition-polymerizable ethylenically unsaturated bond (A-BPE-4, manufactured by Shin-Nakamura Chemical) 2.0 g (D) Binder polymer (compound shown in Table 3) 2.0 g (E) Coinitiator (compound shown in Table 3) 0.35 g Fluorochemical surfactant (Magafac F-177, manufactured by Dainippon Ink and Chemicals, Inc.) 0.01 g Victoria Pure Blue, naphthalenesulfonate salt 0.04 g Methylethylketone 9.0 g Propylene glycol monomethylether 8.0 g Methanol 10.0 g Exposure and Development Exposure and development of the negative planographic printing plate precursors was performed in a similar manner to Example 1.

Evaluation

The sensitivity, dependence of sensitivity on oxygen amount, storage stability, printing durability, and smut resistance of each planographic printing plate obtained were determined in a similar manner to Example 1. Results are summarized in Table 3.

TABLE 3

| | (A) Compound represented by Formula (I), or another radical initiator | (B) Infrared absorbent | (D) Binder | (E) Coinitiator | Sensitivity (mJ/cm²) OC coating solution A | Sensitivity (mJ/cm²) OC coating solution B | Storage stability (ratio) | Printing durability (×10,000 papers) | Smut resistance |
|---|---|---|---|---|---|---|---|---|---|
| Example 18 | A-1 | IR-1 | B-2 | S-2 | 105 | 105 | 1.1 | 6.5 | A |
| Example 19 | A-3 | IR-1 | B-2 | S-2 | 90 | 90 | 1.1 | 5.9 | A |
| Example 20 | A-4 | IR-1 | B-2 | S-2 | 100 | 105 | 1.1 | 7.0 | A |
| Example 21 | A-7 | IR-1 | B-2 | S-2 | 85 | 85 | 1.2 | 8.2 | A |
| Example 22 | A-9 | IR-1 | B-2 | S-2 | 45 | 45 | 1.0 | 11.3 | A |
| Example 23 | A-9 | IR-1 | B-2 | S-4 | 55 | 60 | 1.0 | 11.1 | A |
| Example 24 | A-9 | IR-2 | B-2 | S-2 | 60 | 60 | 1.0 | 10.4 | A |
| Example 25 | A-9 | IR-2 | B-2 | S-4 | 60 | 60 | 1.1 | 10.3 | A |
| Example 26 | A-9 | IR-3 | B-2 | S-2 | 55 | 55 | 1.0 | 10.5 | A |
| Example 27 | A-9 | IR-3 | B-2 | S-4 | 60 | 65 | 1.1 | 10.3 | A |
| Example 28 | A-18 | IR-1 | B-2 | S-2 | 75 | 80 | 1.1 | 8.8 | A |
| Example 29 | A-20 | IR-1 | B-2 | S-2 | 80 | 85 | 1.0 | 8.9 | A |
| Example 30 | A-23 | IR-1 | B-2 | S-2 | 55 | 55 | 1.0 | 8.8 | A |
| Example 31 | A-29 | IR-1 | B-2 | S-2 | 40 | 40 | 1.1 | 11.0 | A |
| Example 32 | A-36 | IR-1 | B-2 | S-2 | 35 | 35 | 1.0 | 12.7 | A |
| Example 33 | A-9 | IR-1 | B-1 | S-2 | 105 | 105 | 1.1 | 5.9 | B |
| Example 34 | A-9 | IR-1 | B-3 | S-2 | 105 | 110 | 1.1 | 6.0 | B |
| Comparative Example 4 | S-1 | IR-1 | B-2 | S-2 | 140 | 220 | 1.7 | 5.1 | B |
| Comparative Example 5 | S-3 | IR-1 | B-2 | S-2 | 140 | 200 | 1.7 | 4.4 | B |
| Comparative Example 6 | S-3 | IR-1 | B-3 | S-2 | 140 | 200 | 1.5 | 5.3 | C |

As apparent from Table 3, the planographic printing plate precursors of Examples 18 to 34 employing a compound represented by the formula (I) according to the invention as the component (A) were superior in sensitivity, dependence of sensitivity on oxygen amount, storage stability, printing durability, and smut resistance to the planographic printing plate precursors of Comparative Examples 4 to 6 employing the compound outside the scope of the invention as component (A).

Examples 35 to 51, and Comparative Examples 7 to 9

Formation of Undercoat Layer

An aluminum support similar to that in Example 1 was surface-treated for ensuring hydrophilicity of the printing plate nonimage portion. The aluminum web was continuously supplied into an aqueous 1.5% No. 3 sodium silicate solution kept at 70° C. at a contact time of 15 seconds, and the washed with water. The amount of Si adhered was 10 mg/m². The Ra (centerline surface roughness) of the support thus obtained was 0.25 μm.

Formation of Recording Layer

A recording layer-coating solution 3 having the following composition was coated on the aluminum support carrying the undercoat layer with a wire bar and dried in a hot air dryer at 115° C. for 45 seconds, forming a recording layer. The coating amount after drying was in the range of 1.2 to 1.3 g/m².

Recording Layer-Coating Solution 3

(A) Compound represented by the formula (1) or another radical initiator (compound shown in Table 4) 0.35 g (B) infrared absorbent (compound shown in Table 4) 0.08 g (C) Compound having at least one addition-polymerizable ethylenically unsaturated bond (dipentaerythritol hexaacrylate) 2.0 g (D) Binder polymer (compound shown in Table 4) 2.0 g (E) Coinitiator (compound shown in Table 4) 0.35 g Victoria Pure Blue, naphthalenesulfonate salt 0.04 g Fluorochemical surfactant 0.01 g (Magafac F-176, manufactured by Dainippon Ink and Chemicals, Inc.)

Methylethylketone 9.0 g

Methanol 10.0 g

1-Methoxy-2-propanol 8.0 g

Exposure and Development

Exposure and development of the negative planographic printing plate precursors was performed in a similar manner to Example 1.

Evaluation

The sensitivity, dependence of sensitivity on oxygen amount, storage stability, printing durability, and smut resistance of each planographic printing plate obtained were determined in a similar manner to Example 1. Results are summarized in Table 4.

TABLE 4

| | (A) Compound represented by Formula (I), or another radical initiator | (B) Infrared absorbent | (D) Binder | (E) Coinitiator | Sensitivity (mJ/cm²) | Storage stability (ratio) | Printing durability (×10,000 papers) | Smut resistance |
|---|---|---|---|---|---|---|---|---|
| Example 35 | A-9 | IR-1 | B-2 | None | 105 | 1.2 | 7.5 | A |
| Example 36 | A-9 | IR-1 | B-2 | S-2 | 70 | 1.0 | 11.3 | A |
| Example 37 | A-9 | IR-1 | B-2 | S-4 | 75 | 1.0 | 11.1 | A |
| Example 38 | A-9 | IR-2 | B-2 | S-2 | 80 | 1.0 | 10.4 | A |
| Example 39 | A-9 | IR-2 | B-2 | S-4 | 85 | 1.1 | 10.3 | A |
| Example 40 | A-9 | IR-3 | B-2 | S-2 | 80 | 1.0 | 10.5 | A |
| Example 41 | A-9 | IR-3 | B-2 | S-4 | 70 | 1.1 | 10.3 | A |
| Example 42 | A-12 | IR-1 | B-2 | S-4 | 120 | 1.1 | 7.8 | A |
| Example 43 | A-15 | IR-1 | B-2 | S-4 | 135 | 1.0 | 8.8 | A |
| Example 44 | A-16 | IR-1 | B-2 | S-4 | 75 | 1.0 | 10.0 | A |
| Example 45 | A-19 | IR-1 | B-2 | S-4 | 95 | 1.1 | 8.8 | A |
| Example 46 | A-20 | IR-1 | B-2 | S-4 | 100 | 1.0 | 8.1 | A |
| Example 47 | A-22 | IR-1 | B-2 | S-4 | 95 | 1.0 | 8.5 | A |
| Example 48 | A-29 | IR-1 | B-2 | S-4 | 60 | 1.0 | 11.8 | A |
| Example 49 | A-36 | IR-1 | B-2 | S-4 | 55 | 1.0 | 11.9 | A |
| Example 50 | A-9 | IR-1 | B-1 | S-4 | 120 | 1.1 | 6.7 | B |
| Example 51 | A-9 | IR-1 | B-3 | S-4 | 120 | 1.0 | 6.4 | B |
| Comparative Example 7 | S-1 | IR-1 | B-2 | S-4 | 180 | 1.7 | 5.0 | B |
| Comparative Example 8 | S-3 | IR-1 | B-2 | S-4 | 190 | 1.7 | 4.1 | B |
| Comparative Example 9 | S-1 | IR-1 | B-3 | S-4 | 170 | 1.5 | 4.7 | C |

As apparent from Table 4, the planographic printing plate precursors of Examples 35 to 51 employing a compound represented by the formula (I) according to the invention as the component (A) were superior in sensitivity, dependence of sensitivity on oxygen amount, storage stability, printing durability, and smut resistance to the planographic printing plate precursors of Comparative Examples 7 to 9 employing the compound outside the scope of the invention as component (A). It was also confirmed that it was possible to obtain the advantageous effects of the invention even when a silicate-treated aluminum support is used.

As described above, the polymerizable composition according to the invention, which applies a photopolymerizable composition containing a compound represented by the formula (I) to the photo-radical polymerization composition that is regarded as most promising among many image-forming processes, enables improvement both in sensitivity and storage stability reliably.

In addition, the planographic printing plate precursor according to the invention having a recording layer produced with the polymerizable composition according to the invention is a planographic printing plate precursor excellent in sensitivity, storage stability, printing durability, and smut resistance, and in particular, a negative planographic printing plate precursor enabling direct plate making with digital data in computer or others by recoding with an infrared semiconductor laser beam.

As described above, the invention provides a polymerizable composition causing highly sensitive irreversible change of physical properties by exposure.

In addition, the invention provides a high sensitive negative planographic printing plate precursor that demands no or simplified heat treatment before development, is superior in resistance to alkaline developing solution in the image region and also in storage stability, printing durability, and smut resistance, and enables recording with infrared laser.

What is claimed is:

1. A negative planographic printing plate precursor, comprising a substrate, a recording layer and a protective layer on the recording layer;

wherein the recording layer contains a polymerizable composition comprising (A) a compound represented by the following formula (I), of which a value of log P defined by the following numerical formula is 2.00 or more, (B) an infrared absorbent, and (C) a compound having at least one addition-polymerizable ethylenically unsaturated bond:

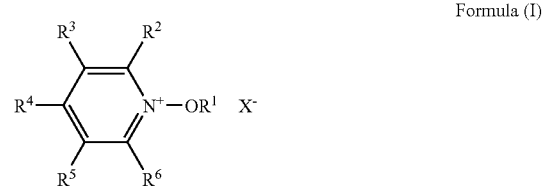

Formula (I)

wherein $R^1$ represents an optionally substituted alkyl group having 6 to 20 carbon atoms, and $R^2$, $R^3$, $R^4$, $R^5$, and $R^6$ each independently represent a hydrogen atom or a monovalent organic group which may have one or more substituents; and $X^-$ represents an acid anion selected from the group consisting of halide anions, $BF_4^-$, $BCl_4^-$, $ZnCl_4^-$, $SbCl_6^-$, $FeCl_4^-$, $GaCl_4^-$, $GaBr_4^-$, $AlI_4^-$, $AlCl_4^-$, $SbF_6^-$, $CF_3SO_3^-$, $PF_6^-$, a p-toluenesulfonate anion, anions of fused polycyclic sulfonic acids and sulfonate group-containing dyes;

log P=log(Coil/Cwater);

Coil: a molar concentration in an organic phase at an equilibrium state;

Cwater: a molar concentration in an aqueous phase at an equilibrium state;

Oil: 1-octanol.

2. The negative planographic printing plate precursor according to claim 1, further comprising, (D) a binder polymer having at least one radical-polymerizable group on the side chain thereof.

3. The negative planographic printing plate precursor according to claim 2, wherein the radical-polymerizable group is a radical-polymerizable group represented by any one of the following formulae (A) to (C):

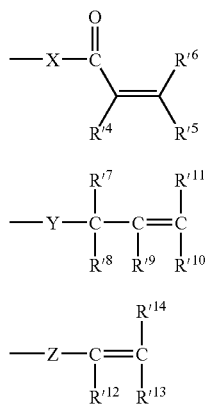

wherein $R'^4$ to $R'^{14}$ each independently represent a hydrogen atom or a monovalent substituent group; X and Y each independently represent an oxygen atom, a sulfur atom, or —N—$R^{15}$; Z represents an oxygen atom, a sulfur atom, —N—$R^{15}$, or a phenylene group; and wherein $R^{15}$ represents a hydrogen atom or a monovalent organic group.

4. The negative planographic printing plate precursor according to claim 2, wherein the binder polymer having at least one radical-polymerizable group on the side chain thereof further comprises a repeating unit represented by the following formula (II):

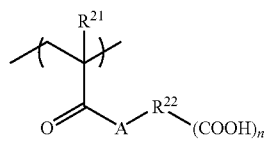

wherein $R^{21}$ represents a hydrogen atom or a methyl group; $R^{22}$ represents a connecting group containing two or more atoms selected from the group consisting of carbon, hydrogen, oxygen, nitrogen, and sulfur atoms and having a total number of atoms from 2 to 82; A represents an oxygen atom or —$NR^{23}$—; $R^{23}$ represents a hydrogen atom or a monovalent hydrocarbon group having 1 to 10 carbon atoms; and n is an integer of 1 to 5.

5. The negative planographic printing plate precursor according to claim 1, further comprising (E) a coinitiator.

6. The negative planographic printing plate precursor according to claim 5, wherein the coinitiator is a compound selected from the group consisting of (a) aromatic ketones, (b) onium salt compounds represented by the following formulae (1), (2), or (3), (c) organic peroxides, (d) thio compounds, (e) hexaarylbiimidazole compounds, (f) ketoxime ester compounds, (g) borate compounds, (h) azinium compounds, (i) metallocene compounds, (j) active ester compounds, and (k) compounds having a carbon-halogen bond:

$$Ar^1—I^+—Ar^2(Z^2)^-$$ Formula (1)

$$Ar^3—N^+\equiv N(Z^3)^-$$ Formula (2)

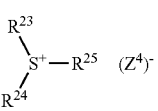 Formula (3)

wherein in formula (1), $Ar^1$ and $Ar^2$ each independently represent an aryl group having up to 20 carbon atoms which may have one or more substituents; $(Z^2)^-$ represents a counter ion selected from the group consisting of halides, perchlorate, carboxylate, tetrafluoroborate, hexafluorophosphate, and sulfonate;

in formula (2), $Ar^3$ represents an aryl group having up to 20 carbon atoms which may have one or more substituents; $(Z^3)^-$ represents the same counter ion as $(Z^2)^-$; and in formula (3), $R^{23}$, $R^{24}$ and $R^{25}$ each independently represent a hydrocarbon group having up to 20 carbon atoms which may have one or more substituents; $(Z^4)^-$ represents the same counter anion as $(Z^2)^-$.

7. The negative planographic printing plate precursor according to claim 1, wherein the infrared absorbent is a cyanine dye.

8. The negative planographic printing plate precursor according to claim 1, wherein the acid anion of fused polycyclic sulfonic acid is selected from the group consisting of a naphthalene-1-sulfonic acid, an anthracene-1-sulfonic acid and an anthraquinonesulfonate anion.

9. The negative planographic printing plate precursor according to claim 1, wherein the acid anion is selected from the group consisting of $CF_3SO_3^-$, $PF_6^-$, a p-toluenesulfonate anion, a naphthalene-1-sulfonic acid, an anthracene-1-sulfonic acid and an anthraquinonesulfonate anion.

10. The negative planographic printing plate precursor according to claim 9, wherein the acid anion is selected from the group consisting of $PF_6^-$ and a p-toluenesulfonate anion.

11. A negative planographic printing plate precursor, comprising a substrate, a recording layer and a protective layer on the recording layer;

wherein the recording layer contains a polymerizable composition comprising (A) a compound represented by the following formula (III), (B) an infrared absorbent selected from the group consisting of polycyclic aromatic compounds, xanthenes, cyanines, merocyanines, thiazines, acridines, phthalocyanines, porphyrins, chlorophylls, metal complexes, anthraquinones, and squaliums, and (C) a compound having at least one addition-polymerizable ethylenically unsaturated bond:

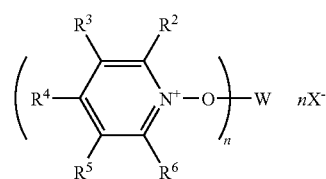 Formula (III)

wherein $R^2$ to $R^6$ each independently represent a hydrogen atom or a monovalent organic group which may have one or more substituents; W represents a n-valent organic connecting group; n is an integer of two or more; and $X^-$ represents an anion.

12. The negative planographic printing plate precursor according to claim 11, wherein the infrared absorbent is a cyanine dye.

13. A negative planographic printing plate precursor comprising a substrate, a recording layer and a protective layer on the recording layer;

wherein the recording layer contains a polymerizable composition comprising (A) a compound represented by the following formula (I) connected to a side chain of a polymer via any one of $R^1$ to $R^6$, (B) an infrared absorbent, and (C) a compound having at least one addition-polymerizable ethylenically unsaturated bond:

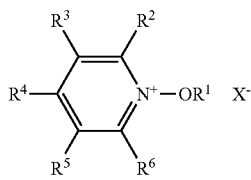

Formula (I)

wherein $R^1$ represents an optionally substituted alkyl group having 6 to 20 carbon atoms, and $R^2$, $R^3$, $R^4$, $R^5$, and $R^6$ each independently represent a hydrogen atom or a monovalent organic group which may have one or more substituents; and $X^-$ represents an anion.

14. The negative planographic printing plate precursor according to claim 13, wherein the polymer having the compound represented by formula (I) on the side chain thereof is a compound represented by the following formula (IV):

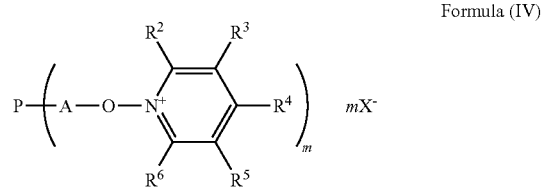

Formula (IV)

wherein $R^2$ to $R^6$ each independently represent a hydrogen atom or a monovalent organic group which may have one or more substitutents; P represents a polymer main chain; A represents a single bond or a bivalent organic connecting group; m is an integer of 1 or more.

* * * * *